United States Patent
Neumeier et al.

(10) Patent No.: US 11,971,919 B2
(45) Date of Patent: Apr. 30, 2024

(54) SYSTEMS AND METHODS FOR PARTITIONING SEARCH INDEXES FOR IMPROVED EFFICIENCY IN IDENTIFYING MEDIA SEGMENTS

(71) Applicant: INSCAPE DATA, INC., Irvine, CA (US)

(72) Inventors: Zeev Neumeier, Berkeley, CA (US); Michael Collette, San Rafael, CA (US)

(73) Assignee: INSCAPE DATA, INC., Irvine, CA (US)

( * ) Notice: Subject to any disclaimer, the term of this patent is extended or adjusted under 35 U.S.C. 154(b) by 0 days.

(21) Appl. No.: 17/689,174

(22) Filed: Mar. 8, 2022

(65) Prior Publication Data
US 2022/0269708 A1 Aug. 25, 2022

Related U.S. Application Data

(63) Continuation of application No. 15/211,492, filed on Jul. 15, 2016, now Pat. No. 11,308,144.
(Continued)

(51) Int. Cl.
*G06F 16/41* (2019.01)
*G06F 16/61* (2019.01)
(Continued)

(52) U.S. Cl.
CPC .............. *G06F 16/41* (2019.01); *G06F 16/61* (2019.01); *G06F 16/71* (2019.01); *G06V 20/49* (2022.01); *H04N 21/23418* (2013.01); *H04N 21/6582* (2013.01); *H04N 21/8352* (2013.01); *H04N 21/8456* (2013.01)

(58) Field of Classification Search
CPC ...................................................... G06F 16/41
See application file for complete search history.

(56) References Cited

U.S. PATENT DOCUMENTS

| | | |
|---|---|---|
| 4,677,466 A | 6/1987 | Lert, Jr. et al. |
| 4,697,209 A | 9/1987 | Kiewit et al. |

(Continued)

FOREIGN PATENT DOCUMENTS

| | | |
|---|---|---|
| CA | 2501316 | 9/2005 |
| CN | 1557096 | 12/2004 |

(Continued)

OTHER PUBLICATIONS

Arbelaez et al., "Contour Detection and Hierarchical Image Segmentation;" Feb. 16, 2010; Electrical Engineering and Computer Sciences University of California at Berkeley; Technical Report No. UCB/EECS-2010-17; http://www.eecs.berkeley.edu/Pubs/TechRpts/2010/EECS-2010-17.html (Year: 2010).*

(Continued)

*Primary Examiner* — Van H Oberly
(74) *Attorney, Agent, or Firm* — POLSINELLI LLP

(57) ABSTRACT

A media segment of audio or video content can be identified by deriving data from media content and comparing the data to a reference database to identify the video segment. The speed and accuracy of the media identification process can be improved by advantageously partitioning the indexes in subdivisions where high value reference information is separated from the bulk information.

17 Claims, 28 Drawing Sheets

Related U.S. Application Data

(60) Provisional application No. 62/193,351, filed on Jul. 16, 2015.

(51) Int. Cl.
  *G06F 16/71*      (2019.01)
  *G06V 20/40*      (2022.01)
  *H04N 21/234*     (2011.01)
  *H04N 21/658*     (2011.01)
  *H04N 21/8352*    (2011.01)
  *H04N 21/845*     (2011.01)

(56) References Cited

U.S. PATENT DOCUMENTS

| | | | |
|---|---|---|---|
| 4,739,398 | A | 4/1988 | Thomas et al. |
| 5,006,987 | A * | 4/1991 | Harless .............. G09B 5/06 |
| | | | 434/323 |
| 5,019,899 | A | 5/1991 | Boles et al. |
| 5,193,001 | A | 3/1993 | Kerdranvrat |
| 5,210,820 | A | 5/1993 | Kenyon |
| 5,319,453 | A | 6/1994 | Copriviza et al. |
| 5,436,653 | A | 7/1995 | Ellis et al. |
| 5,473,607 | A | 12/1995 | Hausman |
| 5,481,294 | A | 1/1996 | Thomas et al. |
| 5,557,334 | A | 9/1996 | Legate |
| 5,572,246 | A | 11/1996 | Ellis et al. |
| 5,812,286 | A | 9/1998 | Li |
| 5,826,165 | A | 10/1998 | Echeita et al. |
| 5,918,223 | A | 6/1999 | Blum et al. |
| 6,008,802 | A | 12/1999 | Goldschmidt et al. |
| 6,025,837 | A | 2/2000 | Matthews, III et al. |
| 6,035,177 | A | 3/2000 | Moses et al. |
| 6,064,764 | A | 5/2000 | Bhaskaran et al. |
| 6,298,482 | B1 | 10/2001 | Seidman |
| 6,381,362 | B1 | 4/2002 | Deshpande et al. |
| 6,415,438 | B1 | 7/2002 | Blackketter et al. |
| 6,463,585 | B1 | 10/2002 | Hendricks et al. |
| 6,469,749 | B1 | 10/2002 | Dimitrova |
| 6,577,346 | B1 | 6/2003 | Perlman |
| 6,577,405 | B2 | 6/2003 | Kranz et al. |
| 6,628,801 | B2 | 9/2003 | Powell et al. |
| 6,647,548 | B1 | 11/2003 | Lu et al. |
| 6,675,174 | B1 | 1/2004 | Bolle et al. |
| 6,771,316 | B1 | 8/2004 | Iggulden |
| 6,804,659 | B1 | 10/2004 | Graham et al. |
| 6,978,470 | B2 | 12/2005 | Swix et al. |
| 6,990,453 | B2 | 1/2006 | Wang et al. |
| 7,028,327 | B1 | 4/2006 | Dougherty et al. |
| 7,039,930 | B1 | 5/2006 | Goodman et al. |
| 7,050,068 | B1 | 5/2006 | Bastos et al. |
| 7,051,351 | B2 | 5/2006 | Goldman et al. |
| 7,064,796 | B2 | 6/2006 | Roy et al. |
| 7,089,575 | B2 | 8/2006 | Agnihotri et al. |
| 7,098,959 | B2 | 8/2006 | Mishima et al. |
| 7,136,875 | B2 | 11/2006 | Anderson et al. |
| 7,178,106 | B2 | 2/2007 | Lamkin et al. |
| 7,210,157 | B2 | 4/2007 | Devara |
| 7,243,239 | B2 | 7/2007 | Kirovski |
| 7,325,013 | B2 | 1/2008 | Caruso |
| 7,346,512 | B2 | 3/2008 | Wang et al. |
| 7,356,830 | B1 | 4/2008 | Dimitrova |
| 7,421,723 | B2 | 9/2008 | Harkness et al. |
| 7,545,984 | B1 | 6/2009 | Kiel et al. |
| 7,590,998 | B2 | 9/2009 | Hanley |
| 7,623,823 | B2 | 11/2009 | Zito et al. |
| 7,787,696 | B2 | 8/2010 | Wilhelm et al. |
| 7,793,318 | B2 | 9/2010 | Deng |
| 7,933,451 | B2 | 4/2011 | Kloer |
| 7,987,491 | B2 * | 7/2011 | Reisman .......... H04N 21/4143 |
| | | | 725/86 |
| 7,991,764 | B2 | 8/2011 | Rathod |
| 8,001,571 | B1 | 8/2011 | Schwartz et al. |
| 8,094,872 | B1 | 1/2012 | Yagnik et al. |
| 8,171,004 | B1 | 5/2012 | Kaminski, Jr. et al. |
| 8,171,030 | B2 | 5/2012 | Peira et al. |
| 8,175,413 | B1 | 5/2012 | Ioffe et al. |
| 8,189,945 | B2 | 5/2012 | Stojancic et al. |
| 8,195,589 | B2 | 6/2012 | Bakke et al. |
| 8,195,689 | B2 | 6/2012 | Ramanathan et al. |
| 8,229,227 | B2 | 7/2012 | Stojancic et al. |
| 8,335,786 | B2 | 12/2012 | Peira et al. |
| 8,352,535 | B2 | 1/2013 | Peled |
| 8,364,703 | B2 | 1/2013 | Ramanathan et al. |
| 8,385,644 | B2 | 2/2013 | Stojancic et al. |
| 8,392,789 | B2 | 3/2013 | Biscondi et al. |
| 8,494,234 | B1 | 7/2013 | Djordjevic et al. |
| 8,522,283 | B2 | 8/2013 | Laligand et al. |
| 8,595,781 | B2 | 11/2013 | Neumeier et al. |
| 8,619,877 | B2 | 12/2013 | McDowell |
| 8,625,902 | B2 | 1/2014 | Baheti et al. |
| 8,769,854 | B1 | 7/2014 | Battaglia |
| 8,776,105 | B2 | 7/2014 | Sinha et al. |
| 8,788,328 | B1 | 7/2014 | George |
| 8,832,723 | B2 | 9/2014 | Sinha et al. |
| 8,856,817 | B2 | 10/2014 | Sinha et al. |
| 8,893,167 | B2 | 11/2014 | Sinha et al. |
| 8,893,168 | B2 | 11/2014 | Sinha et al. |
| 8,898,714 | B2 | 11/2014 | Neumeier et al. |
| 8,918,804 | B2 | 12/2014 | Sinha et al. |
| 8,918,832 | B2 | 12/2014 | Sinha et al. |
| 8,930,980 | B2 | 1/2015 | Neumeier et al. |
| 8,959,202 | B2 | 2/2015 | Haitsma et al. |
| 9,055,309 | B2 | 6/2015 | Neumeier et al. |
| 9,055,335 | B2 | 6/2015 | Neumeier et al. |
| 9,071,868 | B2 | 6/2015 | Neumeier et al. |
| 9,083,710 | B1 | 7/2015 | Yadav |
| 9,094,714 | B2 | 7/2015 | Neumeier et al. |
| 9,094,715 | B2 | 7/2015 | Neumeier et al. |
| 9,165,604 | B2 * | 10/2015 | Plotnick .............. G11B 27/036 |
| 9,262,671 | B2 | 2/2016 | Unzueta |
| 9,368,021 | B2 | 6/2016 | Touloumtzis |
| 9,432,616 | B1 | 8/2016 | Hurd |
| 9,449,090 | B2 | 9/2016 | Neumeier et al. |
| 9,465,867 | B2 | 10/2016 | Hoarty |
| 9,484,065 | B2 | 11/2016 | McDowell |
| 9,838,753 | B2 | 12/2017 | Neumeier et al. |
| 9,955,192 | B2 | 4/2018 | Neumeier et al. |
| 10,080,062 | B2 | 9/2018 | Neumeier et al. |
| 10,116,972 | B2 | 10/2018 | Neumeier et al. |
| 10,169,455 | B2 | 1/2019 | Neumeier et al. |
| 10,185,768 | B2 | 1/2019 | Neumeier et al. |
| 10,192,138 | B2 | 1/2019 | Neumeier et al. |
| 10,271,098 | B2 | 4/2019 | Neumeier et al. |
| 10,284,884 | B2 | 5/2019 | Neumeier et al. |
| 10,306,274 | B2 | 5/2019 | Neumeier et al. |
| 10,375,451 | B2 | 8/2019 | Neumeier et al. |
| 10,405,014 | B2 | 9/2019 | Neumeier et al. |
| 10,482,349 | B2 | 11/2019 | Neumeier |
| 10,674,223 | B2 | 6/2020 | Neumeier et al. |
| 10,820,048 | B2 | 10/2020 | Neumeier et al. |
| 11,272,248 | B2 | 3/2022 | Neumeier et al. |
| 11,308,144 | B2 | 4/2022 | Neumeier et al. |
| 2001/0039658 | A1 | 11/2001 | Walton |
| 2001/0044992 | A1 | 11/2001 | Jahrling |
| 2002/0026635 | A1 | 2/2002 | Wheeler et al. |
| 2002/0054069 | A1 | 5/2002 | Britt et al. |
| 2002/0054695 | A1 | 5/2002 | Bjorn et al. |
| 2002/0056088 | A1 | 5/2002 | Silva, Jr. et al. |
| 2002/0059633 | A1 | 5/2002 | Harkness et al. |
| 2002/0078144 | A1 | 6/2002 | Lamkin et al. |
| 2002/0083060 | A1 | 6/2002 | Wang et al. |
| 2002/0083442 | A1 | 6/2002 | Eldering |
| 2002/0100041 | A1 | 7/2002 | Rosenberg et al. |
| 2002/0105907 | A1 | 8/2002 | Bruekers et al. |
| 2002/0120925 | A1 | 8/2002 | Logan |
| 2002/0122042 | A1 | 9/2002 | Bates |
| 2002/0144262 | A1 * | 10/2002 | Plotnick .............. H04N 21/458 |
| | | | 348/E7.071 |
| 2002/0162117 | A1 | 10/2002 | Pearson et al. |
| 2002/0162118 | A1 | 10/2002 | Levy et al. |
| 2003/0026422 | A1 | 2/2003 | Gerheim et al. |
| 2003/0086341 | A1 | 5/2003 | Wells |
| 2003/0105794 | A1 | 6/2003 | Jashinschi |

(56) References Cited

U.S. PATENT DOCUMENTS

| | | |
|---|---|---|
| 2003/0118243 A1 | 6/2003 | Sezer |
| 2003/0121037 A1 | 6/2003 | Swix et al. |
| 2003/0121046 A1* | 6/2003 | Roy .................. H04N 21/812 725/90 |
| 2003/0147561 A1 | 8/2003 | Faibish |
| 2003/0182291 A1 | 9/2003 | Kurupati |
| 2003/0188321 A1 | 10/2003 | Shoff et al. |
| 2003/0208763 A1 | 11/2003 | McElhatten et al. |
| 2004/0045020 A1 | 3/2004 | Witt et al. |
| 2004/0059708 A1 | 3/2004 | Dean et al. |
| 2004/0183825 A1 | 9/2004 | Stauder et al. |
| 2004/0216171 A1 | 10/2004 | Barone et al. |
| 2004/0221237 A1 | 11/2004 | Foote et al. |
| 2004/0226035 A1 | 11/2004 | Hauser |
| 2004/0237102 A1 | 11/2004 | Konig |
| 2004/0240562 A1 | 12/2004 | Bargeron et al. |
| 2005/0015795 A1 | 1/2005 | Iggulden |
| 2005/0015796 A1 | 1/2005 | Bruckner et al. |
| 2005/0027766 A1 | 2/2005 | Ben |
| 2005/0066352 A1 | 3/2005 | Herley |
| 2005/0120372 A1 | 6/2005 | Itakura |
| 2005/0149968 A1 | 7/2005 | Konig et al. |
| 2005/0172312 A1 | 8/2005 | Lienhart et al. |
| 2005/0207416 A1 | 9/2005 | Rajkotia |
| 2005/0209065 A1 | 9/2005 | Schlosser et al. |
| 2005/0235318 A1 | 10/2005 | Grauch et al. |
| 2006/0029286 A1 | 2/2006 | Lim et al. |
| 2006/0029368 A1 | 2/2006 | Harville |
| 2006/0031914 A1 | 2/2006 | Dakss et al. |
| 2006/0116989 A1 | 6/2006 | Bellannkonda |
| 2006/0120624 A1 | 6/2006 | Jojic |
| 2006/0133647 A1 | 6/2006 | Werner et al. |
| 2006/0153296 A1 | 7/2006 | Deng |
| 2006/0155952 A1 | 7/2006 | Haas |
| 2006/0173831 A1 | 8/2006 | Basso et al. |
| 2006/0187358 A1 | 8/2006 | Lienhart et al. |
| 2006/0193506 A1 | 8/2006 | Dorphan et al. |
| 2006/0195857 A1 | 8/2006 | Wheeler et al. |
| 2006/0195860 A1 | 8/2006 | Eldering et al. |
| 2006/0245724 A1 | 11/2006 | Hwang et al. |
| 2006/0245725 A1 | 11/2006 | Lim |
| 2006/0253330 A1 | 11/2006 | Maggio et al. |
| 2006/0277047 A1 | 12/2006 | DeBusk et al. |
| 2006/0294561 A1 | 12/2006 | Grannan et al. |
| 2007/0005540 A1* | 1/2007 | Fadde ................ A63B 71/0622 706/21 |
| 2007/0009235 A1 | 1/2007 | Walters et al. |
| 2007/0033608 A1 | 2/2007 | Eigeldinger |
| 2007/0050832 A1 | 3/2007 | Wright et al. |
| 2007/0061724 A1 | 3/2007 | Slothouber et al. |
| 2007/0061831 A1 | 3/2007 | Savoor et al. |
| 2007/0083901 A1 | 4/2007 | Bond |
| 2007/0094696 A1 | 4/2007 | Sakai |
| 2007/0109449 A1 | 5/2007 | Cheung |
| 2007/0113263 A1 | 5/2007 | Chatani |
| 2007/0139563 A1 | 6/2007 | Zhong |
| 2007/0143796 A1 | 6/2007 | Malik |
| 2007/0154169 A1* | 7/2007 | Cordray .................. H04N 5/76 386/230 |
| 2007/0168409 A1 | 7/2007 | Cheung |
| 2007/0180459 A1 | 8/2007 | Smithpeters et al. |
| 2007/0192782 A1 | 8/2007 | Ramaswamy |
| 2007/0198839 A1* | 8/2007 | Carle .................... H04N 21/21 713/176 |
| 2007/0242880 A1 | 10/2007 | Stebbings |
| 2007/0250901 A1 | 10/2007 | McIntire et al. |
| 2007/0261070 A1 | 11/2007 | Brown et al. |
| 2007/0261075 A1 | 11/2007 | Glasberg |
| 2007/0271300 A1 | 11/2007 | Ramaswamy |
| 2007/0274537 A1 | 11/2007 | Srinivasan |
| 2007/0300280 A1 | 12/2007 | Turner et al. |
| 2008/0005086 A1 | 1/2008 | Moore |
| 2008/0044102 A1 | 2/2008 | Ekin |
| 2008/0046945 A1 | 2/2008 | Hanley |
| 2008/0052161 A1* | 2/2008 | Cohen ................ G06Q 30/0207 705/14.1 |
| 2008/0089551 A1 | 4/2008 | Heather et al. |
| 2008/0138030 A1 | 6/2008 | Bryan et al. |
| 2008/0155588 A1 | 6/2008 | Roberts et al. |
| 2008/0155627 A1 | 6/2008 | O'Connor et al. |
| 2008/0172690 A1 | 7/2008 | Kanojia et al. |
| 2008/0193102 A1* | 8/2008 | Tischer ............ H04N 21/44016 386/E5.052 |
| 2008/0208891 A1 | 8/2008 | Wang et al. |
| 2008/0209480 A1 | 8/2008 | Eide |
| 2008/0240562 A1 | 10/2008 | Fukuda et al. |
| 2008/0249986 A1 | 10/2008 | Clarke-Martin |
| 2008/0263620 A1 | 10/2008 | Berkvens et al. |
| 2008/0276266 A1 | 11/2008 | Huchital et al. |
| 2008/0309819 A1 | 12/2008 | Hardacker et al. |
| 2008/0310731 A1 | 12/2008 | Stojancic et al. |
| 2008/0313140 A1 | 12/2008 | Pereira et al. |
| 2009/0007195 A1 | 1/2009 | Beyabani |
| 2009/0024923 A1 | 1/2009 | Hartwig et al. |
| 2009/0028517 A1 | 1/2009 | Shen et al. |
| 2009/0052784 A1 | 2/2009 | Covell et al. |
| 2009/0087027 A1 | 4/2009 | Eaton et al. |
| 2009/0088878 A1 | 4/2009 | Otsuka et al. |
| 2009/0100361 A1 | 4/2009 | Abello et al. |
| 2009/0116702 A1 | 5/2009 | Conradt |
| 2009/0131861 A1 | 5/2009 | Braig et al. |
| 2009/0172728 A1 | 7/2009 | Shkedi et al. |
| 2009/0172746 A1 | 7/2009 | Aldrey et al. |
| 2009/0175538 A1 | 7/2009 | Bronstein et al. |
| 2009/0213270 A1 | 8/2009 | Ismert et al. |
| 2009/0235312 A1 | 9/2009 | Morad et al. |
| 2010/0010648 A1 | 1/2010 | Bull et al. |
| 2010/0042790 A1 | 2/2010 | Mondal et al. |
| 2010/0083299 A1 | 4/2010 | Nelson |
| 2010/0115543 A1 | 5/2010 | Falcon |
| 2010/0115574 A1 | 5/2010 | Hardt et al. |
| 2010/0125870 A1 | 5/2010 | Ukawa et al. |
| 2010/0166257 A1 | 7/2010 | Wredenhagen |
| 2010/0199295 A1 | 8/2010 | Katpelly et al. |
| 2010/0235486 A1 | 9/2010 | White et al. |
| 2010/0253838 A1 | 10/2010 | Garg et al. |
| 2010/0269138 A1 | 10/2010 | Krikorian et al. |
| 2010/0306805 A1 | 12/2010 | Neumeier et al. |
| 2010/0306808 A1 | 12/2010 | Neumeier et al. |
| 2011/0015996 A1 | 1/2011 | Kassoway et al. |
| 2011/0026761 A1 | 2/2011 | Radhakrishnan et al. |
| 2011/0041154 A1 | 2/2011 | Olson |
| 2011/0055552 A1 | 3/2011 | Francis et al. |
| 2011/0096955 A1* | 4/2011 | Voloshynovskiy ... G07F 7/0813 382/103 |
| 2011/0251987 A1 | 4/2011 | Buchheit |
| 2011/0247042 A1 | 10/2011 | Mallinson |
| 2011/0289099 A1 | 11/2011 | Quan |
| 2011/0299770 A1 | 12/2011 | Vaddadi et al. |
| 2011/0307683 A1 | 12/2011 | Spackman |
| 2012/0017240 A1 | 1/2012 | Shkedi |
| 2012/0054143 A1 | 3/2012 | Doig et al. |
| 2012/0076357 A1 | 3/2012 | Yamamoto et al. |
| 2012/0095958 A1 | 4/2012 | Pereira et al. |
| 2012/0117584 A1 | 5/2012 | Gordon |
| 2012/0158511 A1 | 6/2012 | Lucero et al. |
| 2012/0174155 A1 | 7/2012 | Mowrey et al. |
| 2012/0177249 A1 | 7/2012 | Levy et al. |
| 2012/0185566 A1 | 7/2012 | Nagasaka |
| 2012/0272259 A1 | 10/2012 | Cortes |
| 2012/0294586 A1 | 11/2012 | Weaver et al. |
| 2012/0317240 A1 | 12/2012 | Wang |
| 2012/0324494 A1 | 12/2012 | Burger et al. |
| 2012/0327450 A1 | 12/2012 | Sagan |
| 2013/0007191 A1 | 1/2013 | Klappert et al. |
| 2013/0007792 A1 | 1/2013 | Jeon et al. |
| 2013/0042262 A1 | 2/2013 | Riethmueller |
| 2013/0050564 A1 | 2/2013 | Adams et al. |
| 2013/0054356 A1 | 2/2013 | Richman et al. |
| 2013/0067523 A1 | 3/2013 | Etsuko et al. |
| 2013/0070847 A1 | 3/2013 | Iwamoto et al. |
| 2013/0108173 A1 | 5/2013 | Lienhart et al. |
| 2013/0139209 A1 | 5/2013 | Urrabazo et al. |

(56) References Cited

U.S. PATENT DOCUMENTS

| | | |
|---|---|---|
| 2013/0198768 A1 | 8/2013 | Kitazato |
| 2013/0202150 A1 | 8/2013 | Sinha et al. |
| 2013/0205315 A1 | 8/2013 | Sinha |
| 2013/0209065 A1 | 8/2013 | Yeung |
| 2013/0212609 A1 | 8/2013 | Sinha et al. |
| 2013/0290502 A1 | 10/2013 | Bilobrov |
| 2013/0297727 A1 | 11/2013 | Levy |
| 2013/0318096 A1 | 11/2013 | Cheung |
| 2014/0016696 A1 | 1/2014 | Nelson |
| 2014/0025837 A1 | 1/2014 | Swenson |
| 2014/0052737 A1 | 2/2014 | Ramanathan et al. |
| 2014/0082663 A1 | 3/2014 | Neumeier et al. |
| 2014/0088742 A1 | 3/2014 | Srinivasan |
| 2014/0105567 A1 | 4/2014 | Casagrande |
| 2014/0123165 A1 | 5/2014 | Mukherjee et al. |
| 2014/0130092 A1 | 5/2014 | Kunisetty |
| 2014/0153571 A1 | 6/2014 | Neugebauer |
| 2014/0188487 A1 | 7/2014 | Perez Gonzalez |
| 2014/0193027 A1 | 7/2014 | Scherf |
| 2014/0195548 A1 | 7/2014 | Harron |
| 2014/0196085 A1 | 7/2014 | Dunker |
| 2014/0201769 A1 | 7/2014 | Neumeier et al. |
| 2014/0201772 A1* | 7/2014 | Neumeier ............ H04N 21/235 725/19 |
| 2014/0201787 A1 | 7/2014 | Neumeier et al. |
| 2014/0219554 A1 | 8/2014 | Yamaguchi et al. |
| 2014/0237576 A1 | 8/2014 | Zhang |
| 2014/0258375 A1 | 9/2014 | Munoz |
| 2014/0270489 A1 | 9/2014 | Jaewhan et al. |
| 2014/0270504 A1 | 9/2014 | Baum et al. |
| 2014/0270505 A1 | 9/2014 | McCarthy |
| 2014/0282671 A1 | 9/2014 | McMillan |
| 2014/0293794 A1 | 10/2014 | Zhong et al. |
| 2014/0344880 A1 | 11/2014 | Geller et al. |
| 2015/0026728 A1 | 1/2015 | Carter et al. |
| 2015/0040074 A1 | 2/2015 | Hofmann et al. |
| 2015/0067714 A1* | 3/2015 | Bhogal .............. H04N 21/4532 725/25 |
| 2015/0100979 A1 | 4/2015 | Moskowitz et al. |
| 2015/0112988 A1 | 4/2015 | Pereira et al. |
| 2015/0120839 A1 | 4/2015 | Kannan et al. |
| 2015/0121409 A1 | 4/2015 | Zhang et al. |
| 2015/0128161 A1 | 5/2015 | Conrad et al. |
| 2015/0131845 A1 | 5/2015 | Forouhar |
| 2015/0135206 A1* | 5/2015 | Reisman ................ H04H 20/93 725/18 |
| 2015/0163545 A1 | 6/2015 | Freed et al. |
| 2015/0181311 A1 | 6/2015 | Navin et al. |
| 2015/0188967 A1 | 7/2015 | Paulauskas |
| 2015/0205727 A1 | 7/2015 | Kimmel |
| 2015/0229998 A1 | 8/2015 | Kaushal et al. |
| 2015/0256891 A1 | 9/2015 | Kim et al. |
| 2015/0302890 A1 | 10/2015 | Ergen et al. |
| 2015/0382075 A1 | 12/2015 | Neumeier et al. |
| 2016/0073166 A1 | 3/2016 | Hu |
| 2016/0112319 A1 | 4/2016 | Hasani |
| 2016/0154880 A1 | 6/2016 | Hoarty |
| 2016/0227261 A1 | 8/2016 | Neumeier et al. |
| 2016/0227291 A1 | 8/2016 | Shaw et al. |
| 2016/0286244 A1 | 9/2016 | Chang et al. |
| 2016/0307043 A1 | 10/2016 | Neumeier |
| 2016/0314794 A1 | 10/2016 | Leitman et al. |
| 2016/0316262 A1 | 10/2016 | Chen |
| 2016/0330529 A1 | 11/2016 | Byers |
| 2016/0353172 A1 | 12/2016 | Miller et al. |
| 2016/0359791 A1 | 12/2016 | Zhang et al. |
| 2017/0017645 A1 | 1/2017 | Neumeier et al. |
| 2017/0017651 A1 | 1/2017 | Neumeier et al. |
| 2017/0017652 A1 | 1/2017 | Neumeier et al. |
| 2017/0019716 A1 | 1/2017 | Neumeier et al. |
| 2017/0019719 A1 | 1/2017 | Neumeier et al. |
| 2017/0026671 A1 | 1/2017 | Neumeier et al. |
| 2017/0031573 A1 | 2/2017 | Kaneko |
| 2017/0032033 A1 | 2/2017 | Neumeier et al. |
| 2017/0032034 A1 | 2/2017 | Neumeier et al. |
| 2017/0090814 A1 | 3/2017 | Yeung |
| 2017/0134770 A9 | 5/2017 | Neumeier et al. |
| 2017/0186042 A1 | 6/2017 | Wong et al. |
| 2017/0311014 A1 | 10/2017 | Fleischman |
| 2017/0325005 A1 | 11/2017 | Liassides |
| 2017/0353776 A1 | 12/2017 | Holden et al. |
| 2018/0227646 A9 | 8/2018 | Navin et al. |

FOREIGN PATENT DOCUMENTS

| | | |
|---|---|---|
| CN | 101162470 | 4/2008 |
| CN | 1681304 | 7/2010 |
| CN | 102377960 | 3/2012 |
| CN | 101681373 | 9/2012 |
| EP | 248 533 | 8/1994 |
| EP | 1578126 | 9/2005 |
| EP | 1 760 693 | 3/2007 |
| EP | 1504445 B1 | 8/2008 |
| EP | 2 084 624 | 8/2009 |
| EP | 2 352 289 | 8/2011 |
| EP | 2 541 963 A2 | 1/2013 |
| EP | 2 685 450 A1 | 1/2014 |
| GB | 2457694 | 8/2009 |
| WO | 0144992 | 6/2001 |
| WO | 2005/101998 | 11/2005 |
| WO | 2007/114796 | 10/2007 |
| WO | 2008/065340 | 6/2008 |
| WO | 2009/131861 | 10/2009 |
| WO | 2009/150425 | 12/2009 |
| WO | 2010/135082 | 11/2010 |
| WO | 2011/090540 A2 | 7/2011 |
| WO | 2012/057724 | 5/2012 |
| WO | 2012/108975 | 8/2012 |
| WO | 2012/170451 | 12/2012 |
| WO | 2014/142758 | 9/2014 |
| WO | 2014/145929 A1 | 9/2014 |
| WO | 2015/100372 A1 | 7/2015 |
| WO | 2016033676 A1 | 3/2016 |
| WO | 2016/123495 | 8/2016 |
| WO | 2016/168556 | 10/2016 |
| WO | 2017/011758 | 1/2017 |
| WO | 2017/011792 | 1/2017 |

OTHER PUBLICATIONS

International Search Report and Written Opinion dated Mar. 31, 2015 for PCT Application No. PCT/US2014/072255, 8 pages.

International Search Report and Written Opinion dated Apr. 26, 2016 for PCT Application No. PCT/US2016/015681,13 pages.

"How to: Watch from the beginning |About DISH" (Dec. 31, 2014) XP055265764, retrieved on Apr. 15, 2016 from URL:http://about.dish.com/blog/hopper/how-watch-beginning 2 pages.

International Search Report and Written Opinion dated Jun. 24, 2016 for PCT Application No. PCT/US2016/027691, 13 pages.

Gionis et al., "Similarity Search in High Dimension via Hashing", Proceedings of the 25th VLDB Conference, 1999, 12 pages.

Huang , "Bounded Coordinate System Indexing for Real-time Video Clip Search", Retrieved from the Internet: URL:http://staff.itee.uq.edu.aujzxf/papers/TOIS.pdf, Jan. 1, 2009, 32 pages.

Kim et al., "Edge-Based Spatial Descriptor Using Color Vector Angle for Effective Image Retrieval", Modeling Decisions for Artificial Intelligence; [Lecture Notes in Computer Science; Lecture Notes in Artificial Intelligence, Jul. 1, 2005, pp. 365-375.

Liu et al., "Near-duplicate video retrieval", ACM Computing Surveys, vol. 45, No. 4, Aug. 30, 2013, pp. 1-23.

International Search Report and Written Opinion dated Oct. 12, 2016 for PCT Application No. PCT/US2016/042522,13 pages.

International Search Report and Written Opinion dated Oct. 11, 2016 for PCT Application No. PCT/US2016/042621, 13 pages.

International Search Report and Written Opinion dated Oct. 20, 2016 for PCT Application No. PCT/US2016/042611,12 pages.

Scouarnec et al., "Cache policies for cloud-based systems:To keep or not to keep", 2014 IEEE 7th International Conference on Cloud Computing, IEEE XP032696624, Jun. 27, 2014, pp. 1-8.

(56) References Cited

OTHER PUBLICATIONS

International Search Report and Written Opinion dated Oct. 25, 2016 for PCT Application No. PCT/US2016/042564, 14 pages.
Anonymous; "Cache (computing)" Wikipedia, the free encyclopedia, URL:http://en.wikipedia.org/w/index.phpti tle=Cache(computing)&oldid=474222804, Jan. 31, 2012; 6 pages.
International Search Report and Written Opinion dated Oct. 24, 2016 for PCT Application No. PCT/US2016/042557, 11 pages.
Anil K. Jain, "Image Coding Via a Nearest Neighbors Image Model" IEEE Transactions on Communications, vol. Com-23, No. 3, Mar. 1975, pp. 318-331.
Lee et al., "Fast Video Search Algorithm for Large Video Database Using Adjacent Pixel Intensity Difference Quantization Histogram Feature" International Journal of Computer Science and Network Security, vol. 9, No. 9, Sep. 2009, pp. 214-220.
Li et al., A Confidence Based Recognition System for TV Commercial Extraction, Conferences in Research and Practice in Information Technology vol. 75, 2008.
International Search Report and Written Opinion dated Jul. 27, 2011 for PCT Application No. PCT/US2010/057153, 8 pages.
International Search Report and Written Opinion dated Aug. 31, 2011 for PCT Application No. PCT/US2010/057155, 8 pages.
International Search Report and Written Opinion dated Aug. 26, 2014 for PCT Application No. PCT/US2014/030782; 11 pages.
International Search Report and Written Opinion dated Jul. 21, 2014 for PCT Application No. PCT/US2014/030795; 10 pages.
International Search Report and Written Opinion, dated Jul. 25, 2014 for PCT Application No. PCT/US2014/030805, 10 pages.
Extended European Search Report dated Mar. 7, 2013 for European Application No. 12178359.1, 8 pages.
Extended European Search Report dated Oct. 11, 2013 for European Application No. 10844152.8, 19 pages.
Kabal (P.), Ramachandran (R.P.): The computation of line spectral frequencies using Chebyshev polynomials, IEEE Trans. on ASSP, vol. 34, No. 6, pp. 1419-1426, 1986.
Itakura (F.): Line spectral representation of linear predictive coefficients of speech signals, J. Acoust. Soc. Amer., vol. 57, Supplement No. 1, S35, 1975, 3 pages.
Bistritz (Y.), Pellerm (S.): Immittance Spectral Pairs (ISP) for speech encoding, Proc. ICASSP'93, pp. 11-19 to 11-12.
International Search Report and Written Opinion dated Mar. 8, 2016 for PCT Application No. PCT/ US2015/062945; 9 pages.
Extended European Search Report dated Dec. 21, 2016 for European Application No. 14763506.4, 11 pages.
Extended European Search Report dated Nov. 23, 2016 for European Application No. 14764182.3, 10 pages.
Extended European Search Report dated Jan. 24, 2017 for European Application No. 14762850.7, 12 pages.
Extended European Search Report dated Jun. 16, 2017, for European Patent Application No. 14873564.0, 8 pages.
Extended European Search Report dated Jun. 28, 2019, for European Patent Application No. 19166400.2, 9 pages.
U.S. Appl. No. 14/551,933, "Final Office Action", dated May 23, 2016, 19 pages.
U.S. Appl. No. 14/551,933, "Non-Final Office Action", dated Oct. 17, 2016, 15 pages.
U.S. Appl. No. 14/551,933, "Non-Final Office Action", dated Dec. 31, 2015, 24 pages.
U.S. Appl. No. 14/551,933, "Notice of Allowance", dated Mar. 21, 2017, 8 pages.
U.S. Appl. No. 14/217,039, "Non-Final Office Action", dated May 23, 2014, 27 pages.
U.S. Appl. No. 14/217,039, "Final Office Action", dated Nov. 7, 2014, 15 pages.
U.S. Appl. No. 14/217,039, "Notice of Allowance", dated Jan. 29, 2015, 8 pages.
U.S. Appl. No. 14/678,856, "Non-Final Office Action", dated Dec. 1, 2015, 28 pages.
U.S. Appl. No. 14/678,856, "Notice of Allowance", dated May 20, 2016, 9 pages.
U.S. Appl. No. 14/217,075, "Non-Final Office Action", dated Jul. 16, 2014, 39 pages.
U.S. Appl. No. 14/217,075, "Notice of Allowance", dated Feb. 20, 2015, 51 page.
U.S. Appl. No. 14/217,094, "Notice of Allowance", dated Sep. 4, 2014, 30 pages.
U.S. Appl. No. 14/217,375, "Non-Final Office Action", dated Apr. 1, 2015, 39 pages.
U.S. Appl. No. 14/217,375, "Notice of Allowance", dated Apr. 1, 2015, 31 pages.
U.S. Appl. No. 14/217,425, "Non-Final Office Action", dated Apr. 7, 2015, 12 pages.
U.S. Appl. No. 14/217,425, "Notice of Allowance", dated May 20, 2015, 15 pages.
U.S. Appl. No. 14/217,435, "Non-Final Office Action", dated Nov. 24, 2014, 9 pages.
U.S. Appl. No. 14/217,435, "Notice of Allowance", dated Jun. 5, 2015, 9 pages.
U.S. Appl. No. 15/011,099, "First Action Interview Office Action Summary", dated May 9, 2017, 6 pages.
U.S. Appl. No. 15/011,099, "First Action Interview Pilot Program Pre-Interview Communication", dated Feb. 28, 2017, 5 pages.
U.S. Appl. No. 12/788,721, "Non-Final Office Action", dated Mar. 28, 2012, 15 Pages.
U.S. Appl. No. 12/788,721, "Final Office Action", dated Aug. 15, 2012, 22 Pages.
U.S. Appl. No. 12/788,721, "Notice of Allowance", dated Aug. 15, 2013, 16 Pages.
U.S. Appl. No. 14/763,158, "Non-Final Office Action", Jun. 27, 2016, dated 16 Pages.
U.S. Appl. No. 14/763,158, "Final Office Action", dated Sep. 7, 2016, 12 Pages.
U.S. Appl. No. 14/763,158, "Notice of Allowance", dated Mar. 17, 2016, 8 Pages.
U.S. Appl. No. 14/807,849, "Non-Final Office Action", dated Nov. 25, 2015, 12 Pages.
U.S. Appl. No. 14/807,849, "Final Office Action", dated Apr. 19, 2016, 13 pages.
U.S. Appl. No. 14/807,849, "Non-Final Office Action", dated Feb. 28, 2017, 10 Pages.
U.S. Appl. No. 14/089,003, "Notice of Allowance", dated Jul. 30, 2014, 24 Pages.
U.S. Appl. No. 12/788,748, "Non-Final Office Action", dated Jan. 10, 2013, 10 Pages.
U.S. Appl. No. 12/788,748, "Final Office Action", dated Nov. 21, 2013, 13 Pages.
U.S. Appl. No. 12/788,748, "Notice of Allowance", dated Mar. 6, 2014, 7 Pages.
U.S. Appl. No. 14/953,994, "Non-Final Office Action", Mar. 3, 2016, dated 34 Pages.
U.S. Appl. No. 14/953,994, "Final Office Action", dated Jun. 1, 2016, 36 Pages.
U.S. Appl. No. 14/953,994, "Notice of Allowance", dated Aug. 31, 2016, 15 Pages.
U.S. Appl. No. 14/807,849, "Final Office Action", dated Jun. 22, 2017, 10 pages.
U.S. Appl. No. 15/011,099, "Final Office Action", dated Jul. 24, 2017, 22 pages.
U.S. Appl. No. 15/240,801, "Non-Final Office Action", dated Aug. 11, 2017, 18 pages.
U.S. Appl. No. 15/240,815, "Non-Final Office Action", dated Aug. 23, 2017, 15 pages.
U.S. Appl. No. 15/211,345, "First Action Interview Pilot Program Pre-Interview Communication", dated Sep. 19, 2017, 8 pages.
U.S. Appl. No. 14/807,849, "Notice of Allowance", dated Nov. 30, 2017, 9 Pages.
U.S. Appl. No. 15/240,801, "Final Office Action", dated Dec. 22, 2017, 24 pages.
U.S. Appl. No. 15/011,099, "Non-Final Office Action", dated Jan. 22, 2018, 23 pages.
U.S. Appl. No. 15/240,815, "Final Office Action", dated Mar. 2, 2018, 14 pages.

(56) References Cited

OTHER PUBLICATIONS

U.S. Appl. No. 15/211,345, "Final Office Action", dated Mar. 2, 2018, 14 pages.
Extended European Search Report dated Mar. 22, 2018 for European Application No. 15865033.3, 10 pages.
U.S. Appl. No. 15/099,842, "Final Office Action", dated Apr. 2, 2018, 8 pages.
U.S. Appl. No. 15/210,730, "Notice of Allowance", dated May 23, 2018, 10 pages.
U.S. Appl. No. 15/796,706, "Non-Final Office Action", dated Jun. 26, 2018, 17 pages.
U.S. Appl. No. 15/011,099, "Notice of Allowance", dated Jun. 28, 2018, 12 pages.
U.S. Appl. No. 15/796,698, "Non-Final Office Action", dated Jul. 5, 2018, 15 pages.
U.S. Appl. No. 15/240,801, "Notice of Allowance", dated Aug. 30, 2018, 9 pages.
U.S. Appl. No. 15/211,345, "Non-Final Office Action", dated Sep. 4, 2018, 13 pages.
U.S. Appl. No. 15/099,842, "Notice of Allowance", dated Sep. 7, 2018, 10 pages.
U.S. Appl. No. 15/240,815, "Notice of Allowance", dated Sep. 12, 2018, 9 pages.
U.S. Appl. No. 15/290,848, "First Action Interview Office Action Summary", dated Nov. 2, 2018, 5 pages.
U.S. Appl. No. 15/796,692, "Notice of Allowance", dated Dec. 5, 2018, 8 pages.
U.S. Appl. No. 15/796,698, "Notice of Allowance", dated Dec. 20, 2018, 8 pages.
U.S. Appl. No. 15/796,706, "Notice of Allowance", dated Jan. 11, 2019, 9 pages.
U.S. Appl. No. 15/211,508, "Non-Final Office Action", dated Jan. 10, 2019, 20 pages.
U.S. Appl. No. 15/211,492, "Non-Final Office Action", dated Jan. 11, 2019, 19 pages.
U.S. Appl. No. 16/141,598, "First Action Interview Office Action Summary", dated Jan. 11, 2019, 8 pages.
U.S. Appl. No. 15/290,848, "Non-Final Office Action", dated Mar. 5, 2019, 5 pages.
U.S. Appl. No. 15/211,991, "Non-Final Office Action", dated Feb. 26, 2019, 8 pages.
U.S. Appl. No. 15/211,345, "Notice of Allowance", dated Mar. 20, 2019, 6 pages.
U.S. Appl. No. 16/210,796, "Non-Final Office Action", dated Mar. 22, 2019, 7 pages.
U.S. Appl. No. 16/141,598, "Notice of Allowance", dated Apr. 25, 2019, 11 pages.
U.S. Appl. No. 15/211,508, "Final Office Action", dated Jun. 20, 2019, 20 pages.
U.S. Appl. No. 15/211,492, "Final Office Action", dated Jun. 20, 2019, 18 pages.
U.S. Appl. No. 16/210,796, "Notice of Allowance", dated Jul. 11, 2019, 9 pages.
U.S. Appl. No. 16/214,875, "Non-Final Office Action", dated Jul. 29, 2019, 12 pages.
U.S. Appl. No. 15/211,991, "Final Office Action", dated Oct. 31, 2019, 9 pages.
U.S. Appl. No. 16/214,875, "Final Office Action", dated Jan. 29, 2020, 13 pages.
U.S. Appl. No. 16/290,055, "Non-Final Office Action", dated Feb. 19, 2020, 18 pages.
U.S. Appl. No. 16/379,663, "Non-Final Office Action", dated Feb. 24, 2020, 19 pages.
U.S. Appl. No. 15/211,991, "Non-Final Office Action", dated Mar. 19, 2020, 19 pages.
U.S. Appl. No. 15/211,508, "Non-Final Office Action", dated Apr. 3, 2020, 25 pages.
U.S. Appl. No. 15/211,492, "Non-Final Office Action", dated Apr. 6, 2020, 18 pages.
U.S. Appl. No. 16/290,055, "Notice of Allowance", dated Jun. 25, 2020, 10 pages.
U.S. Appl. No. 16/214,875, "Non-Final Office Action", dated Jul. 15, 2020, 21 pages.
U.S. Appl. No. 16/379,663, "Final Office Action", dated Jul. 28, 2020, 15 pages.
U.S. Appl. No. 16/444,152, "Notice of Allowance", dated Aug. 19, 2020, 6 pages.
U.S. Appl. No. 15/211,991, "Notice of Allowance", dated Sep. 17, 2020, 13 pages.
U.S. Appl. No. 15/211,492, "Final Office Action", dated Oct. 26, 2020, 18 pages.
U.S. Appl. No. 15/211,508, "Notice of Allowance", dated Oct. 27, 2020, 13 pages.
U.S. Appl. No. 16/519,292, "Notice of Allowance", dated Oct. 29, 2020, 10 pages.
U.S. Appl. No. 16/214,875, "Final Office Action", dated Nov. 30, 2020, 17 pages.
U.S. Appl. No. 16/379,663, "Notice of Allowance", dated Feb. 16, 2021, 9 pages.
U.S. Appl. No. 17/028,026, "Non-Final Office Action", dated Jun. 22, 2021, 15 pages.
U.S. Appl. No. 17/028,026, "Notice of Allowance", dated Dec. 30, 2021, 9 pages.
U.S. Appl. No. 15/211,492, "Notice of Allowance", dated Dec. 10, 2021, 11 pages.

* cited by examiner

SYSTEMS AND METHODS FOR PARTITIONING SEARCH INDEXES FOR IMPROVED EFFICIENCY IN IDENTIFYING MEDIA SEGMENTS

CROSS-REFERENCES TO RELATED APPLICATIONS

This application is a continuation of U.S. patent application Ser. No. 15/211,492 filed Jul. 15, 2016, which claims the benefit of U.S. Provisional Patent Application No. 62/193,351, filed Jul. 16, 2015, the disclosures of which are hereby incorporated by reference in their entirety for all purposes.

This application is related to U.S. patent application Ser. No. 14/551,933, filed Nov. 24, 2014, which is a continuation of U.S. patent application Ser. No. 12/788,721, filed May 27, 2010, now U.S. Pat. No. 8,595,781, which claims the benefit of U.S. Provisional Patent Application No. 61/182,334, filed May 29, 2009, and U.S. Provisional Patent Application No. 61/290,714, filed Dec. 29, 2009, the disclosures of which are herein incorporated by reference in their entireties for all purposes.

FIELD

The present disclosure relates to improving management of system resources used for recognition of content displayed by a media system (e.g., a television system, a computer system, or other electronic device capable of connecting to the Internet). Further, the present disclosure relates to effectively and efficiently identifying content. For example, various techniques and systems are provided for partitioning search indexes into buckets that may be searched in parallel to improve identification efficiency of content.

BACKGROUND

Advancements in fiber optic and digital transmission technology have enabled the television industry to rapidly increase channel capacity and, hence, to provide hundreds of channels of television program in addition to thousands or more channels of on-demand programming. From the perspective of an automated content recognition (ACR) system which is monitoring television receivers nationwide, the problem is even more challenging with the presence of 10 to 20 local channels per major DMA (approximately 100 in the U.S.), totaling thousands of broadcast channels and tens of thousands of pieces of on-demand content.

SUMMARY OF THE INVENTION

Embodiments of the invention generally relate to systems and methods for identifying video segments displayed on a screen of a television system or audio segments from any source, and to systems and methods for providing contextually targeted content to media systems based on such video or audio segment identification. As used herein, the term "media systems" includes, but is not limited to, television systems, audio systems, and the like. As used herein, the term "television systems" includes, but is not limited to, televisions such as web TVs and connected TVs (also known as "Smart TVs") and equipment incorporated in, or co-located with, the television, such as a set-top box (STB), a digital video disc (DVD) player or a digital video recorder (DVR). As used herein, the term "television signals" includes signals representing video and audio data which are broadcast together (with or without metadata) to provide the picture and sound components of a television program or commercial. As used herein, the term "metadata" means data about or relating to the video/audio data in television signals.

Embodiments of the present invention are directed to systems and methods for advantageously partitioning very large volumes of content for the purpose of automated content recognition resulting in enhanced accuracy of content recognition from unknown sources such as client media devices including smart TVs, cable and satellite set-top boxes and Internet-connected network media players and the like. It is contemplated that the invention can be applied not just to media data but to any large database that must be searched in multiple dimensions simultaneously.

Under the load of a large number of content sources, the task of minimizing false positives and maximizing correct content identification can be considerably enhanced by the creation of multiple indexes of content identifiers (also referred to herein as "cues") where certain indexes are various subsets of the larger collection of information. These grouped indexes can be selected using a variety of parameters such as, for one example, the popularity of a television program as determined by TV ratings or social media mentions. The more popular channels, perhaps the top ten percent, can be grouped into one search index and the remaining 90 percent into another index, for example. Another grouping might be the separation of content into a third index of just local television channels and yet a fourth example might be to separate the on-demand from the broadcast content into an on-demand index. Yet another content group could be derived from content that is considered important commercially and would benefit by being isolated in a separate search space. Any appropriate segregation of related content could be employed to further the benefit of embodiments of the invention.

Once separated into content groups and indexed (hashed), the result is a vector space of multiple dimensions anywhere from 16 to 100, known as a 'space', and colloquially as a "bucket". The buckets are individually searched and the search results are fed to the path pursuit process described in U.S. Pat. No. 8,595,781, herein incorporated by reference in its entirety. The path pursuit process attempts to find a matching media segment in each respective bucket and can be executed in concurrently or in parallel. Candidates from each said bucket are weighed and a final decision is made to select the closest matching video segment, thus identifying which video segment is being displayed on a screen of a television system. In particular, the resulting data identifying the video segment being currently viewed can be used to enable the capture and appropriately respond to a TV viewer's reaction (such as requesting more information about a product being advertised or background information of an actor on screen). Furthermore, identifying which video segment is being displayed on the screen allows the central system of the invention to maintain a census of currently viewed television programming for various data analysis uses. Many other uses of said knowledge of current video segment might possibly also be including the substitution of more relevant commercial messages during detected commercial breaks, among other options.

In accordance with some embodiments, the video segment is identified by sampling at particular intervals (e.g., 100 milliseconds) a subset of the pixel data being displayed on the screen (or associated audio data) and then finding similar pixel (or audio) data in a content database. In accordance with other embodiments, the video segment is identified by extracting audio or image data associated with such video segment and then finding similar audio or image data in a content database. In accordance with alternative embodiments, the video segment is identified by processing the audio data associated with such video segment using known automated speech recognition techniques. In accordance with further alternative embodiments, the video segment is identified by processing metadata associated with such video segment.

Embodiments of the invention are further directed to systems and methods for providing contextually targeted content to an interactive television system. The contextual targeting is based on not only identification of the video segment being displayed, but also a determination concerning the playing time or offset time of the particular portion of the video segment being currently displayed. The terms "playing time" and "offset time" will be used interchangeably herein and refer to a time which is offset from a fixed point in time, such as the starting time of a particular television program or commercial.

More specifically, embodiments of the invention comprises technology that can detect what is playing on a connected TV, deduce the subject matter of what is being played, and interact with the viewer accordingly. In particular, the technology disclosed herein overcomes the limited ability of interactive TVs to strictly pull functionality from a server via the Internet, thereby enabling novel business models including the ability to provide instant access to video-on-demand versions of content, and providing the user with the option to view higher resolutions or 3D formats of the content if available, and with the additional ability to start over, fast forward, pause and rewind. The invention also enables having some or all advertising messages included in the now VOD programing, customized, by way of example only and without limitation, with respect to the viewer's location, demographic group, or shopping history, or to have the commercials reduced in number or length or eliminated altogether to support certain business models.

In accordance with some embodiments, the video segment is identified and the offset time is determined by sampling a subset of the pixel data (or associated audio data) being displayed on the screen and then finding similar pixel (or audio) data in a content database. In accordance with other embodiments, the video segment is identified and the offset time is determined by extracting audio or image data associated with such video segment and then finding similar audio or image data in a content database. In accordance with alternative embodiments, the video segment is identified and the offset time is determined by processing the audio data associated with such video segment using known automated speech recognition techniques. In accordance with further alternative embodiments, the video segment is identified and the offset time is determined by processing metadata associated with such video segment.

As is described in more detail herein, the system for identifying video segments being viewed on a connected TV and, optionally, determining offset times, can reside on the television system of which the connected TV is a component. In accordance with alternative embodiments, one part of the software for identifying video segments resides on the television system and another part resides on a server connected to the television system via the Internet.

According to one embodiment of the invention, a method is provided. The method comprises receiving a plurality of known media content. The plurality of known media content has associated known content identifiers (i.e., cues). The method further comprises partitioning the plurality of known media content into a first index and a second index, and separating the first index into one or more first buckets. The first index is separated into first buckets using the known content identifiers that are associated with the known media content in the first index. The method further comprises separating the second index into one or more second buckets. The second index is separated into second buckets using the known content identifiers that are associated with the known media content in the second index. The method further comprises receiving unknown content identifiers corresponding to unknown media content being displayed by a media system, and concurrently searching the first buckets and the second buckets for the unknown content identifiers. The method further comprises selecting known media content from the first buckets or the second buckets. The selected known media content is associated with the unknown content identifiers. The method further comprises identifying the unknown media content as the known media content. The method may be implemented on a computer.

According to another embodiment of the invention, a system is provided. The system includes one or more processors. The system further includes a non-transitory machine-readable storage medium containing instructions which when executed on the one or more processors, cause the one or more processors to perform operations including the steps recited in the above method.

According to another embodiment of the invention, a computer program product tangibly embodied in a non-transitory machine-readable storage medium of a computing device may be provided. The computer program product may include instructions configured to cause one or more data processors to perform the steps recited in the above method.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed may be resorted to by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing together with other features and embodiments will become more apparent upon referring to the following specification, claims, and accompanying drawings.

BRIEF DESCRIPTION OF THE DRAWINGS

Illustrative embodiments of the present invention are described in detail below with reference to the following drawing figures, in which like reference numerals represent like components or parts throughout the several drawings.

DETAILED DESCRIPTION OF THE INVENTION

Figure 1:
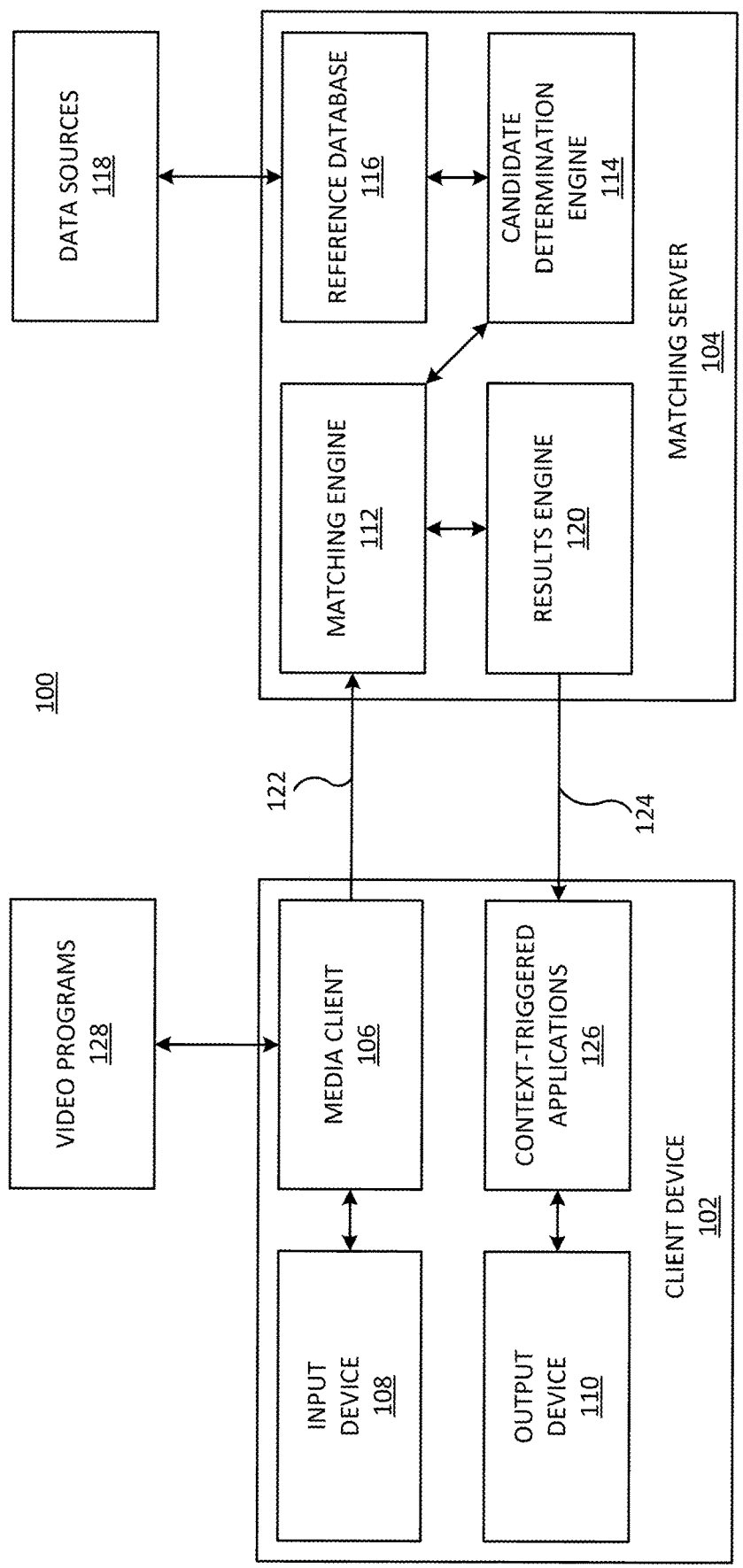
FIG. 1 is a block diagram of an example of a matching system for identifying media content being displayed by a media system according to embodiments of the invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, or other information may be passed, forwarded, or transmitted using any suitable means including memory sharing, message passing, token passing, network transmission, or other transmission technique.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Advancements in fiber optic and digital transmission technology have enabled the television industry to rapidly increase channel capacity and on a national basis be capable of providing thousands of channels of television programming and hundreds of thousands of channels of on-demand programming. To support national business models that involve monitoring millions of active television display systems and rapidly identifying, sometimes close to real time, so many thousands of broadcast channels and tens of thousands of on-demand content delivery systems, and to do so while utilizing commercially reasonable computing resources is an unmet need addressed by the systems and methods described herein.

As described in further detail below, certain aspects and features of the present disclosure relate to identifying unknown video segments by comparing unknown data points to one or more reference data points. The systems and methods described herein improve the efficiency of storing and searching large datasets that are used to identify the unknown video segments. For example, the systems and methods allow identification of the unknown data segments while reducing the density of the large datasets required to perform the identification. The techniques can be applied to any system that harvests and manipulates large volumes of data. Illustrative examples of these systems include automated content-based searching systems (e.g., automated content recognition for video-related applications or other suitable application), MapReduce systems, Bigtable systems, pattern recognition systems, facial recognition systems, classification systems, computer vision systems, data compression systems, cluster analysis, or any other suitable system. One of ordinary skill in the art will appreciate that the techniques described herein can be applied to any other system that stores data that is compared to unknown data. In the context of automated content recognition (ACR), for example, the systems and methods reduce the amount of data that must be stored in order for a matching system to search and find relationships between unknown and known data groups.

By way of example only and without limitation, some examples described herein use an automated audio and/or video content recognition system for illustrative purposes. However, one of ordinary skill in the art will appreciate that the other systems can use the same techniques.

A significant challenge with ACR systems and other systems that use large volumes of data can be managing the amount of data that is required for the system to function. Another challenge includes a need to build and maintain a database of known content to serve as a reference to match incoming content. Building and maintaining such a database involves collecting and digesting a vast amount (e.g., hundreds, thousands, or more) of content (e.g., nationally distributed television programs and an even larger amount of local television broadcasts among many other potential content sources). The digesting can be performed using any available technique that reduces the raw data (e.g., video or audio) into compressed, searchable data. With a 24-hour, seven-day-a-week operating schedule and a sliding window of perhaps two weeks of content (e.g., television programming) to store, the data volume required to perform ACR can build rapidly. Similar challenges can be present with other systems that harvest and manipulate large volumes of data, such as the example systems described above.

The central automated content recognition (ACR) system described herein is employed to detect and identify a video program currently being displayed on a remote client television system and can do so in close to real time to support certain business models. The media matching engine employs a media search index (e.g., hash table) that is divided into multiple segments, generally referred to as buckets. In some embodiments, cue data (e.g., content identifiers) are processed into independent indexes based on a plurality of decision factors such as by separating national content from local content, or separating the top 10% of the popular content from the remaining 90% of less popular content, or separating broadcast media from on-demand media, etc. Once separated, the unknown cue data from a client television system or other device may be tested by the central server against each index. Searching one or more indexes may be done in parallel (i.e., concurrently). The results of each index lookup (i.e., search) may be applied in parallel to a content matching system, such as the path pursuit system of U.S. Pat. No. 8,595,781 B2, incorporated by reference herein in its entirety.

The smaller datasets (i.e., buckets) may yield more accurate match results and, hence, enhance the search efficiency of the content matching system.

FIG. 1 illustrates a matching system 100 that can identify unknown content. In some examples, the unknown content can include one or more unknown data points. In such examples, the matching system 100 can match unknown data points with reference data points to identify unknown video segments associated with the unknown data points. The reference data points can be included in a reference database 116.

The matching system 100 includes a client device 102 and a matching server 104. The client device 102 includes a media client 106, an input device 108, an output device 110, and one or more contextual applications 126. The media client 106 (which can include a television system, a computer system, or other electronic device capable of connecting to the Internet) can decode data (e.g., broadcast signals, data packets, or other frame data) associated with video programs 128. The media client 106 can place the decoded contents of each frame of the video into a video frame buffer in preparation for display or for further processing of pixel information of the video frames. The client device 102 can be any electronic decoding system that can receive and decode a video signal. The client device 102 can receive video programs 128 and store video information in a video buffer (not shown). The client device 102 can process the video buffer information and produce unknown data points (which can referred to as "cues"), described in more detail below with respect to FIG. 3. The media client 106 can transmit the unknown data points to the matching server 104 for comparison with reference data points in the reference database 116.

The input device 108 can include any suitable device that allows a request or other information to be input to the media client 106. For example, the input device 108 can include a keyboard, a mouse, a voice-recognition input device, a wireless interface for receiving wireless input from a wireless device (e.g., from a remote controller, a mobile device, or other suitable wireless device), or any other suitable input device. The output device 110 can include any suitable device that can present or otherwise output information, such as a display, a wireless interface for transmitting a wireless output to a wireless device (e.g., to a mobile device or other suitable wireless device), a printer, or other suitable output device.

The matching system 100 can begin a process of identifying a video segment by first collecting data samples from known video data sources 118. For example, the matching server 104 collects data to build and maintain a reference database 116 from a variety of video data sources 118. The video data sources 118 can include media providers of television programs, movies, or any other suitable video source. Video data from the video data sources 118 can be provided as over-the-air broadcasts, as cable TV channels, as streaming sources from the Internet, and from any other video data source. In some examples, the matching server 104 can process the received video from the video data sources 118 to generate and collect reference video data points in the reference database 116, as described below. In some examples, video programs from video data sources 118 can be processed by a reference video program ingest system (not shown), which can produce the reference video data points and send them to the reference database 116 for storage. The reference data points can be used as described above to determine information that is then used to analyze unknown data points.

The matching server 104 can store reference video data points for each video program received for a period of time (e.g., a number of days, a number of weeks, a number of months, or any other suitable period of time) in the reference database 116. The matching server 104 can build and continuously or periodically update the reference database 116 of television programming samples (e.g., including reference data points, which may also be referred to as cues or cue values). In some examples, the data collected is a compressed representation of the video information sampled from periodic video frames (e.g., every fifth video frame, every tenth video frame, every fifteenth video frame, or other suitable number of frames). In some examples, a number of bytes of data per frame (e.g., 25 bytes, 50 bytes, 75 bytes, 100 bytes, or any other amount of bytes per frame) are collected for each program source. Any number of program sources can be used to obtain video, such as 25 channels, 50 channels, 75 channels, 100 channels, 200 channels, or any other number of program sources. Using the example amount of data, the total data collected during a 24-hour period over three days becomes very large. Therefore, reducing the number of actual reference data point sets is advantageous in reducing the storage load of the matching server 104.

The media client 106 can send a communication 122 to a matching engine 112 of the matching server 104. The communication 122 can include a request for the matching engine 112 to identify unknown content. For example, the unknown content can include one or more unknown data points and the reference database 116 can include a plurality of reference data points. The matching engine 112 can identify the unknown content by matching the unknown data points to reference data in the reference database 116. In some examples, the unknown content can include unknown video data being presented by a display (for video-based ACR), a search query (for a MapReduce system, a Bigtable system, or other data storage system), an unknown image of a face (for facial recognition), an unknown image of a pattern (for pattern recognition), or any other unknown data that can be matched against a database of reference data. The reference data points can be derived from data received from the video data sources 118. For example, data points can be extracted from the information provided from the video data sources 118 and can be indexed and stored in the reference database 116.

The matching engine 112 can send a request to the candidate determination engine 114 to determine candidate data points from the reference database 116. A candidate data point can be a reference data point that is a certain determined distance from the unknown data point. In some examples, a distance between a reference data point and an unknown data point can be determined by comparing one or more pixels (e.g., a single pixel, a value representing group of pixels (e.g., a mean, an average, a median, or other value), or other suitable number of pixels) of the reference data point with one or more pixels of the unknown data point. In some examples, a reference data point can be the certain determined distance from an unknown data point when the pixels at each sample location are within a particular pixel value range.

In one illustrative example, a pixel value of a pixel can include a red value, a green value, and a blue value (in a red-green-blue (RGB) color space). In such an example, a first pixel (or value representing a first group of pixels) can be compared to a second pixel (or value representing a second group of pixels) by comparing the corresponding red values, green values, and blue values respectively, and ensuring that the values are within a certain value range (e.g., within 0-5 values). For example, the first pixel can be matched with the second pixel when (1) a red value of the first pixel is within 5 values in a 0-255 value range (plus or minus) of a red value of the second pixel, (2) a green value of the first pixel is within 5 values in a 0-255 value range (plus or minus) of a green value of the second pixel, and (3) a blue value of the first pixel is within 5 values in a 0-255 value range (plus or minus) of a blue value of the second pixel. In such an example, a candidate data point is a reference data point that is an approximate match to the unknown data point, leading to multiple candidate data points (related to different media segments) being identified for the unknown data point. The candidate determination engine 114 can return the candidate data points to the matching engine 112.

For a candidate data point, the matching engine 112 can add a token into a bin that is associated with the candidate data point and that is assigned to an identified video segment from which the candidate data point is derived. A corresponding token can be added to all bins that correspond to identified candidate data points. As more unknown data points (corresponding to the unknown content being viewed) are received by the matching server 104 from the client device 102, a similar candidate data point determination process can be performed, and tokens can be added to the bins corresponding to identified candidate data points. Only one of the bins corresponds to the segment of the unknown video content being viewed, with the other bins corresponding to candidate data points that are matched due to similar data point values (e.g., having similar pixel color values), but that do not correspond to the actual segment being viewed. The bin for the unknown video content segment being viewed will have more tokens assigned to it than other bins for segments that are not being watched. For example, as more unknown data points are received, a larger number of reference data points that correspond to the bin are identified as candidate data points, leading to more tokens being added to the bin. Once a bin includes a particular number of tokens, the matching engine 112 can determine that the video segment associated with the bin is currently being displayed on the client device 102. A video segment can include an entire video program or a portion of the video program. For example, a video segment can be a video program, a scene of a video program, one or more frames of a video program, or any other portion of a video program.

Figure 2:
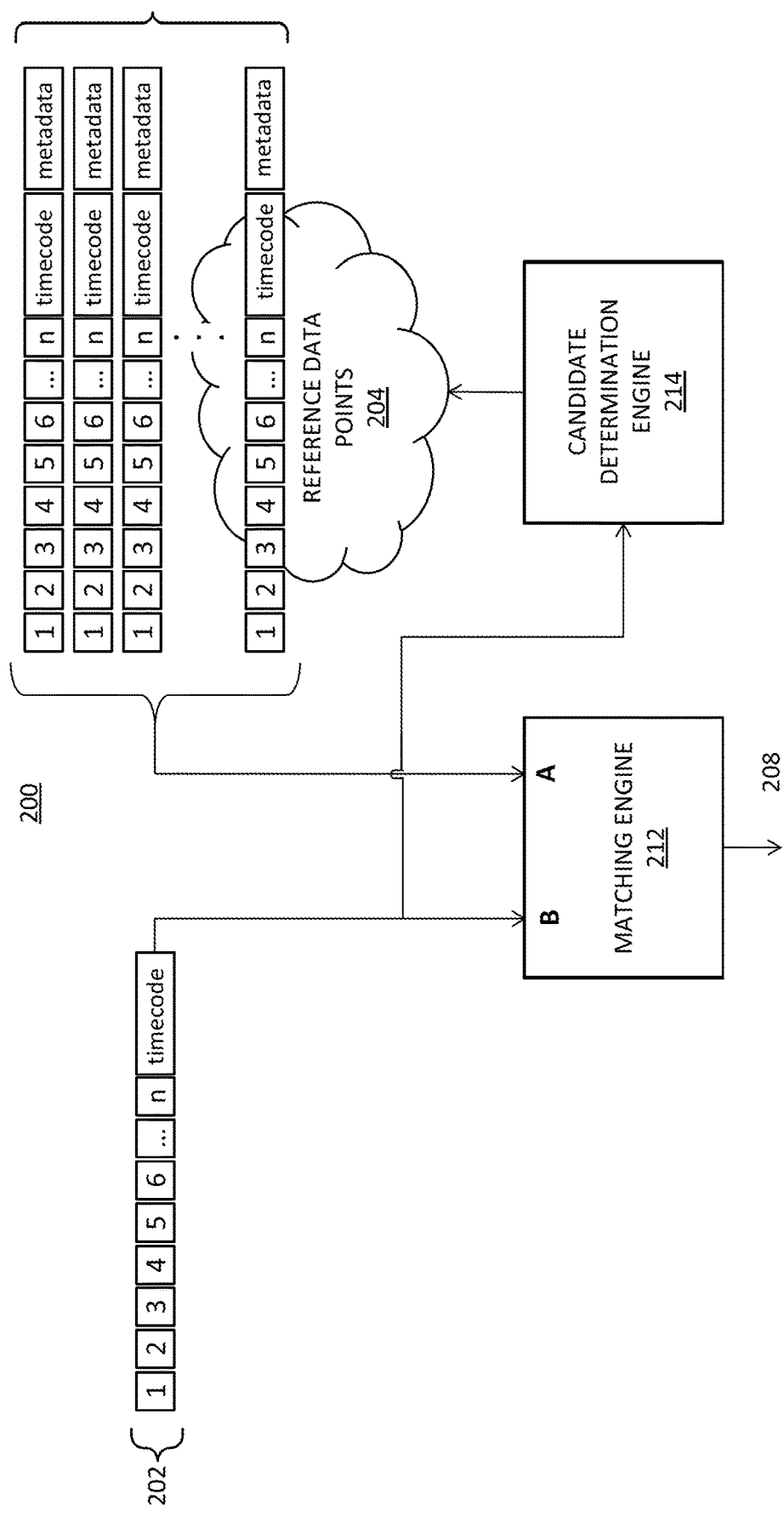
FIG. 2 is an example of a matching system identifying unknown data point according to embodiments of the invention.

FIG. 2 illustrates components of a matching system 200 for identifying unknown data. For example, the matching engine 212 can perform a matching process for identifying unknown content (e.g., unknown media segments, a search query, an image of a face or a pattern, or the like) using a database of known content (e.g., known media segments, information stored in a database for searching against, known faces or patterns, or the like). For example, the matching engine 212 receives unknown data content 202 (which can be referred to as a "cue") to be matched with a reference data point of the reference data points 204 in a reference database. The unknown data content 202 can also be received by the candidate determination engine 214, or sent to the candidate determination engine 214 from the matching engine 212. The candidate determination engine 214 can conduct a search process to identify candidate data points 206 by searching the reference data points 204 in the reference database. In one example, the search process can include a nearest neighbor search process to produce a set of neighboring values (that are a certain distance from the unknown values of the unknown data content 202). The candidate data points 206 are input to the matching engine 212 for conducting the matching process to generate a matching result 208. Depending on the application, the matching result 208 can include video data being presented by a display, a search result, a determined face using facial recognition, a determined pattern using pattern recognition, or any other result.

In determining candidate data points 206 for an unknown data point (e.g., unknown data content 202), the candidate determination engine 214 determines a distance between the unknown data point and the reference data points 204 in the reference database. The reference data points that are a certain distance from the unknown data point are identified as the candidate data points 206. In some examples, a distance between a reference data point and an unknown data point can be determined by comparing one or more pixels of the reference data point with one or more pixels of the unknown data point, as described above with respect to FIG. 1. In some examples, a reference data point can be the certain distance from an unknown data point when the pixels at each sample location are within a particular value range. As described above, a candidate data point is a reference data point that is an approximate match to the unknown data point, and because of the approximate matching, multiple candidate data points (related to different media segments) are identified for the unknown data point. The candidate determination engine 114 can return the candidate data points to the matching engine 112.

Figure 3:
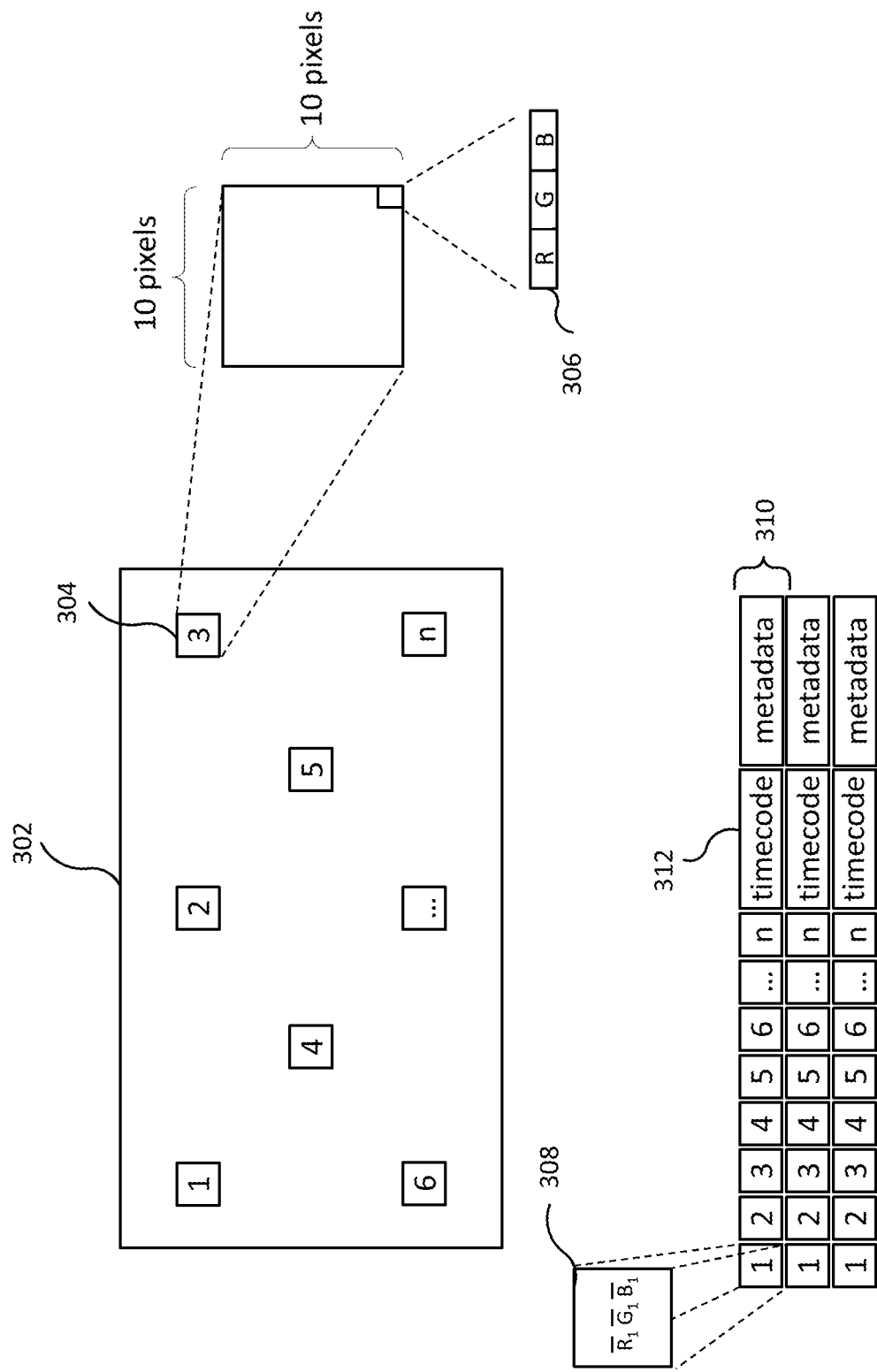
FIG. 3 is a block diagram of an example of a media capture system according to embodiments of the invention.

FIG. 3 illustrates an example of a video ingest capture system 400 including a memory buffer 302 of a decoder. The decoder can be part of the matching server 104 or the media client 106. The decoder may not operate with or require a physical television display panel or device. The decoder can decode and, when required, decrypt a digital video program into an uncompressed bitmap representation of a television program. For purposes of building a reference database of reference video data (e.g., reference database 316), the matching server 104 can acquire one or more arrays of video pixels, which are read from the video frame buffer. An array of video pixels is referred to as a video patch. A video patch can be any arbitrary shape or pattern but, for the purposes of this specific example, is described as a 10×10 pixel array, including ten pixels horizontally by ten pixels vertically. Also for the purpose of this example, it is assumed that there are 25 pixel-patch positions extracted from within the video frame buffer that are evenly distributed within the boundaries of the buffer.

An example allocation of pixel patches (e.g., pixel patch 304) is shown in FIG. 3. As noted above, a pixel patch can include an array of pixels, such as a 10×10 array. For example, the pixel patch 304 includes a 10×10 array of pixels. A pixel can include color values, such as a red, a green, and a blue value. For example, a pixel 306 is shown having Red-Green-Blue (RGB) color values. The color values for a pixel can be represented by an eight-bit binary value for each color. Other suitable color values that can be used to represent colors of a pixel include luma and chroma (Y, Cb, Cr) values or any other suitable color values.

A mean value (or an average value in some cases) of each pixel patch is taken, and a resulting data record is created and tagged with a time code (or time stamp). For example, a mean value is found for each 10×10 pixel patch array, in which case twenty-four bits of data per twenty-five display buffer locations are produced for a total of 600 bits of pixel information per frame. In one example, a mean of the pixel patch 304 is calculated, and is shown by pixel patch mean 308. In one illustrative example, the time code can include an "epoch time," which representing the total elapsed time (in fractions of a second) since midnight, Jan. 1, 1970. For example, the pixel patch mean 308 values are assembled with a time code 412. Epoch time is an accepted convention in computing systems, including, for example, Unix-based systems. Information about the video program, known as metadata, is appended to the data record. The metadata can include any information about a program, such as a program identifier, a program time, a program length, or any other information. The data record including the mean value of a pixel patch, the time code, and metadata, forms a "data point" (also referred to as a "cue"). The data point 310 is one example of a reference video data point.

Figure 4:
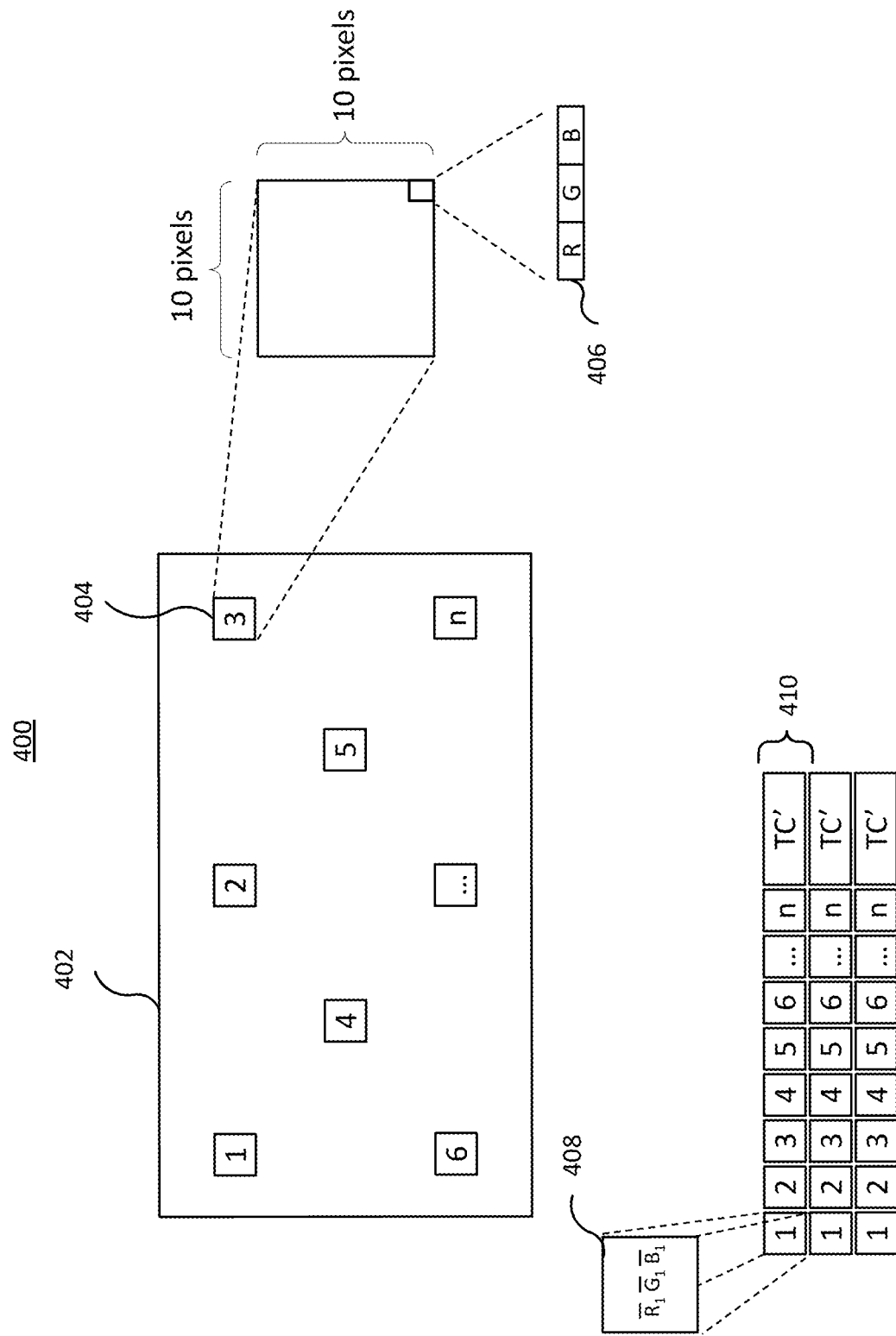
FIG. 4 is a block diagram of an example of a system for collecting media content presented by a display according to embodiments of the invention.

A process of identifying unknown video segments begins with steps similar to creating the reference database. For example, FIG. 4 illustrates a video ingest capture system 400 including a memory buffer 402 of a decoder. The video ingest capture system 400 can be part of the client device 102 that processes data presented by a display (e.g., on an Internet-connected television monitor, such as a smart TV, a mobile device, or other television viewing device). The video ingest capture system 400 can utilize a similar process to generate unknown video data point 410 as that used by system 300 for creating reference video data point 310. In one example, the media client 106 can transmit the unknown video data point 410 to the matching engine 112 to identify a video segment associated with the unknown video data point 410 by the matching server 104.

As shown in FIG. 4, a video patch 404 can include a 10×10 array of pixels. The video patch 404 can be extracted from a video frame being presented by a display. A plurality of such pixel patches can be extracted from the video frame. In one illustrative example, if twenty-five such pixel patches are extracted from the video frame, the result will be a point representing a position in a 75-dimension space. A mean (or average) value can be computed for each color value of the array (e.g., RGB color value, Y, Cr, Cb color values, or the like). A data record (e.g., unknown video data point 410) is formed from the mean pixel values and the current time is appended to the data. One or more unknown video data points can be sent to the matching server 104 to be matched with data from the reference database 116 using the techniques described above.

Figure 5:
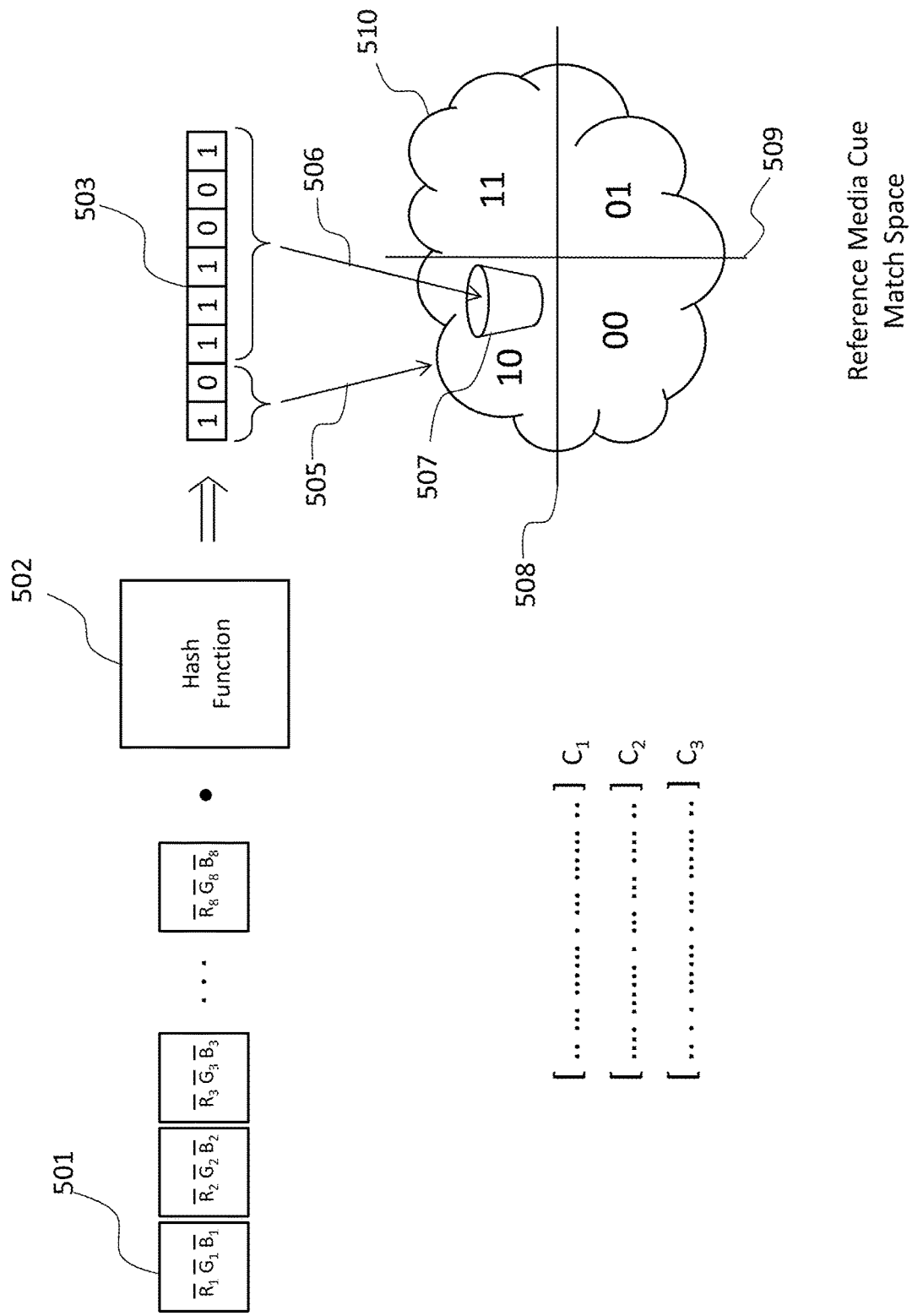
FIG. 5 is a diagram showing the processing path of cue data according to embodiments of the invention.

According to some embodiments of the invention, the size of the data being searched is reduced to produce a more efficient method of searching said data. A block diagram of the process of generating an index is illustrated in FIG. 5, in which incoming cues in the form of average pixel values of a region of the video frame 501 are processed by a hash function 502, generating a value 503 that is stored in a database 510. The database 510 is divided into four sections by vectors 508 and 509. The result of applying the hash function 502 is used to address the storage area. In this example, the two most significant bits 505 determine a storage space (i.e., a vector space), in this case, the storage space associated with bits 10 in the upper left quadrant. The remaining bits 506 address a subdivision of the storage space. In this example, the lower six bits 506 address one of 64 subdivisions, also known as buckets 507.

Figure 7:
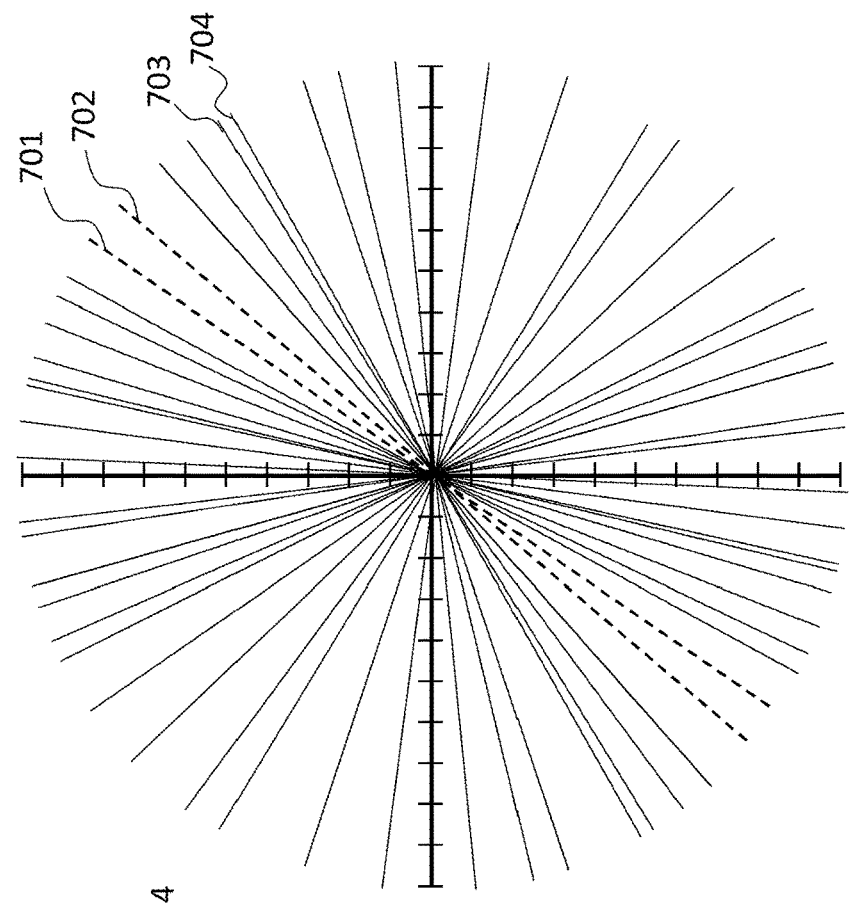
FIG. 7 is a graphic plot of a vector map laid out using more evenly spaced pseudo-random projections according to embodiments of the invention.
Figure 6:
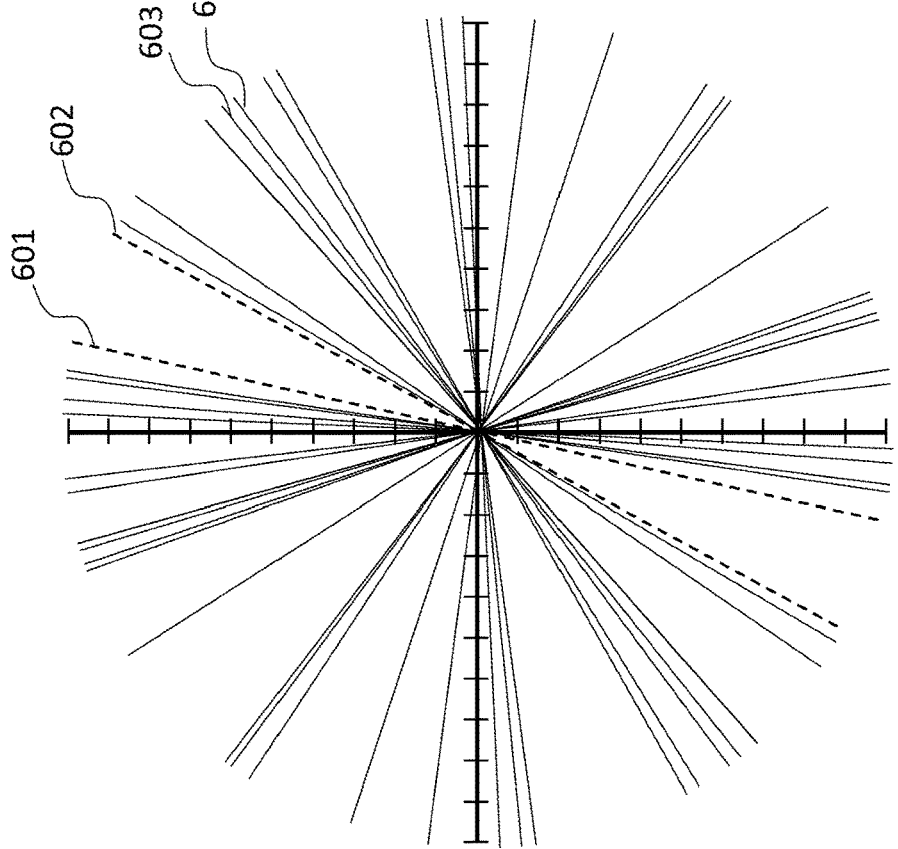
FIG. 6 is a graphic plot of a vector map laid out using excessively clustered pseudo-random projections according to embodiments of the invention.

The process of subdividing a database suitable for ACR is further illustrated in FIGS. 6 and 7. In FIG. 6, a process is diagrammed for plotting pseudo-randomly generated vectors dividing the Cartesian space in preparation for use in addressing a large media cue database. The vectors may be Monte Carlo-generated, in one embodiment. In this example, the pseudo-random process did not plot a sufficiently evenly distributed set of vectors. This is apparent in examining the angular difference between vector 601 and vector 602 as compared to the angular difference between vector 603 and vector 604.

In FIG. 7, the vectors can be seen to be considerably more evenly distributed as shown by examining the angular difference between vector 701 and vector 702 as compared to the angular difference between vector 703 and vector 704. The vectors may be Monte Carlo-generated, in one embodiment. This process can be quantified and measured automatically or simply by observation, as will be appreciated by one skilled in the art. Once a random set of projections is found, the process does not need to be repeated.

Figure 9:
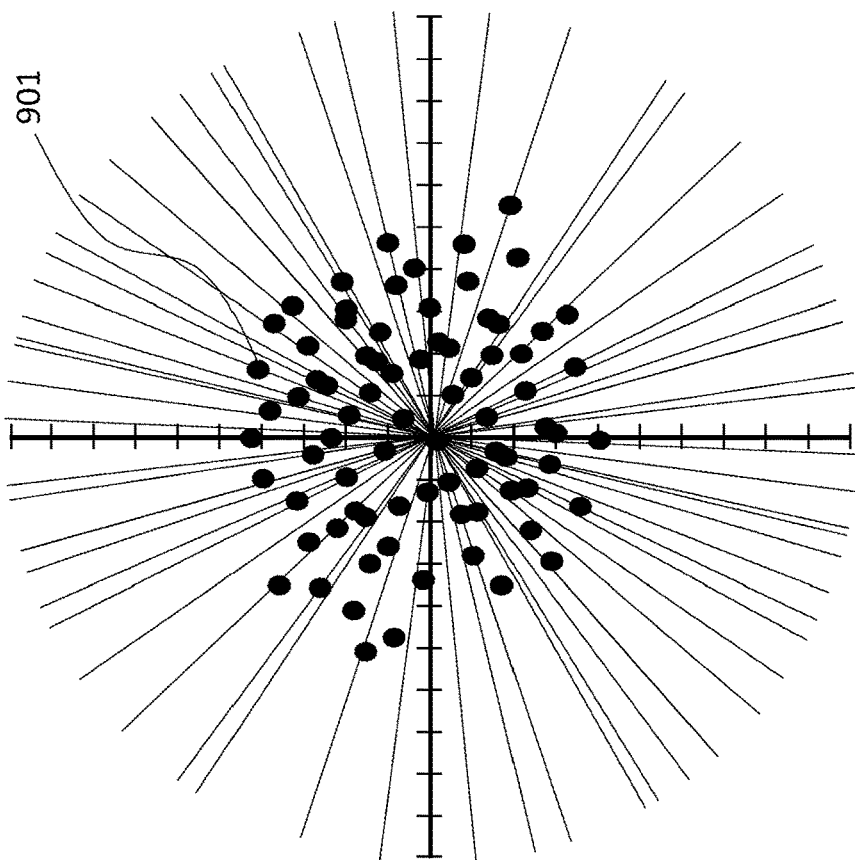
FIG. 9 illustrates clustered cue data that is centered on the randomly generated vectors using a mathematical offset function according to embodiments of the invention.
Figure 8:
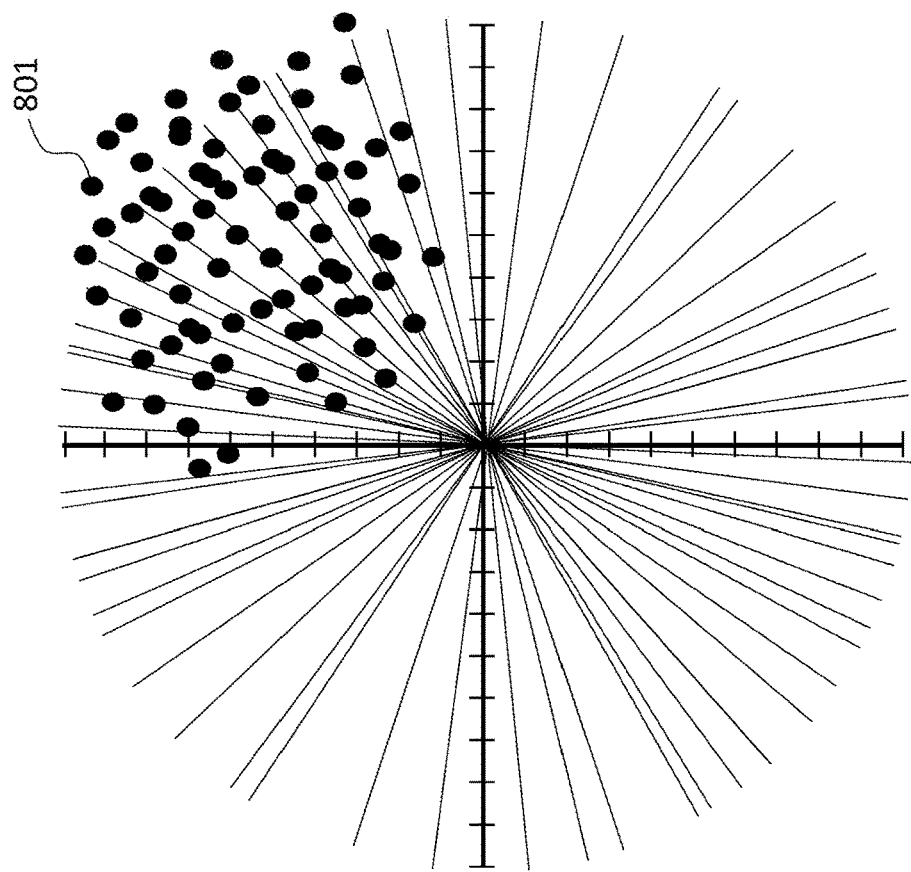
FIG. 8 illustrates clustered cue data that is not centered on the randomly generated vectors according to embodiments of the invention.

A subsequent step in preparing the storage and search space of an ACR system involves normalizing the address space to be centered on a representative selection of data samples. FIG. 8 illustrates a dataset of cue data 801 that is not centered in the vector space in which it is represented. The offset of this data in the search space may result in less accuracy in finding matching data in an ACR system. Consequently, a process may be applied to the values of the dataset such that the cue data 901 is centered in the vector space, as illustrated in FIG. 9.

Figure 11:
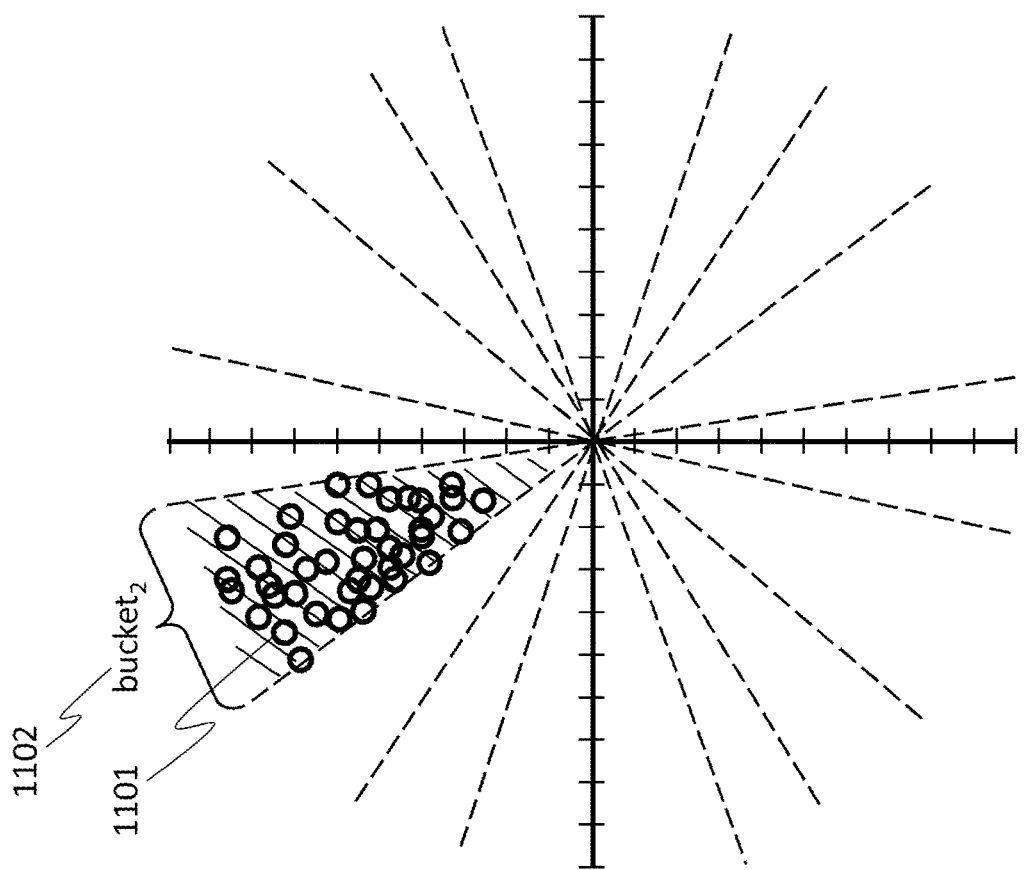
FIG. 11 is a graphic plot illustrating a high number of cue points in the bucket according to embodiments of the invention.
Figure 10:
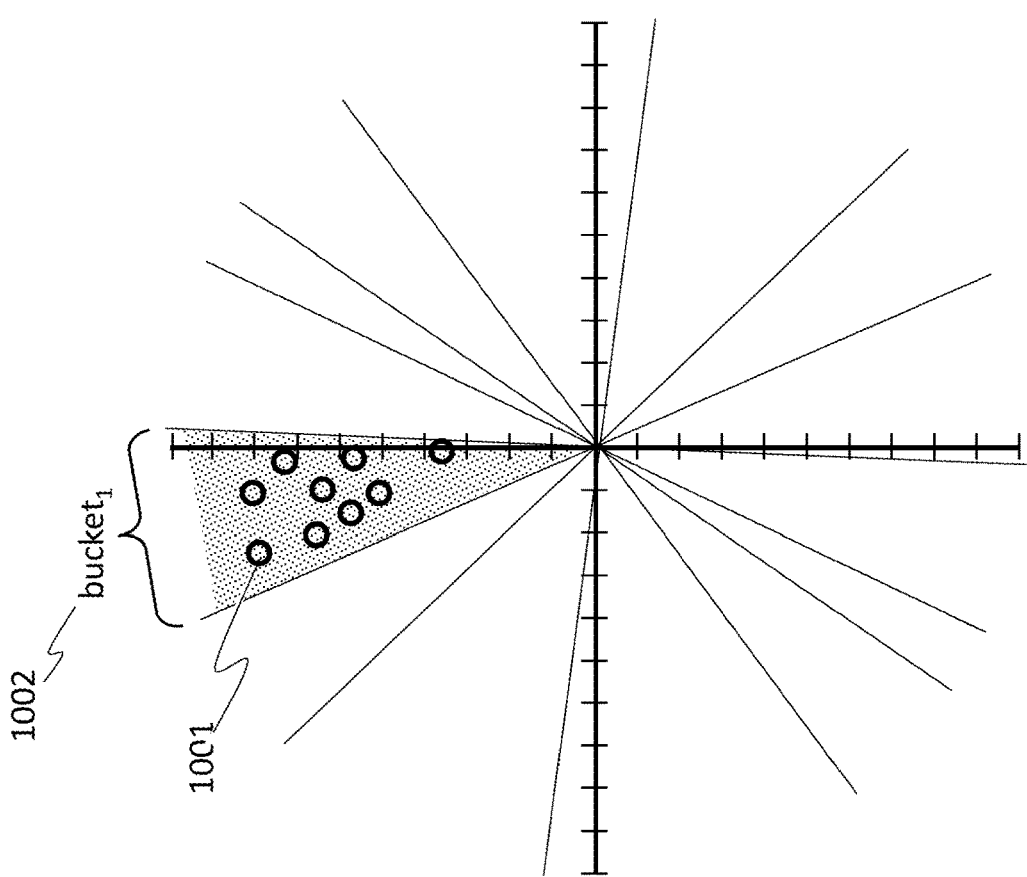
FIG. 10 is a graphic plot illustrating a moderate number of cue points in the area between two vectors known as a "bucket", which used by embodiments of the invention to locate candidate matching cues.

A further consideration in optimizing a dataset of cue data for ACR purposes involves considering data density found in each bucket of the database. For example, in FIG. 10, a bucket 1002 is illustrated containing a moderate number of data items 1001, which represents an ideal data density. In contrast, FIG. 11 illustrates another vector space with a bucket 1102 that contains an excess of data items 1101. According to some embodiments, when this process is employed as part of a media matching engine, the data is discarded and the search continues when buckets are encountered that are excessively full, albert delayed in finding a result.

Figure 12:
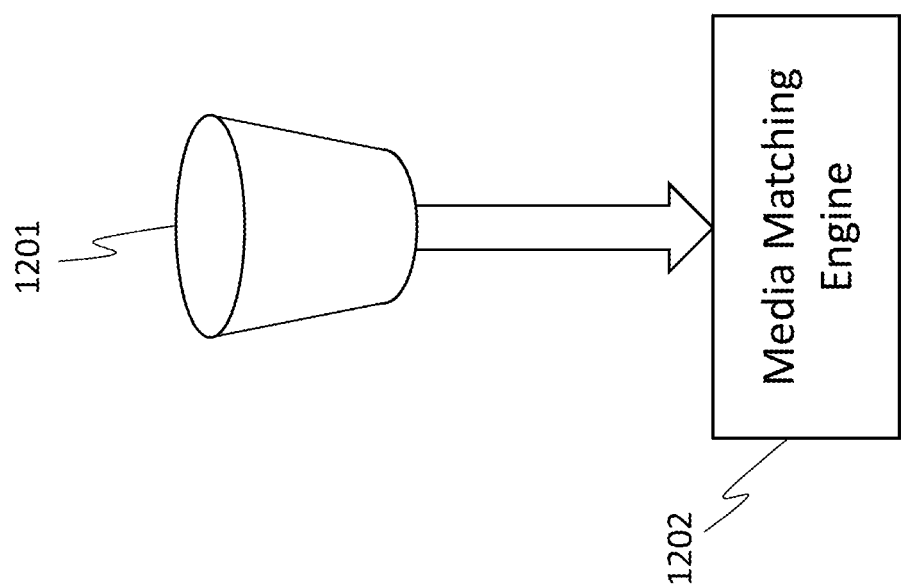
FIG. 12 is a graphical representation of a bucket that is searched for match candidates, which are supplied to the media matching engine according to embodiments of the invention.

FIG. 12 is an illustration of a system that may involve storing all reference data (such as, for example, video data cues) into an addressing scheme involving a single bucket 1201 per address space segment. The single bucket approach provides the search space for locating candidate match data (i.e., "suspects"), for use by the media matching engine 1202. Depending on the number of media sources, it is possible that a large number of buckets will be excessively full and reduce the accuracy of the ACR system, resulting in additional false positive matches or missed opportunities to find a match. Additionally, the computational load of the entire system is increased which may result in delays for producing matching results, which can degrade or even disable the functionality of certain features or business models.

Figure 13:
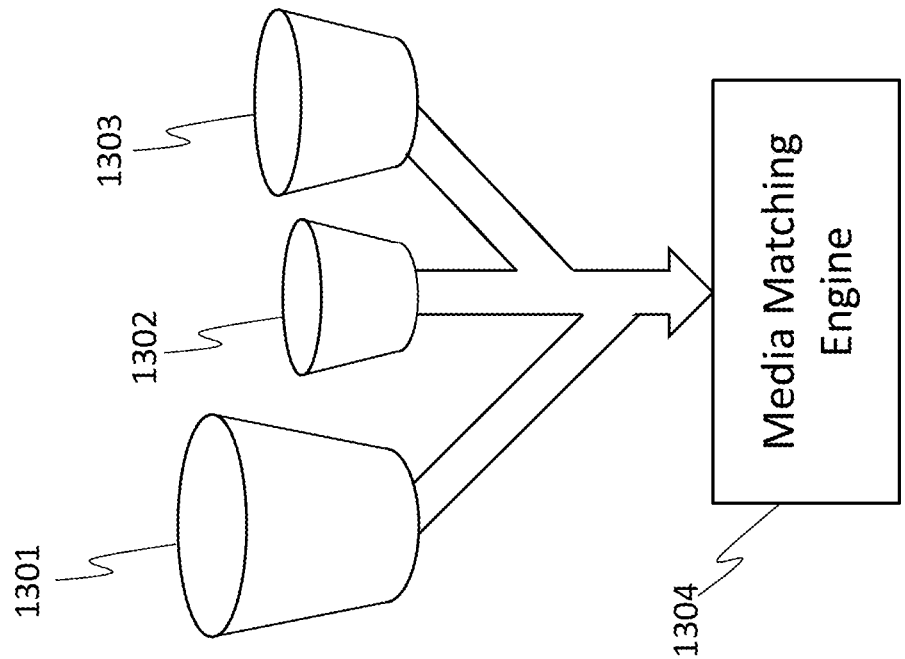
FIG. 13 is a graphical representation of different sized buckets that can be searched concurrently or in parallel, each bucket feeding into the media matching engine according to embodiments of the invention.

Embodiments of the invention provide multiple methods of optimizing data storage such that undesirable bucket fullness is minimized. By way of example, a representation of an embodiment of the invention is shown in FIG. 13. In FIG. 13, multiple buckets 1301-1303 are employed to represent subdivisions of the data separated by, in this illustrated example, media type or regional considerations. This multiple bucket approach also provides the search spaces for locating candidate match data for use by the media matching engine 1304.

Figure 14:
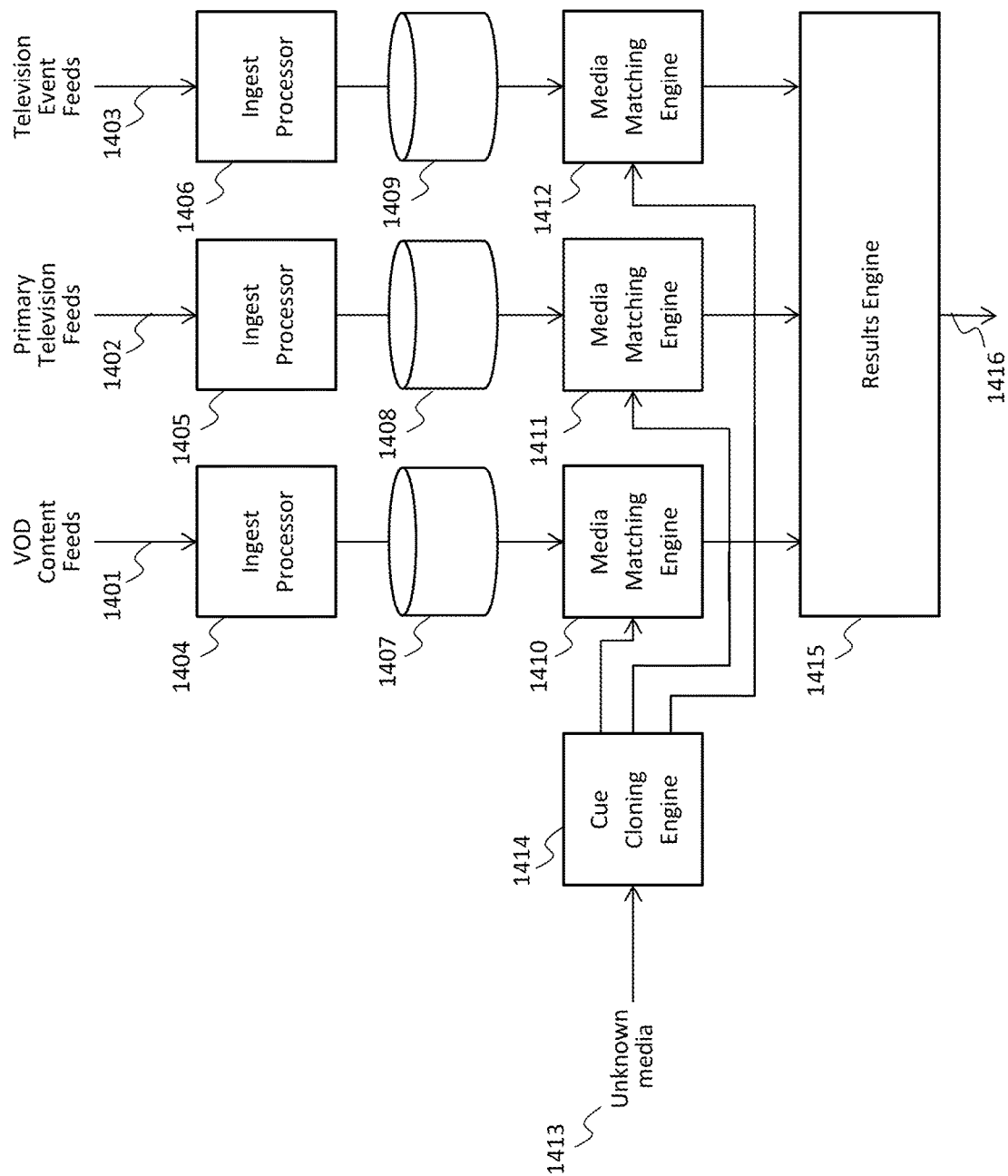
FIG. 14 is a diagram of an interactive television system and related server systems for processing video cues in which media types are processed into individual indexes that are searched by individual media matching processes to produce separate outputs according to embodiments of the invention.

In a specific example of separating data for more efficient storage, FIG. 14 illustrates a system in which video on demand (VOD) content feeds 1401 are supplied to an ingest processor 1404 that extracts cues, indexes the cues and stores the results in a database 1407. Similarly, primary television feeds 1402 are supplied to an ingest processor 1405 that extracts cues, indexes the cues, and stores the results in a database 1408. Television event feeds 1403 are supplied to an ingest processor 1406 that extracts cues, indexes the cues and stores the results in a database 1409. VOD content feeds 1401, primary television feeds 1402, and television event feeds 1403 may be collectively referred to as "known content". The television event feeds 1403 may be, for example, television advertisements to be detected by the system of FIG. 14 for the purpose of targeted advertising which requires accurate and timely detection of the event. Likewise, television event feeds 1403 may include programming that has associated interactive content to be displayed during certain program scenes, a process also requiring accuracy and a real-time response.

In this example, each type of programming 1401-1403 is processed in parallel (i.e., concurrently) with the unknown media 1413 being displayed on a media system. However, in other embodiments, the programming 1401-1403 may be processed prior to receiving the unknown media 1413. The unknown media 1413 is replicated by the cue cloning engine 1414. The unknown cues (i.e., the unknown content identifiers) may then be provided to independent media matching engines 1410-1412. Media matching engines 1410-1412 may be similar to matching engine 112 of FIG. 1. Media matching engine 1410 may compare the unknown cues to the cues associated with the VOD content feeds 1401. Media matching engine 1411 may compare the unknown cues to the cues associated with the primary television feeds 1402. Media matching engine 1412 may compare the unknown cues to the cues associated with television event feeds 1403. Each media matching engine 1410-1412 may select one or more matches (e.g., one match per bucket) and provide the matches to results engine 1415. Results engine 1415 may be similar to results engine 120 of FIG. 1. Results engine 1415 accumulates and processes the matches and determines a final result 1416. The final result 1416 may be stored in a database, used for a programming census, and/or used to provide contextually targeted information, as described further herein.

Figure 15:
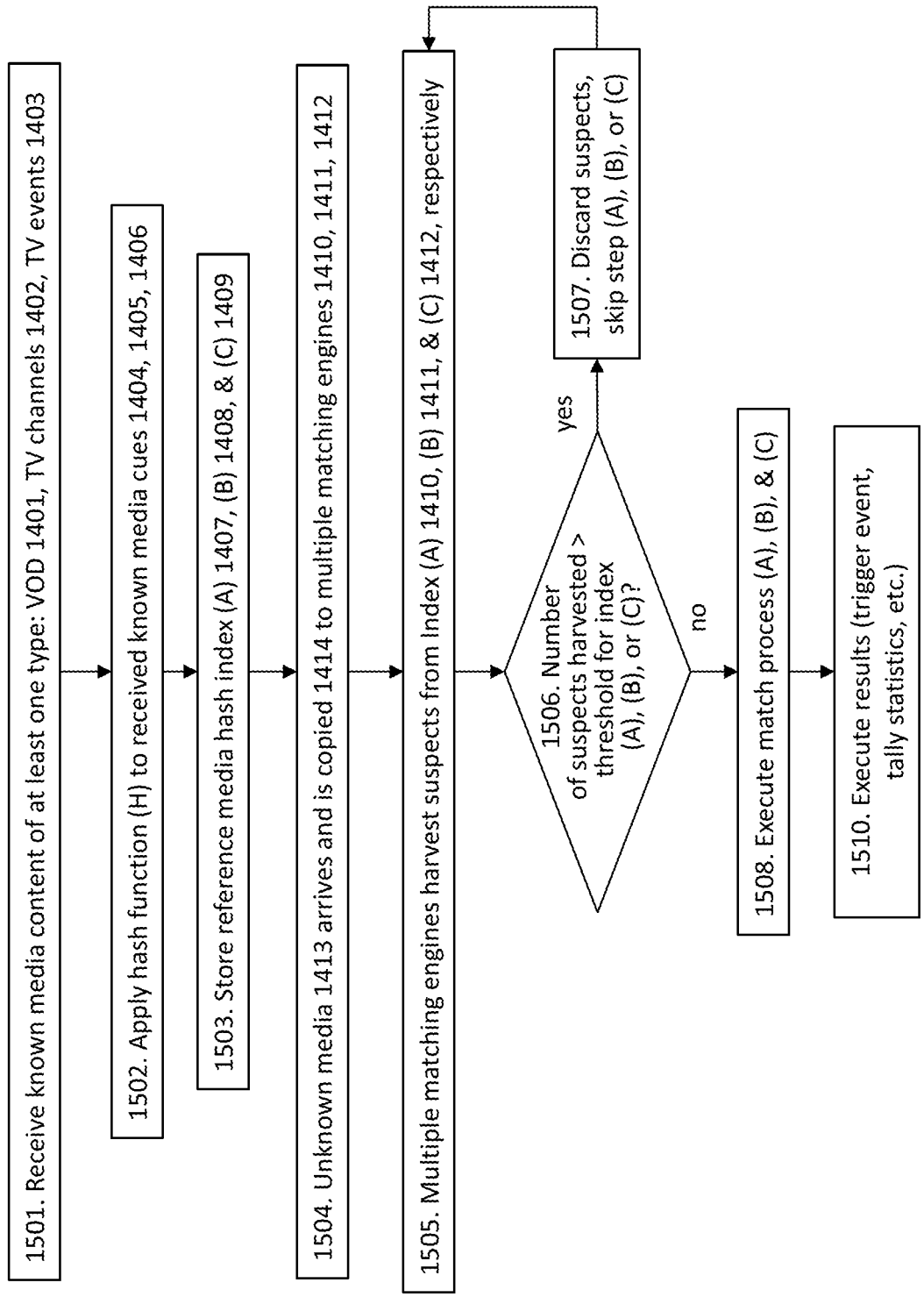
FIG. 15 is a flow diagram of a method for processing video cues in which media types are processed into individual indexes that are searched by individual media matching processes to produce separate outputs according to embodiments of the invention.

A method that may be employed by the system of FIG. 14 is described with reference to the flowchart of FIG. 15. At step 1501, known media content of at least one type is received (e.g., VOD content feeds 1401, primary television feeds 1402, television event feeds 1403, etc.). At step 1502, a hash function is applied to the cues associated with the known media content generated by ingest processors 1404-1406, and the known cues are indexed. At step 1503, the hashed cue indexes are stored in respective databases 1407-1409.

At step 1504, unknown media content 1413 is received, its cues are copied by cue cloning engine 1414, and the unknown cues are provided to media matching engines 1410-1412. At step 1506, it is determined whether the number of suspects (i.e., matches) harvested is greater than a threshold for any of the indexes (i.e., for the indexes of cues associated with VOD content feeds 1401, primary television feeds 1402, and/or television event feeds 1403). If the number of suspects harvested is greater than the threshold, those suspects are discarded at step 1507 and the method returns to step 1505. Step 1507 may be performed because, for example, a high number of suspects may include a high number of false positives. If the number of suspects harvested is not greater than the threshold, then a match process is executed between the unknown media content cues and the known media content cues at step 1508, resulting in identification of matching known media content. At step 1510, results are executed based on the identification of the matching known media content, such as an event being triggered (e.g., display of contextually targeted information), statistics being tallied, etc.

Figure 16:
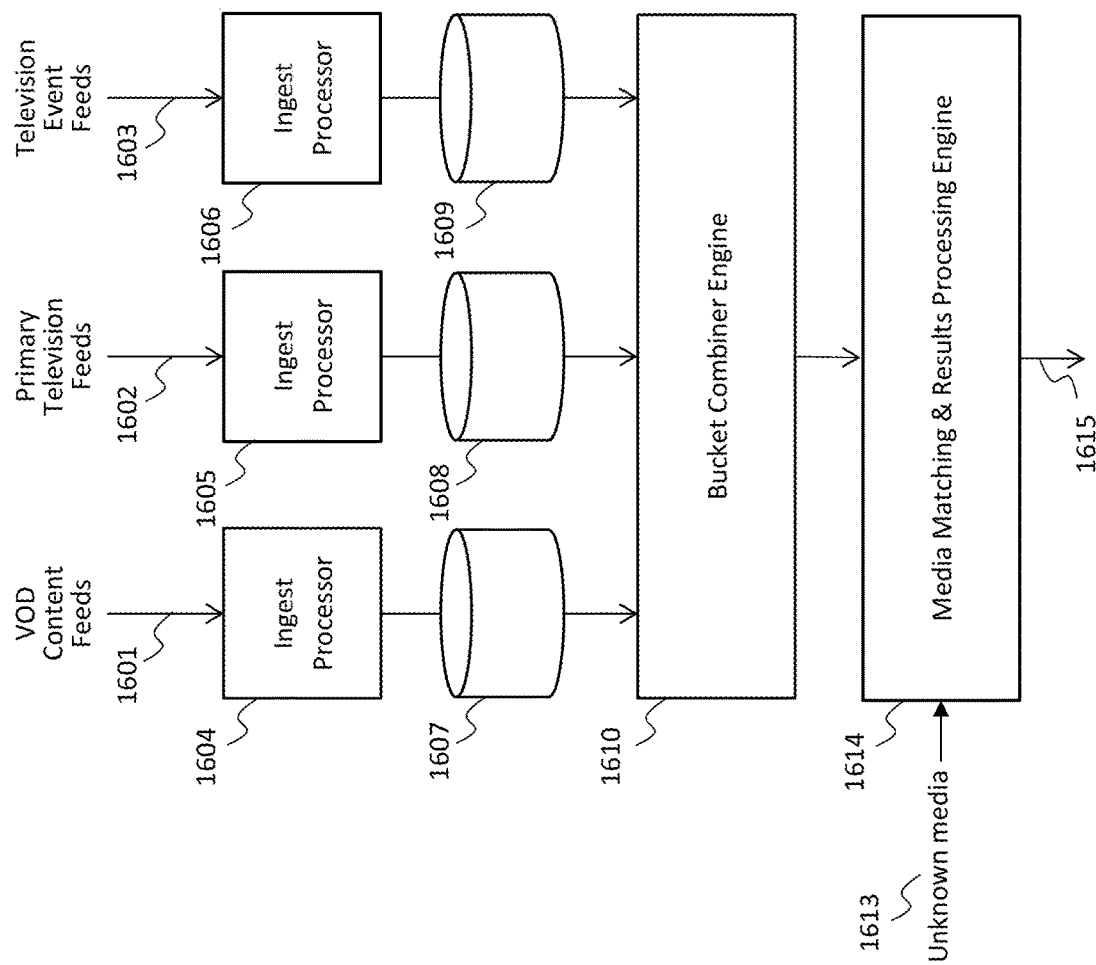
FIG. 16 is a diagram of an interactive television system and related server systems for processing video cues in which media types are processed into individual indexes and combined before being searched by a media matching process according to embodiments of the invention.

Another example of optimizing an ACR system is illustrated in FIG. 16. In FIG. 16, VOD content feeds 1601, primary television feeds 1602, and television event feeds 1603 are separately processed by ingest processors 1604-1606 (e.g., cued, indexed, and separated into buckets) and stored in individual databases 1607-1609. Instead of further processing the data independently, the embodiment of FIG. 16 addresses the buckets independently, then combines them with a bucket combiner engine 1610. If a bucket is excessively full, it may be rejected and not combined with the other buckets according to one embodiment.

Unknown media 1613 being displayed by a media system is provided to media matching & results processing engine 1614. From the combined bucket, media matching & results processing engine 1614 extracts suspects and performs the matching process using a path pursuit system, for example, to find match results 1615. Media matching & results processing engine 1614 may be similar to matching engine 112 and results engine 120 of FIG. 1, for example. The embodiment of FIG. 16 is advantageous in that buckets are combined after each bucket is examined for fullness and rejected if above a predetermined threshold. Using the independent data groupings of feeds 1601-1603, the system of FIG. 16 achieves increased accuracy and reduced processing requirements.

Figure 17:
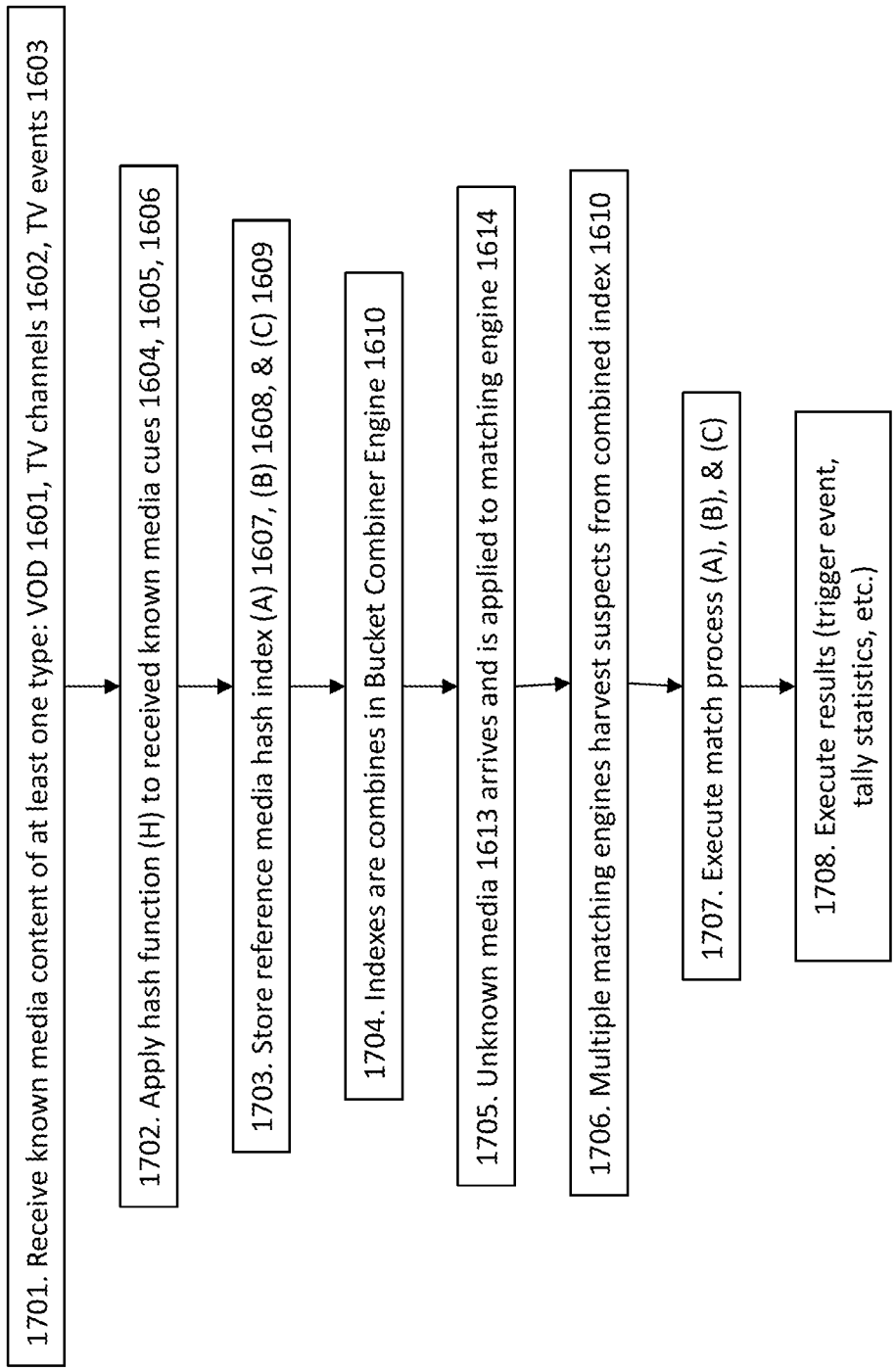
FIG. 17 is a flow diagram of a method for processing video cues in which media types are processed into individual indexes that are combined prior to being searched by a media matching process according to an embodiment of the invention.

A method that may be employed by the system of FIG. 16 is described with reference to the flowchart of FIG. 17. At step 1701, known media content of at least one type is received (e.g., VOD content feeds 1601, primary television feeds 1602, television event feeds 1603, etc.). At step 1702, a hash function is applied to the cues associated with the known media content generated by ingest processors 1604-1606, and the known cues are indexed and bucketed. At step 1703, the hashed cue indexes are stored in respective databases 1607-1609. At step 1704, the indexes are combined by a bucket combiner engine 1610.

At step 1705, unknown media content 1613 is received, its cues are copied, and the unknown cues are provided to a media matching engine 1614. At step 1706, the media matching engine 1614 harvests suspects from the combined bucket, and executes a match process between the known and unknown cues at step 1707 to identify a match. At step 1708, results are executed based on the identification of the matching known media content, such as an event being triggered (e.g., display of contextually targeted information), statistics being tallied, etc.

Figure 18:
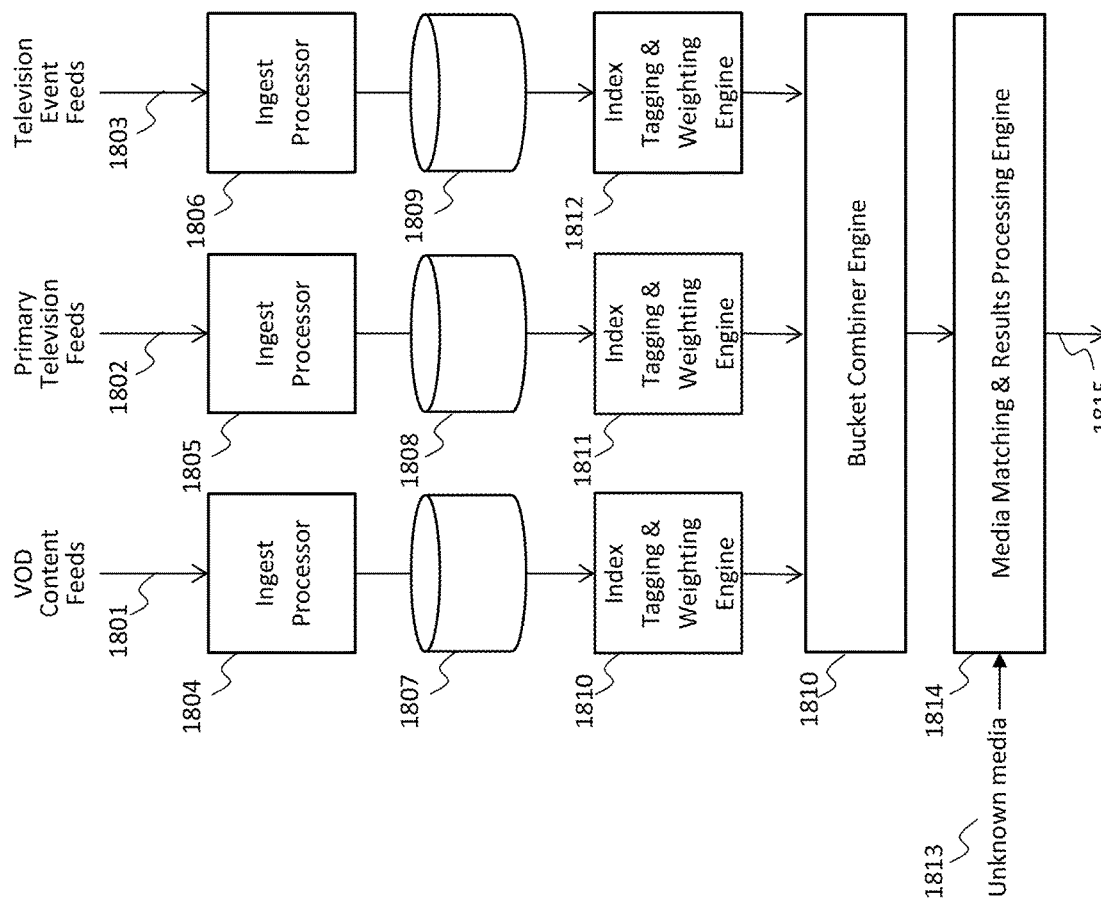
FIG. 18 is a diagram of an interactive television system and related server systems for processing video cues in which media types are processed into individual indexes that are individually tagged and weighted before being searched by a media matching process according to embodiments of the invention.

Another embodiment of the invention is illustrated in FIG. 18. In FIG. 18, VOD content feeds 1801, primary television feeds 1802, and television event feeds 1803 are separately processed by ingest processors 1804-1806 (e.g., cued, indexed, and separated into buckets) and stored in individual databases 1807-1809. According to this embodiment, the indexes are independently tagged and weighted by index tagging & weighting engines 1810-1812. The tagged, weighted and bucketed cues are then combined with their respective tags using a bucket combiner engine 1810. If a bucket is excessively full, it may be rejected and not combined with the other buckets according to one embodiment.

Unknown media 1813 being displayed by a media system is provided to media matching & results processing engine 1814. Media matching & results processing engine 1814 may be similar to matching engine 112 and results engine 120 of FIG. 1, for example. From the combined bucket, media matching & results processing engine 1814 extracts suspects and performs the matching process using path pursuit system, for example, to find match results 1815. Results 1815 have the further advantage of the weighting function being applied to the index. The embodiment of FIG. 18 is advantageous in that buckets are combined after each bucket is examined for fullness and rejected if above a predetermined threshold. By using the independent data groupings of feeds 1801-1803, the system of FIG. 18 achieves increased accuracy and reduced processing requirements. Additionally, the tag information attached to the respective index of the match result can be evaluated to provide prioritization of actions upon positive identification of the match result.

Figure 19:
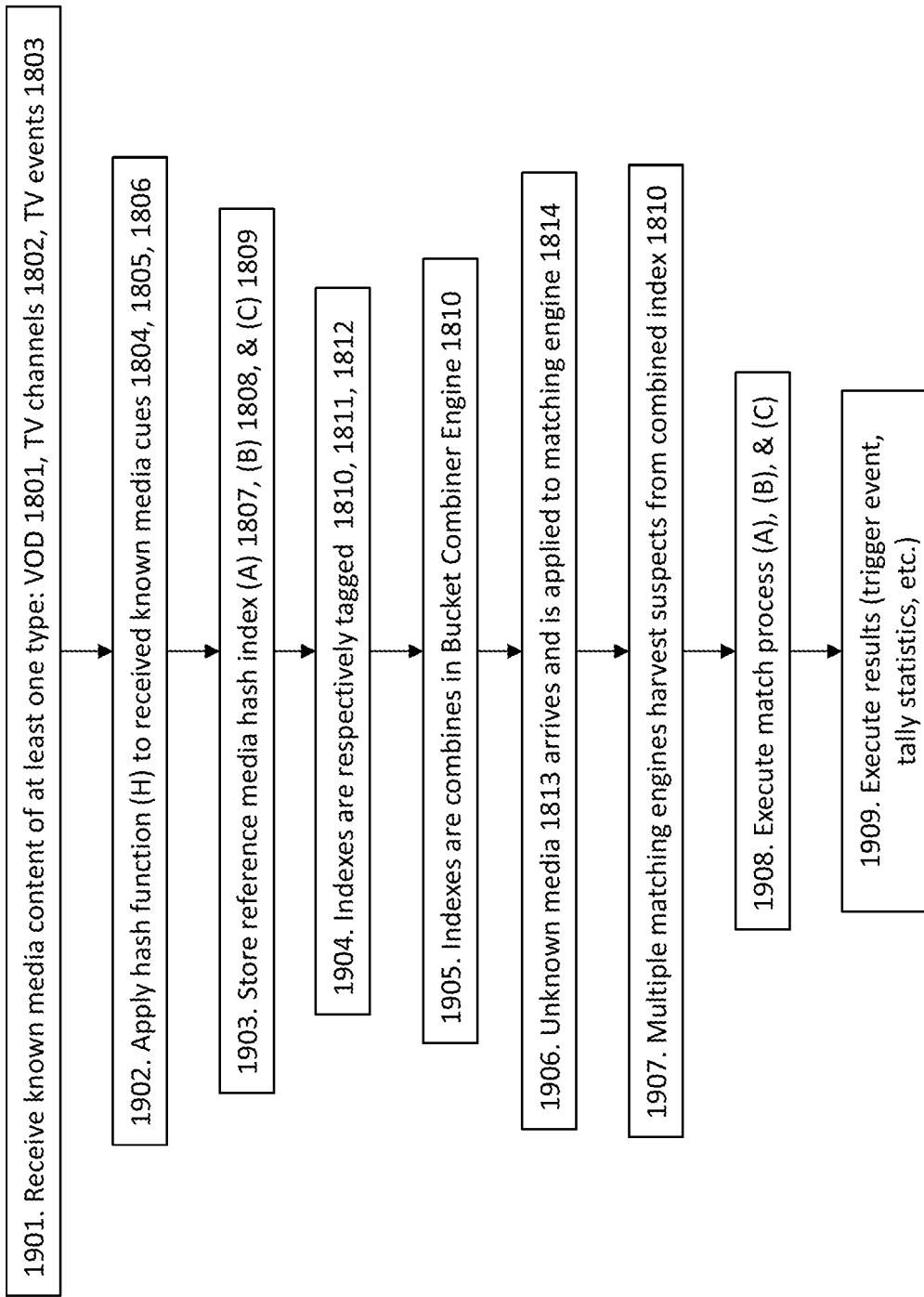
FIG. 19 is a flow diagram of a method for processing video cues in which media types are processed into individual indexes that are individually tagged and weighted prior to being searched by a media matching process according to embodiments of the invention.

A method that may be employed by the system of FIG. 18 is described with reference to the flowchart of FIG. 19. At step 1901, known media content of at least one type is received (e.g., VOD content feeds 1801, primary television feeds 1802, television event feeds 1803, etc.). At step 1902, a hash function is applied to the cues associated with the known media content generated by ingest processors 1804-1806, and the known cues are indexed and bucketed. At step 1903, the hashed cue indexes are stored in respective databases 1807-1809. At step 1904, the indexes are tagged and weighted by index tagging & weighting engines 1810-1812. At step 1905, the indexes are combined by a bucket combiner engine 1810.

At step 1906, unknown media content 1813 is received, its cues are copied, and the unknown cues are provided to a media matching engine 1814. At step 1907, the media matching engine 1814 harvests suspects from the combined bucket, and executes a match process between the known and unknown cues at step 1908 to identify a match. At step 1909, results are executed based on the identification of the matching known media content, such as an event being triggered (e.g., display of contextually targeted information), statistics being tallied, etc.

Figure 20:
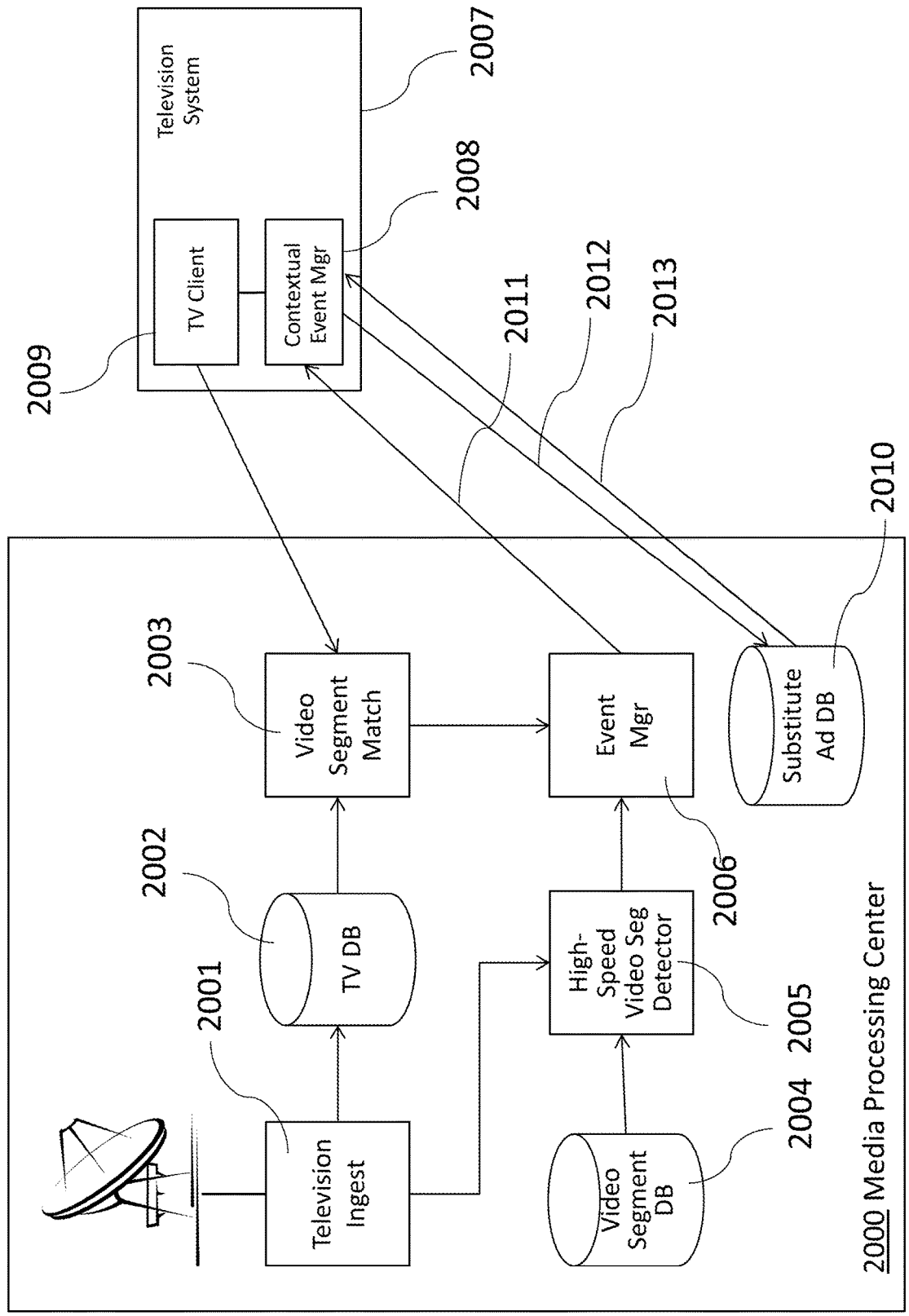
FIG. 20 is a diagram of a media processing center that detects television advertisements according to embodiments of the invention.

FIG. 20 is a diagram of a media processing center 2000 that detects television advertisements according to embodiments of the invention. The media processing center 2000 may be a central server, for example. The media processing center 2000 receives reference television program information at television ingest 2001 from participating content sources. The television programming may be processed and stored, such as by television database 2002. It is contemplated that the programming may be provided by a multichannel video program distributor (MVPD) both cable- and satellite-based, as well as by sources distributing content by way of the Internet.

In this specific example of television advertisement substitution, the system of FIG. 20 employs a second reference database (i.e., video segment database 2004) used in conjunction with a high-speed video segment detector 2005 for detecting special events such as television advertisements that are candidates for substitution. These events are detected by event manager 2006, which maintains a list of candidate video segments (e.g., television advertisements), and issues instructions to television system 2007 when a video segment is detected. Contextual event manager 2008 receives the instructions that are to be executed by television system 2007 on command.

The television client 2009 extracts media cues, either video or audio or both, from the displaying television programming. The media cues are transmitted via a network to video segment match engine 2003 of media processing center 2000. If a match is found to a special video segment, a message 2011 is issued to all enrolled televisions that are currently displaying the video segment (e.g., television system 2007 via contextual event manager 2008). Upon receipt of message 2011, contextual event manager 2008 retrieves the previously supplied address of a television advertisement that is to be substituted along with a substitution time and duration. Contextual event manager 2008 then addresses the substitute advertisement database 2010 at 2012 at the supplied start time which then streams the addressed substitute advertisement 2013 to television system 2007. At the end of the substitution period as conveyed by event manager 2006, television system 2007 switches back to the original television program that was playing at the start of the substitution sequence.

Figure 21:
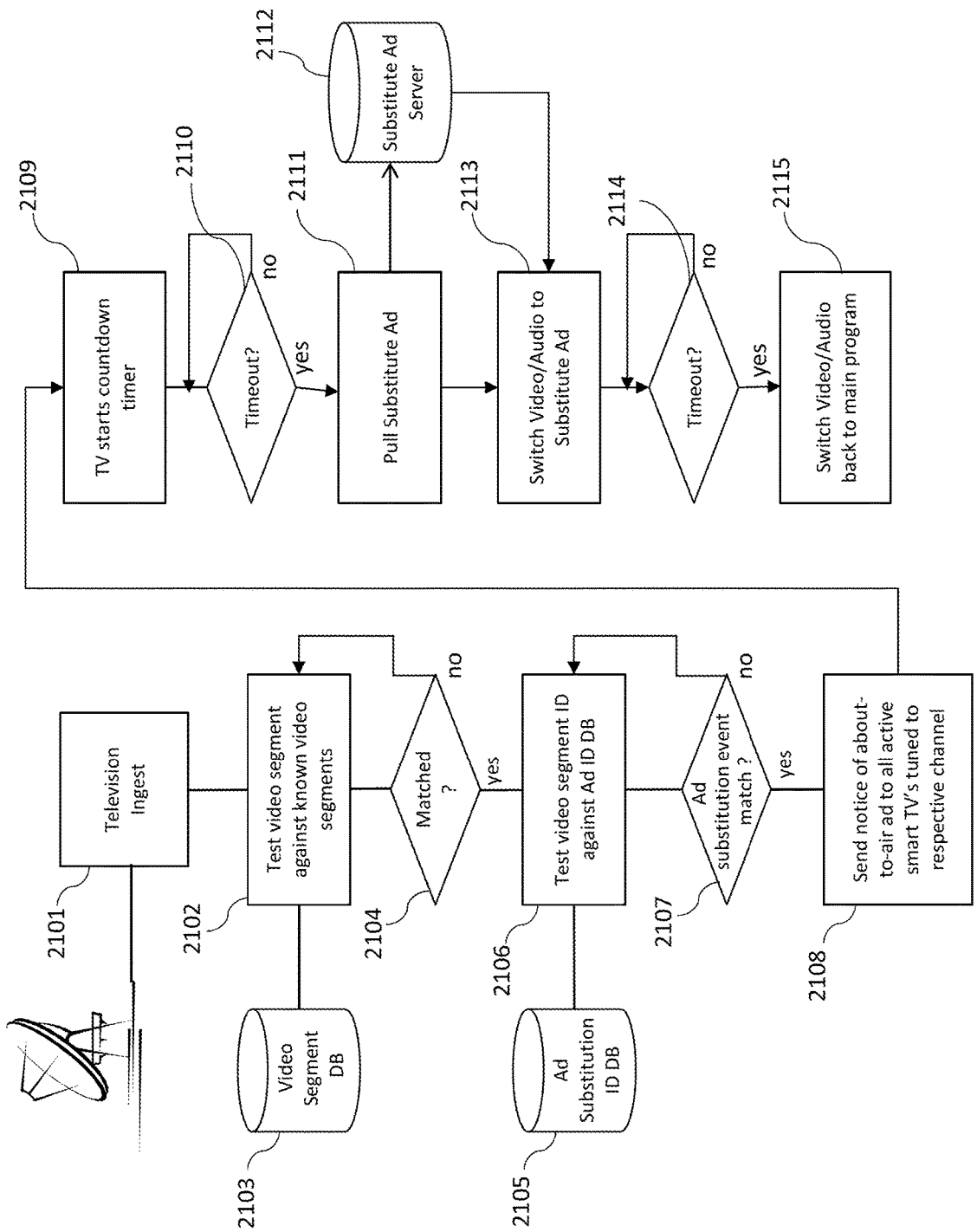
FIG. 21 is a flow diagram of a method for identifying television advertisements according to embodiments of the invention.

A method that may be employed by the system of FIG. 20 is described with reference to the flowchart of FIG. 21. At step 2101, television ingest is received and media cues of an unknown video segment are extracted. At step 2102, the cues of the unknown video segment are tested against the cues of known video segments extracted from a video segment database 2103. At step 2104, it is determined whether a match has been found in the known video segments. If no match has been found, the method loops back to step 2102, and the unknown video segment is compared to further known video segments. If a match has been found, the method continues at step 2106.

At step 2106, a video segment identifier associated with the matching known video segment is tested against a database of advertisement substitution identifiers 2105. At step 2107, it is determined whether there is an advertisement substitution event match (i.e., if the video segment identifier matches an identifier in database 2105). If no match has been found, the method loops back to step 2106, and the video segment identifier is compared to further advertisement substitution identifiers. If a match has been found, the method continues at step 1808.

At step 2108, a notice of an about-to-air substitute advertisement is sent to all active television systems tuned to the respective channel. At step 2109, the television system starts a countdown timer to the airing of the substitute advertisement. At step 2110, it is determined whether a timeout has occurred. If a timeout has not occurred, the countdown timer continues. If a timeout has occurred (i.e., the countdown has expired), the substitute advertise is pulled at step 2111 from a substitute advertisement server or database 2112. At step 2113, the video and/or audio being displayed on the television system is switched to the substitute advertisement. At step 2114, it is determined whether a timeout has occurred. If a timeout has not occurred, the substitute advertisement continues airing. If a timeout has occurred (i.e., the substitute advertisement has ended), the video and/or audio is switched back to the original programming on the television system at step 2115.

Figure 22:
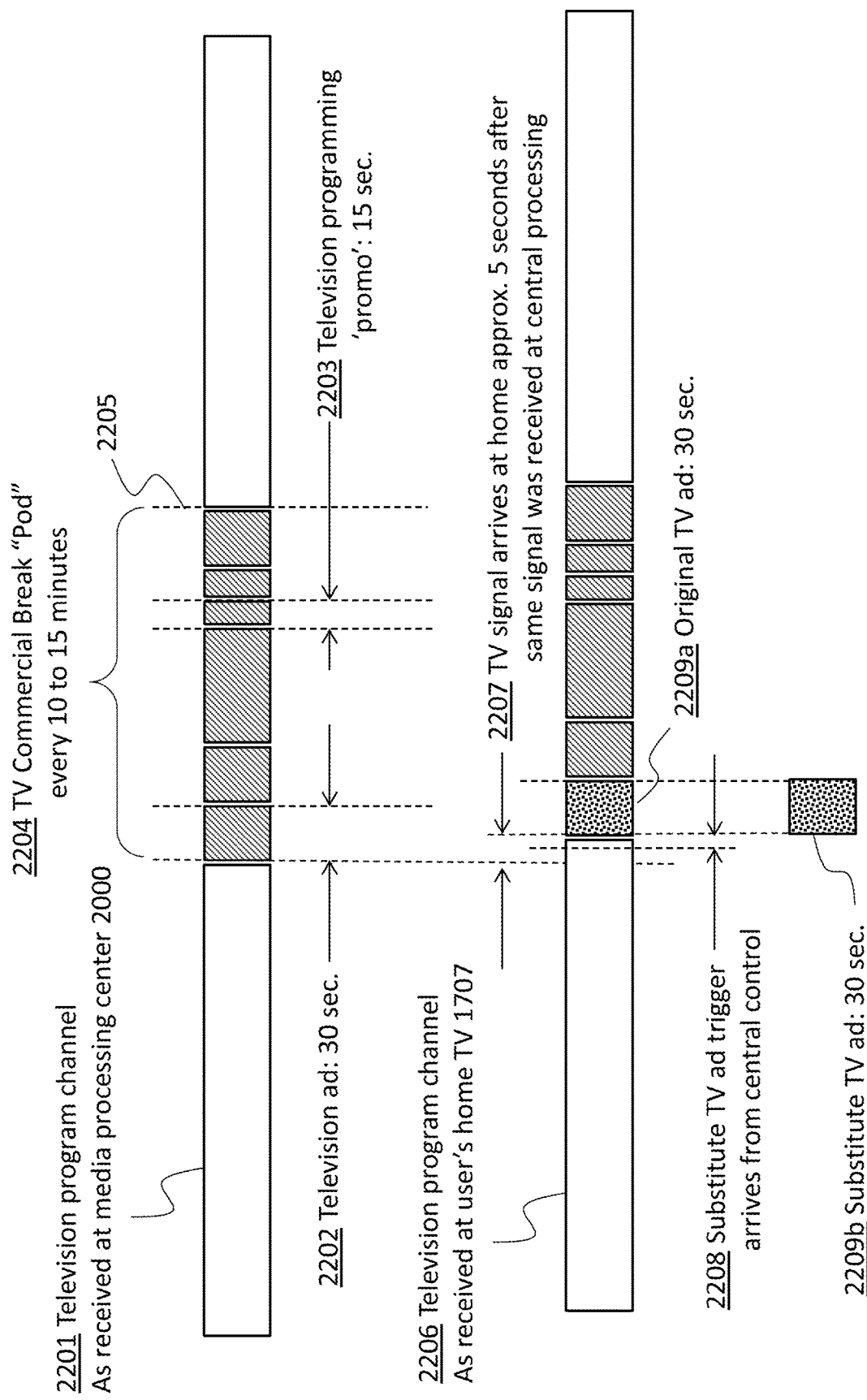
FIG. 22 is a diagram of a video segment with an advertisement block (i.e., ad pod) in which a TV advertisement is substituted according to embodiments of the invention.

For further understanding of the timing of the television advertisement substitution system and method described above, FIG. 22 illustrates a video segment timeline 2201 as received at a media processing center (e.g., media processing center 2000) with a television advertisement group 2204 (also known as an "ad pod" 2204). The ad pod 2204 contains a multiplicity of individual television advertisements of various durations. The video segment 2201 is processed by a media processing center (e.g., media processing center 2000) and added to the video matching reference database. A 30 second advertisement starts at 2202, followed by short and long advertisements, then a 15 second advertisement airs at 2203. The ad pod 2204 ends and programming resumes at 2205.

A television system 2007 (e.g., a consumer television in a typical home) receives the same television programming 2206 as the media processing center. However, due to the structure of the television distribution network, the media processing center receives television programming about four to five seconds in advance of when the same programming is received at a user's television (e.g., television system 2007). Taking advantage of this delay, the media processing center according to embodiments of the invention has sufficient time to detect any particular video segment that may be a candidate for additional processing, then determine if an event is stored in video segment database 2004 at time 2208. If an event is stored, then event manager 2006 may supply instructions and, if appropriate, provide additional media to eligible television clients (e.g., television system 2007) via the contextual event manager 2008. The contextual event manager 2008 then responds at time 2207 to address a substitute video segment 2209b and cause the substitute video segment to be displayed on television system 2007 in place of the originally broadcast video segment 2209a. The substitute video segment 2209b may be addressed from a video server on the premises of the media processing center, or may be addressed from any server connected to the Internet.

Figure 23:
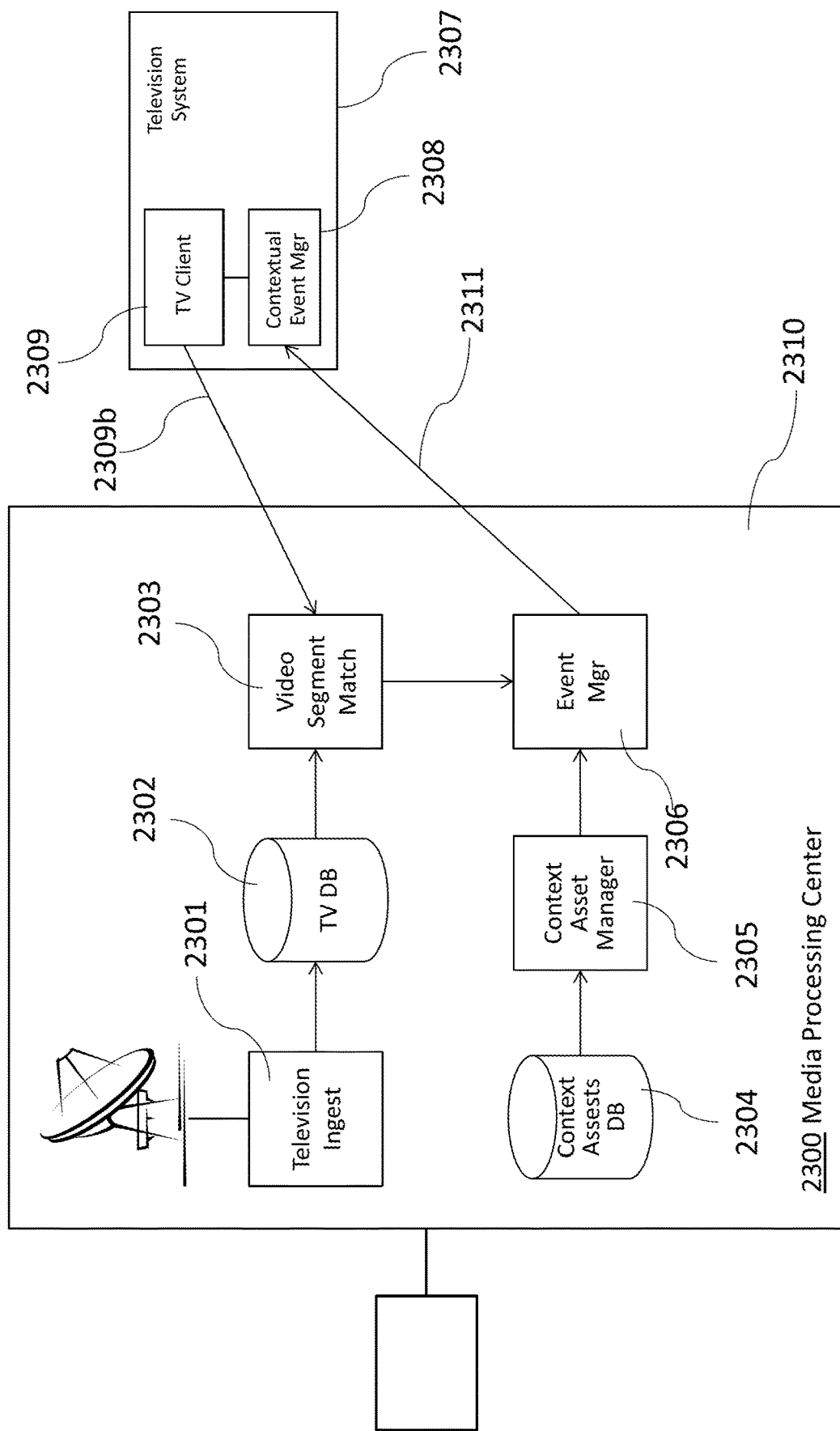
FIG. 23 is a diagram of a media processing center that detects video program segments according to embodiments of the invention.

In yet another embodiment of the invention, the detection of a video segment may trigger additional information to be displayed from a process operating within a television client 2309. FIG. 23 illustrates a media processing center 2300 which, among many services, detects video segments displaying on the television client 2309 by, for example, comparing cues of video frames 2309b to known cues of known content. The known content may be received by television ingest 2301, the cues extracted, and stored in television database 2302. The cues are matched by video segment matching engine 2303. Match results may then be applied to event manager 2306.

If an event has been registered to trigger an action in the presence of the matched video segment, the context asset manager 2305 will be addressed to supply media in the form of a graphic overlay window, for example, as stored by context assets database 2304. The graphic overlay window along with certain timing information is then sent via a network 2311 to a contextual event manager 2308 of each television system 2307 that is detected to be displaying the video segment. Upon receipt of the contextually related media, contextual event manager 2308 may display the media as, for example, an overlaid window occupying a portion of the display area and containing information which is usually related to the topic of the video segment currently being displayed.

Figure 24:
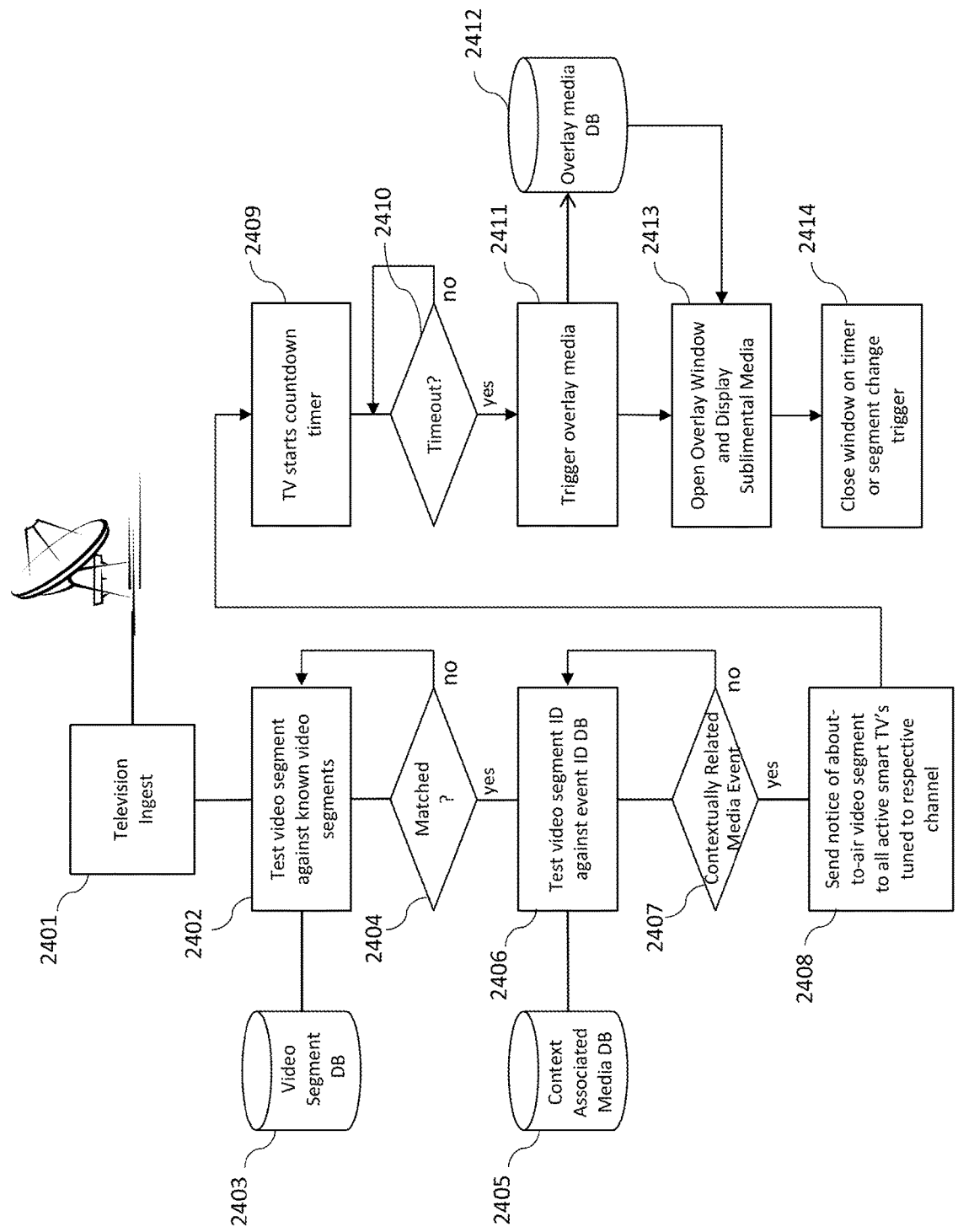
FIG. 24 is a flow diagram of a method for identifying video program segments and overlaying contextually related multimedia according to embodiments of the invention.

A method that may be employed by the system of FIG. 23 is described with reference to the flowchart of FIG. 24. At step 2401, television ingest is received and media cues of an unknown video segment are extracted. At step 2402, the cues of the unknown video segment are tested against the cues of known video segments extracted from a video segment database 2403. At step 2404, it is determined whether a match has been found in the known video segments. If no match has been found, the method loops back to step 2402, and the unknown video segment is compared to further known video segments. If a match has been found, the method continues at step 2406.

At step 2406, a video segment identifier associated with the matching known video segment is tested against a database of context associated media 2405. At step 2407, it is determined whether there is a contextually related media event match (i.e., if the video segment identifier matches an identifier in database 2405). If no match has been found, the method loops back to step 2406, and the video segment identifier is compared to further contextually related event identifiers. If a match has been found, the method continues at step 2408.

At step 2408, a notice of an about-to-air video segment is sent to all active television systems tuned to the respective channel. At step 2409, the television system starts a countdown timer to the airing of the video segment. At step 2410, it is determined whether a timeout has occurred. If a timeout has not occurred, the countdown timer continues. If a timeout has occurred (i.e., the countdown has expired), the overlaid media is triggered at step 2411 from an overlay media database 2412. At step 2413, the overlaid window is opened and displayed on the original programming. At step 2414, the overlaid window is closed at the end of a timer (e.g., at the end of 30 seconds), or at a segment change trigger (e.g., at the end of a video segment and beginning of a new video segment).

Figure 25:
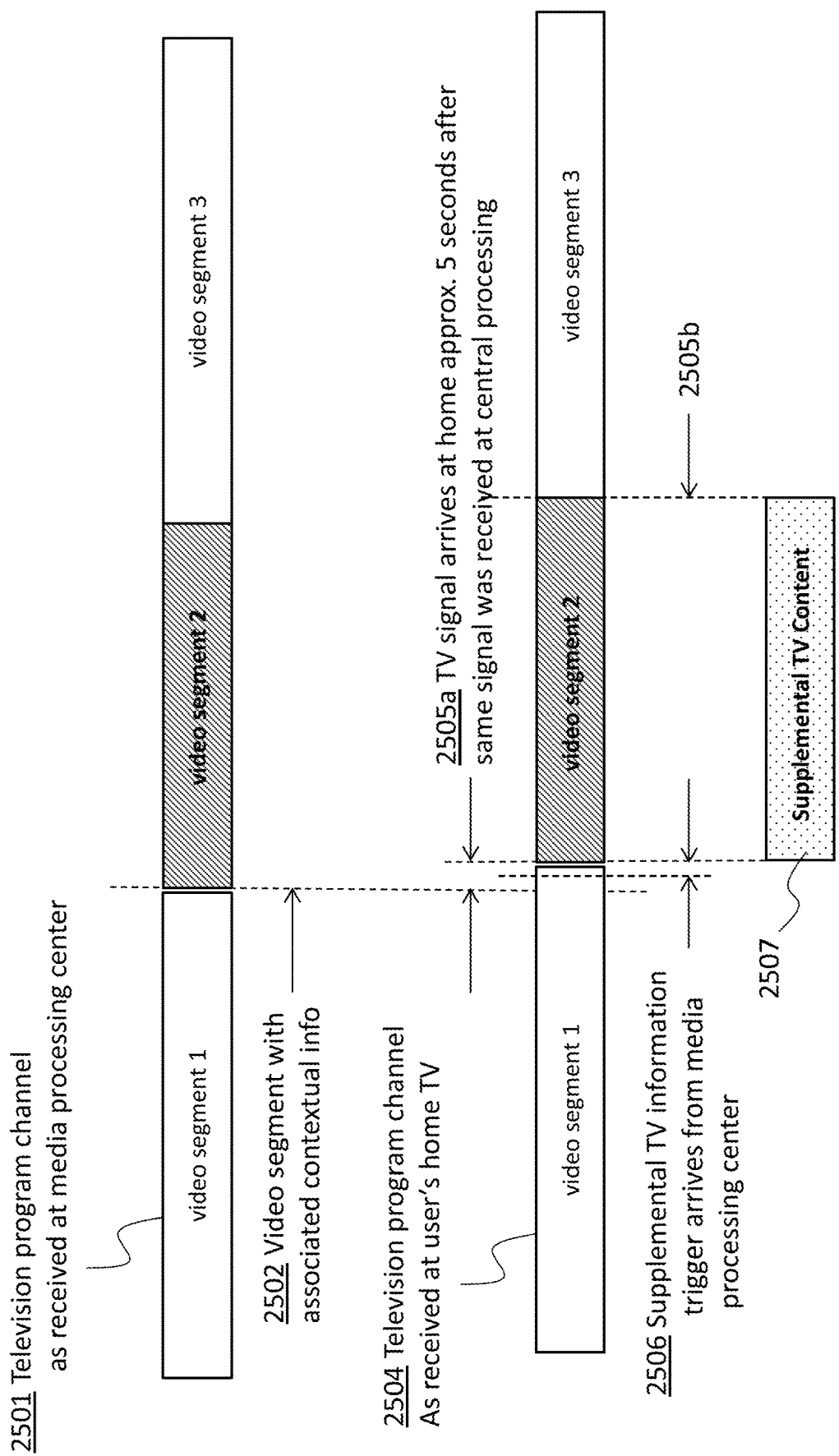
FIG. 25 is a diagram of a video segment with overlaid contextually related multimedia content according to embodiments of the invention.

The timing of contextual media overlay graphics is illustrated in FIG. 25. A television program channel 2501 is received at a media processing center and video segments are detected and stored in a reference media database. When a video segment 2502 which has associated contextually related media for local display on a television system is detected, a signal is sent at 2506 to the television system which is detected to be displaying the same television program channel 2504 (i.e., 2501 and 2504 represent the same television program channel). At the start of video segment 2 on the television system (i.e., at time 2505a), the local processor of the television system executes instructions received from the media processing center. The instructions display a graphics overlay window (i.e., supplemental television content 2507) with additional information related to the underlying video program. The supplemental television content 2507 displays until the end of video segment 2 2505b.

Figure 26:
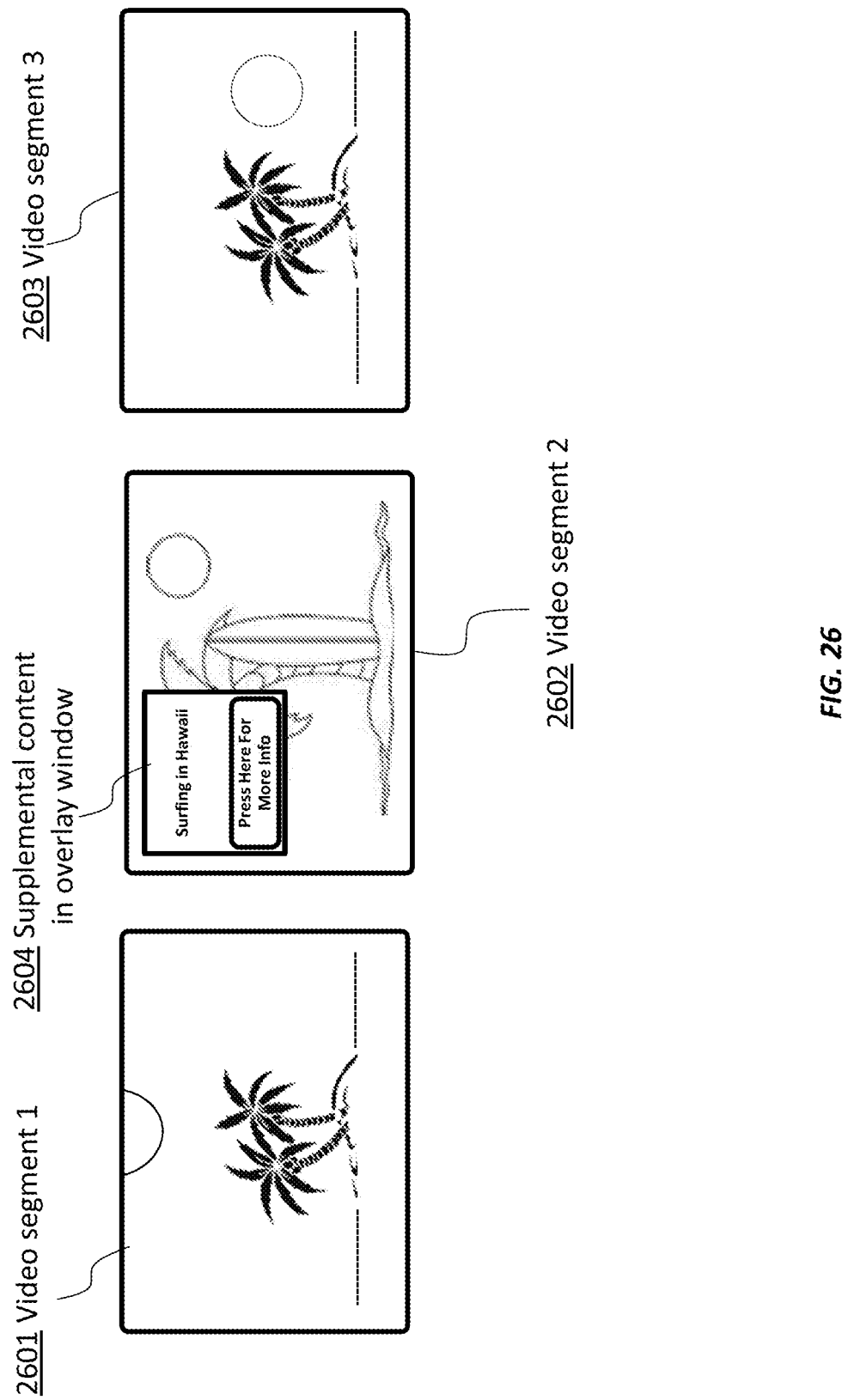
FIG. 26 is a diagram of video segments with and without overlaid contextually related multimedia content according to embodiments of the invention.

The video frame representations of FIG. 26 illustrate the actions based on the timeline of FIG. 25 according to one embodiment. In FIG. 26, a video segment 2601 displays a scene of a tropical island. At video segment 2602, the content programmer wishes to display an overlay window inviting the viewer to receive information for booking a vacation to the tropical island. As discussed above, at time 2505 which is the start of video segment 2602, the processor of the television system follows the provided instructions to display a graphics overlay window with supplemental information 2604. At the end of the segment 2505b, instructions to the processor of the television system cause the video overlay window to be removed, resulting in an unobstructed video segment 2603.

The nearest neighbor and path pursuit techniques mentioned previously are now described in detail. An example of tracking video transmission using ambiguous cues is given, but the general concept can be applied to any field, such as those described above.

A method for efficient video pursuit is presented. Given a large number of video segments, the system must be able to identify in real time what segment a given query video input is taken from and in what time offset. The segment and offset together are referred to as the location. The method is called video pursuit since it must be able to efficiently detect and adapt to pausing, fast forwarding, rewinding, abrupt switching to other segments and switching to unknown segments. Before being able to pursue live video the database is processed. Visual cues (a handful of pixel values) are taken from frames every constant fraction of a second and put in specialized data structure (Note that this can also be done in real time). The video pursuit is performed by continuously receiving cues from the input video and updating a set of beliefs or estimates about its current location. Each cue either agrees or disagrees with the estimates, and they are adjusted to reflect the new evidence. A video location is assumed to be the correct one if the confidence in this being true is high enough. By tracking only a small set of possible "suspect" locations, this can be done efficiently.

A method is described for video pursuit but uses mathematical constructs to explain and investigate it. It is the aim of this introduction to give the reader the necessary tools to translate between the two domains. A video signal is comprised of sequential frames. Each can be thought of as a still image. Every frame is a raster of pixels. Each pixel is made out of three intensity values corresponding to the red, green and blue (RGB) make of that pixel's color. In the terminology of this manuscript, a cue is a list of RGB values of a subset of the pixels in a frame and a corresponding time stamp. The number of pixels in a cue is significantly smaller than in a frame, usually between 5 and 15. Being an ordered list of scalar values, the cue values are in fact a vector. This vector is also referred to as a point.

Although these points are in high dimension, usually between 15 and 150, they can be imagined as points in two dimensions. In fact, the illustrations will be given as two dimensional plots. Now, consider the progression of a video and its corresponding cue points. Usually a small change in time produces a small change in pixel values. The pixel point can be viewed as "moving" a little between frames. Following these tiny movements from frame to frame, the cue follows a path in space like a bead would on a bent wire.

Figure 27:
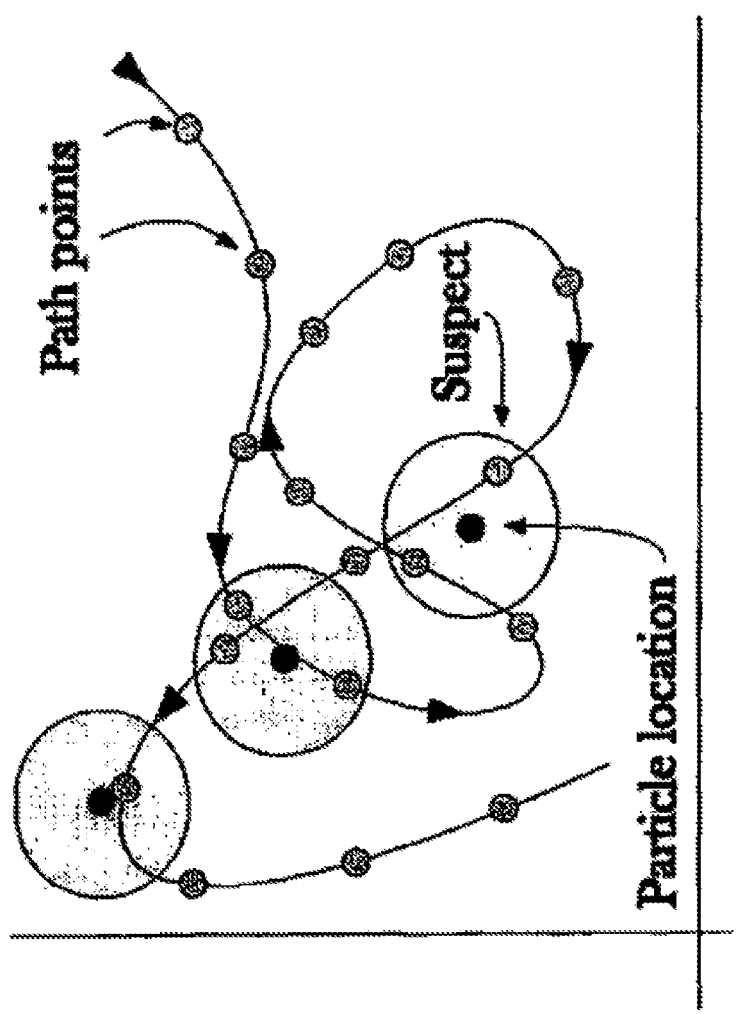
FIG. 27 is a chart illustrating point locations and the path points around them according to embodiments of the invention.

In the language of this analogy, in video pursuit the locations of the bead in space (the cue points) are received and the part of wire (path) the bead is following is looked for. This is made significantly harder by two facts. First, the bead does not follow the wire exactly but rather keeps some varying unknown distance from it. Second the wires are all tangled together. These statements are made exact in section 2. The algorithm described below does this in two conceptual steps. When a cue is received, it looks for all points on all the known paths that are sufficiently close to the cue point; these are called suspects. This is done efficiently using the Probabilistic Point Location in Equal Balls algorithm. These suspects are added to a history data structure and the probability of each of them indicating the true location is calculated. This step also includes removing suspect locations that are sufficiently unlikely. This history update process ensures that on the one hand only a small history is kept but on the other hand no probable locations are ever deleted. The generic algorithm is given in Algorithm 1 and illustrated in FIG. 27.

| Algorithm 1 Generic path pursuit algorithm. |
| --- |
| 1: Set of suspects is empty |
| 2: loop |
| 3:     Receive latest cue. |

| -continued |
| --- |
| Algorithm 1 Generic path pursuit algorithm. |
| 4:     Find path points who are close to it. |
| 5:     Add them to the set of suspects. |
| 6:     Based on the suspects update the location likelihood function. |
| 7:     Remove from suspect set those who do not contribute to the likelihood function. |
| 8:     if A location is significantly likely then |
| 9:         Output the likely location. |
| 10:    end if |
| 11: end loop |

The document begins with describing the Probabilistic Point Location in Equal Balls (PPLEB) algorithm in Section 1. It is used in order to perform line 5 in Algorithm 1 efficiently. The ability to perform this search for suspects quickly is crucial for the applicability of this method. Later, in section 2 one possible statistical model is described for performing lines 6 and 7. The described model is a natural choice for the setup. It is also shown how it can be used very efficiently.

Section 1—Probabilistic Point Location in Equal Balls

The following section describes a simple algorithm for performing probabilistic point location in equal balls (PPLEB). In the traditional PLEB (point location in equal balls), one starts with a set of n points $x_i$ in $\mathbb{R}^d$ and a specified ball of radius r. The algorithm is given O(poly(n)) preprocessing time to produce an efficient data structure. Then, given a query point x the algorithm is required to return all points $x_i$ such that $\|x-x_i\| \leq r$. The set of points such that $\|x-x_i\| \leq r$ geometrically lie within a ball of radius r surrounding the query x (see FIG. 23). This relation is referred to as $x_i$ being close to x or as $x_i$ and x being neighbors.

The problem of PPLEB and the problem of nearest neighbor search are two similar problems that received much attention in the academic community. In fact, these problems were among the first studied in the field of computational geometry. Many different methods cater to the case where the ambient dimension d is small or constant. These partition the space in different ways and recursively search through the parts. These methods include KD-trees, cover-trees, and others. Although very efficient in low dimension, when the ambient dimension is high, they tend to perform very poorly. This is known as the "curse of dimensionality". Various approaches attempt to solve this problem while overcoming the curse of dimensionality. The algorithm used herein uses a simpler and faster version of the algorithm and can rely on Local Sensitive Hashing.

Section 1.1 Locality Sensitive Hashing

In the scheme of local sensitive hashing, one devises a family of hash functions H such that:

$$\Pr_{u \sim U}(u(x) \neq u(y) \mid \|x - y\| \leq r) \equiv p$$

$$\Pr_{u \sim U}(u(x) \neq u(y) \mid \|x - y\| \geq 2r) \geq 2p$$

In words, the probability of x and y being mapped to the same value by h is significantly higher if they are close to each other.

For the sake of clarity, let us first deal with a simplified scenario where all incoming vectors are of the same length r' and $r' > \sqrt{2}r$. The reason for the latter condition will become clear later. First a random function $u \in U$ is defined, which separates between x and y according to the angle between them. Let $\vec{u}$ be a random vector chosen uniformly from the unit sphere $S^{d-1}$ and let $u(x)=\text{sign}(\vec{u}\cdot x)$. It is easy to verify that $\Pr_{u\sim U}(u(x)\neq u(y))=\theta_{x,y}/\pi$. Moreover, for any points x, y, x', y' on a circle such that $\|x'-y'\|\leq 2\|x-y\|$, $\theta_{x',y'}\leq 2\theta_{x,y}$ is achieved. Defining p, the following equations are used:

$$\Pr_{u\sim U}(u(x) \neq u(y) \mid \|x - y\| \leq r) \equiv p$$

$$\Pr_{u\sim U}(u(x) \neq u(y) \mid \|x - y\| \geq 2r) \geq 2p$$

The family of functions H is set to be a cross product of t independent copies of u, i.e. $h(x)=[u1(x), \ldots, u_t(x)]$. Intuitively, one would like to have that if $h(x)=h(y)$ then x and y are likely to be close to each other. Let us quantify that. First, compute the expected number of false positive mistakes $n_{fp}$. These are the cases for which $h(x)=h(y)$ but $\|x-y\|>2r$. A value t is found for which $n_{fp}$ is no more than 1, i.e. one is not expected to be wrong.

$$E[n_{fp}]\leq n(1-2p)^t\leq 1$$

$$\rightarrow t\geq \log(1/n)/\log(1-2p)$$

Now, the probability that $h(x)=h(y)$ given that they are neighbors is computed:

$$Pr(h(x) = h(y) \mid \|x - y\| \leq r) \geq (1 - p)^{\log(1/n)/\log(1-2p)} =$$

$$(1/n)^{\log(1-p)/\log(1-2p)} \geq 1/\sqrt{n}.$$

Note here that one must have that $2p<1$ which requires $r'>\sqrt{2}r$. This might not sound like a very high success probability. Indeed, $1/\sqrt{n}$ is significantly smaller than ½. The next section will describe how to boost this probability up to ½.

Section 1.2 The Point Search Algorithm

Each function h maps every point in space to a bucket. Define the bucket function $B_h: \mathbb{R}^d \rightarrow 2^{[n]}$ of a point x with respect to hash function has $B_h(x)\equiv\{x_i|h(x_i)=h(x)\}$. The data structure maintained is $m=O(\sqrt{n})$ instances of bucket functions $[Bh_1, \ldots, Bh_m]$. When one searches for a point x, the function returns $B(x)=\cup_i B_{hj}(x)$. According to the previous section, there are two desired results:

$$Pr(x_i \in B(x) \mid \|x_i-x\|\leq r)\geq \tfrac{1}{2}$$

$$E[|B(x)\cap\{x_i|\|x-x_i\|>2r\}|]\leq\sqrt{n}$$

In other words, while with probability at least ½ each neighbor of x is found, one is not likely to find many non-neighbors.

Section 1.3 Dealing with Different Radii Input Vectors

The previous sections only dealt with searching through vectors of the same length, namely r'. Now described is how one can use the construction as a building block to support a search in different radii. As seen in FIG. 11, the space is divided into rings of exponentially growing width. Ring i, denoted by $R_i$, includes all points $x_i$ such that $\|x_i\|\in[2r(1+\epsilon)^i, 2r(1+\epsilon)^{i+1}]$. Doing this achieves two ends. First, if $x_i$ and $x_j$ belong to the same ring, then $\|x_j\|/(1+\epsilon)\leq\|x_i\|\leq\|x_j\|(1+\epsilon)$. Second, any search can be performed in at most $1/\epsilon$ such rings. Moreover, if the maximal length vector in the data set is r' then the total number of rings in the system is $O(\log(r'/r))$.

Section 2 The Path Pursuit Problem

In the path pursuit problem, a fixed path in space is given along with the positions of a particle in a sequence of time points. The terms particle, cue, and point will be used interchangeably. The algorithm is required to output the position of the particle on the path. This is made harder by a few factors: the particle only follows the path approximately; the path can be discontinuous and intersect itself many times; both particle and path positions are given in a sequence of time points (different for each).

It is important to note that this problem can simulate tracking a particle on any number of paths. This is simply done by concatenating the paths into one long path and interpreting the resulting position as the position on the individual paths.

More precisely, let path P be parametric curve $P:\mathbb{R}\rightarrow\mathbb{R}^d$. The curve parameter will be referred to as the time. The points on the path that are known to us are given in arbitrary time points $t_i$, i.e. n pairs $(t_i, P(t_i))$ are given. The particle follows the path but its positions are given in different time points, as shown in FIG. 12. Further, m pairs $(t'_j, x(t'_j))$ are given, where $x(t'_j)$ is the position of the particle in time $t'_j$.

Section 2.1 Likelihood Estimation

Since the particle does not follow the path exactly and since the path can intersect itself many times it is usually impossible to positively identify the position on the path the particle is actually on. Therefore, a probability distribution is computed on all possible path locations. If a location probability is significantly probable, the particle position is assumed to be known. The following section describes how this can be done efficiently.

If the particle is following the path, then the time difference between the particle time stamp and the offset of the corresponding points on P should be relatively fixed. In other words, if x(t') is currently in offset t on the path then it should be close to P(t). Also, τ seconds ago it should have been in offset t−τ. Thus x(t'−τ) should be close to P(t−τ) (note that if the particle is intersecting the path, and x(t') is close to P(t) temporarily, it is unlikely that x(t'−τ) and P(t−τ) will also be close). Define the relative offset as $\Delta=t-t'$. Notice that as long as the particle is following the path the relative offset Δ remains unchanged. Namely, x(t') is close to P(t'+Δ).

The maximum likelihood relative offset is obtained by calculating:

$$\Delta = \underset{\delta}{\arg\max}\, Pr(x(t'_m), x(t'_{m-1}), \ldots, x(t'_1) \mid P, \delta)$$

In words, the most likely relative offset is the one for which the history of the particle is most likely. This equation however cannot be solved without a statistical model. This model must quantify: How tightly x follows the path; How likely it is that x ')umps" between locations; How smooth the path and particle curves are between the measured points.

Section 2.2 Time Discounted Binning

Now described is a statistical model for estimating the likelihood function. The model makes the assumption that the particle's deviation away from the path distributes normally with standard deviation ar. It also assumes that at any given point in time, there is some non-zero probability the particle will abruptly switch to another path. This is manifested by an exponential discount with time for past points. Apart for being a reasonable choice for a modeling point of view this model also has the advantage of being efficiently updateable. For some constant time unit 1:, set the likelihood function to be proportional to $f$ which is defined as follows:

$$f_m(\lfloor \delta/\tau \rfloor) = \sum_{j=1}^{m}\sum_{i=1}^{n} e^{-\left(\frac{\|x[(t'_j)-P(t_i+\delta)]\|}{\sigma r}\right)^2} (1-\zeta)^{t'_i-t'_j}.$$

Here $\alpha \ll 1$ is a scale coefficient and $\xi > 0$ is the probability that the particle will jump to a random location on the path in a given time unit.

Updating the function $f$ efficiently can be achieved using the following simple observation.

$$f_m(\lfloor \delta/\tau \rfloor) = \sum_{i=1}^{n} e^{-\left(\frac{\|x[(t'_m)-P(t_i+\delta)]\|}{\sigma r}\right)^2} + f_{m-1}(\lfloor \delta/\tau \rfloor)(1-\zeta)^{t'_m-t'_{m-1}}$$

Moreover, since $\alpha \ll 1$, if $\|x(t'_m)-P(t_i)\| \geq r$, the follow occurs:

$$e^{-\left(\frac{\|x(t'_m)-P(t_i)\|}{\sigma r}\right)^2} \approx 0.$$

This is an important property of the likelihood function since the sum update can now performed only over the neighbors of $x(t'_j)$ and not the entire path. Denote by S the set of $(t_i, P(t_i))$ such that $\|x(t'_m)-P(t_i)\| \leq r$. The follow equation occurs:

$$f_m(\lfloor \delta/\tau \rfloor) = \sum_{(t_i,P(t_i)) \in S \wedge \lfloor (t'_m-t_i)/\tau \rfloor = \lfloor \delta/\tau \rfloor} e^{-\left(\frac{\|x[(t'_m)-P(t_i)]\|}{\sigma r}\right)^2} + f_{m-1}(\delta)(1-\zeta)^{t'_m-t'_{m-1}}$$

This is described in Algorithm 2.2 below. The term $f$ is used as a sparse vector that receives also negative integer indices. The set S is the set of all neighbors of $x(t_i)$ on the path and can be computed quickly using the PPLEB algorithm. It is easy to verify that if the number of neighbors of $x(t_i)$ is bounded by some constant $n_{near}$ then the number of non-zeros in the vector $f$ is bounded by $n_{near}/\xi$ which is only a constant factor larger. The final stage of the algorithm is to output a specific value of $\delta$ if $f(\lfloor \delta/\tau \rfloor)$ is above some threshold value.

| Algorithm 2 Efficient likelihood update. |
| --- |
| 1:   $f \leftarrow 0$ |
| 2:   while $(t_j', x(t_j')) \in$ INPUT do |
| 3:   $f \leftarrow (1-\zeta)^{t_j'-t_{j-1}'} f$ |
| 4:   $S \leftarrow \{(t_i, P(t_i)) \mid \|x(t_j') - P(t_i)\| \leq r\}$ |
| 5:   for $(t_i, P(t_i)) \in S$ do |
| 6:   $\delta \leftarrow t_j' - t_i$ |
| 7:   $f(\lfloor \delta/\tau \rfloor) \leftarrow f(\lfloor \delta/\tau \rfloor) + e^{-\left(\frac{\|x(t_j)-P(t')\|}{\sigma\tau}\right)^2}$ |
| 8:   end for |
| 9:   Set all f values below threshold $\epsilon$ to zero. |
| 10:   end while |

Figure 28:
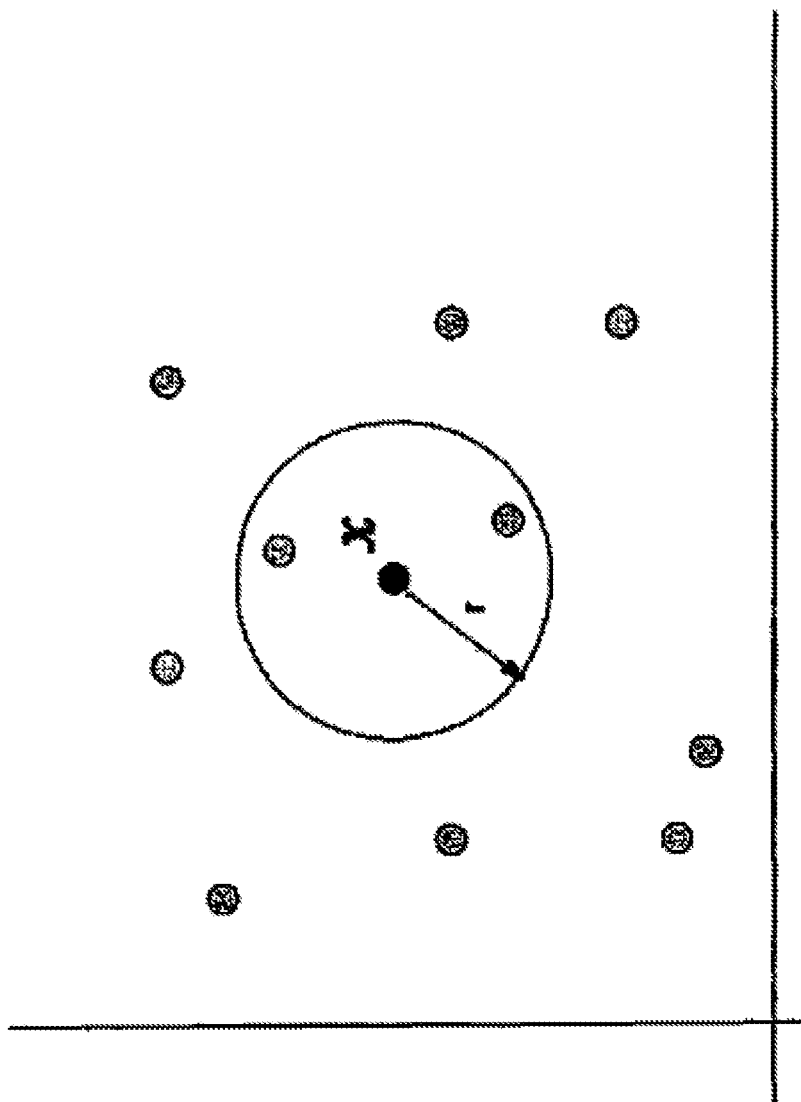
FIG. 28 is a chart illustrating a set of points that lie within a distance from a query point according to embodiments of the invention.

FIG. 28 gives three consecutive point locations and the path points around them. Note that neither the bottom point nor middle one alone would have been sufficient to identify the correct part of the path. Together, however, they are. Adding the top point increases the certainty that the particle is indeed of the final (left) curve of the path.

Figure 29:
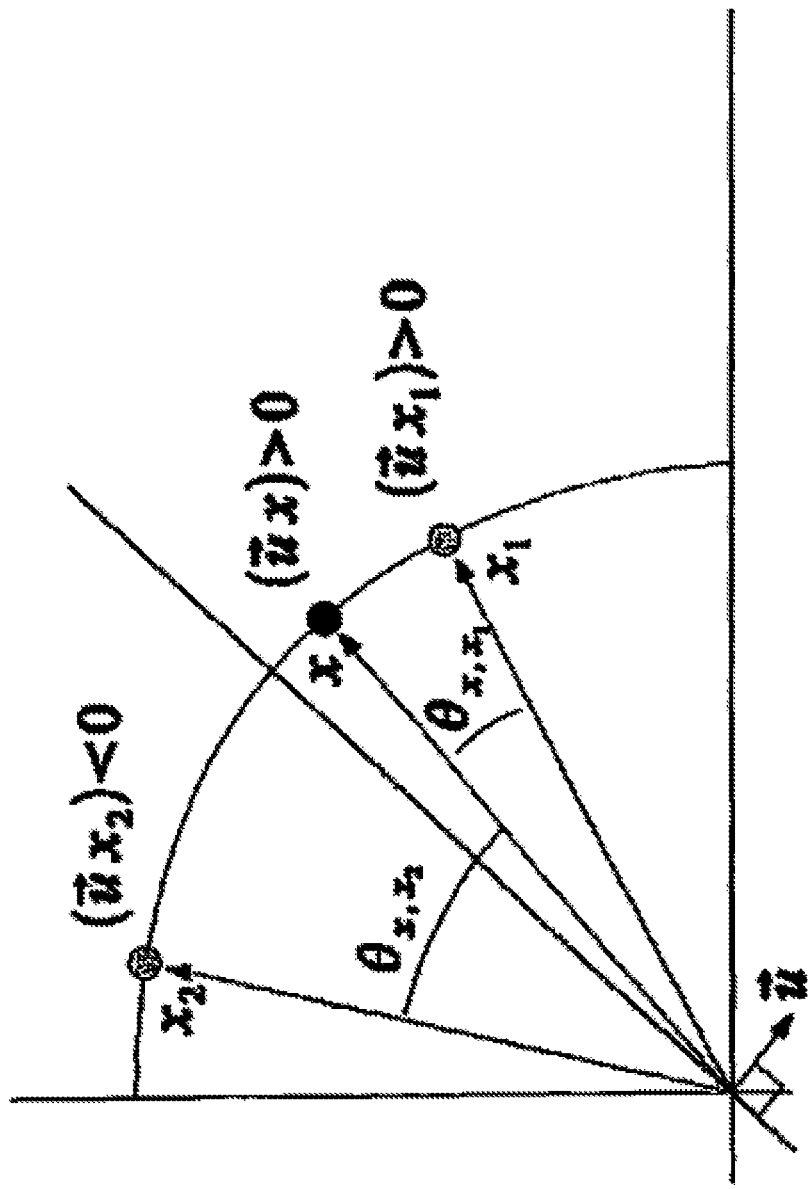
FIG. 29 is a chart illustrating possible point values according to embodiments of the invention.

In FIG. 29, given a set of n (grey) points, the algorithm is given a query point (black) and returns the set of points that lie within distance r from it (the points inside the circle). In the traditional setting, the algorithm must return all such points. In the probabilistic setting each such point should be returned only with some constant probability.

Figure 30:
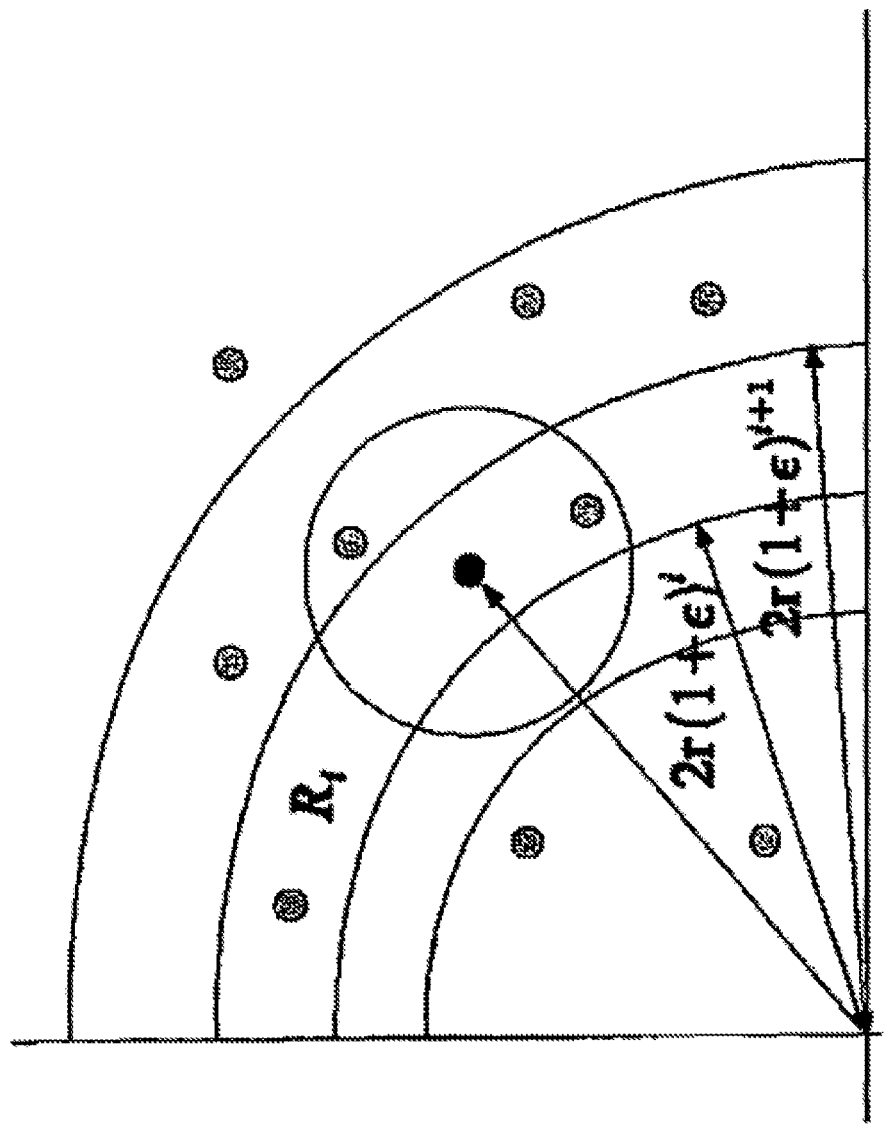
FIG. 30 is a chart illustrating a space divided into rings of exponentially growing width according to embodiments of the invention.

FIG. 30 illustrates the values of $u(x_1)$, $u(x_2)$, and $u(x)$. Intuitively, the function u gives different values to $x_1$ and $x_2$ if the dashed line passes between them and the same value otherwise. Passing the dashed line in a random direction ensures that the probability of this happening is directly proportional to angle between $x_1$ and $x_2$.

Figure 31:
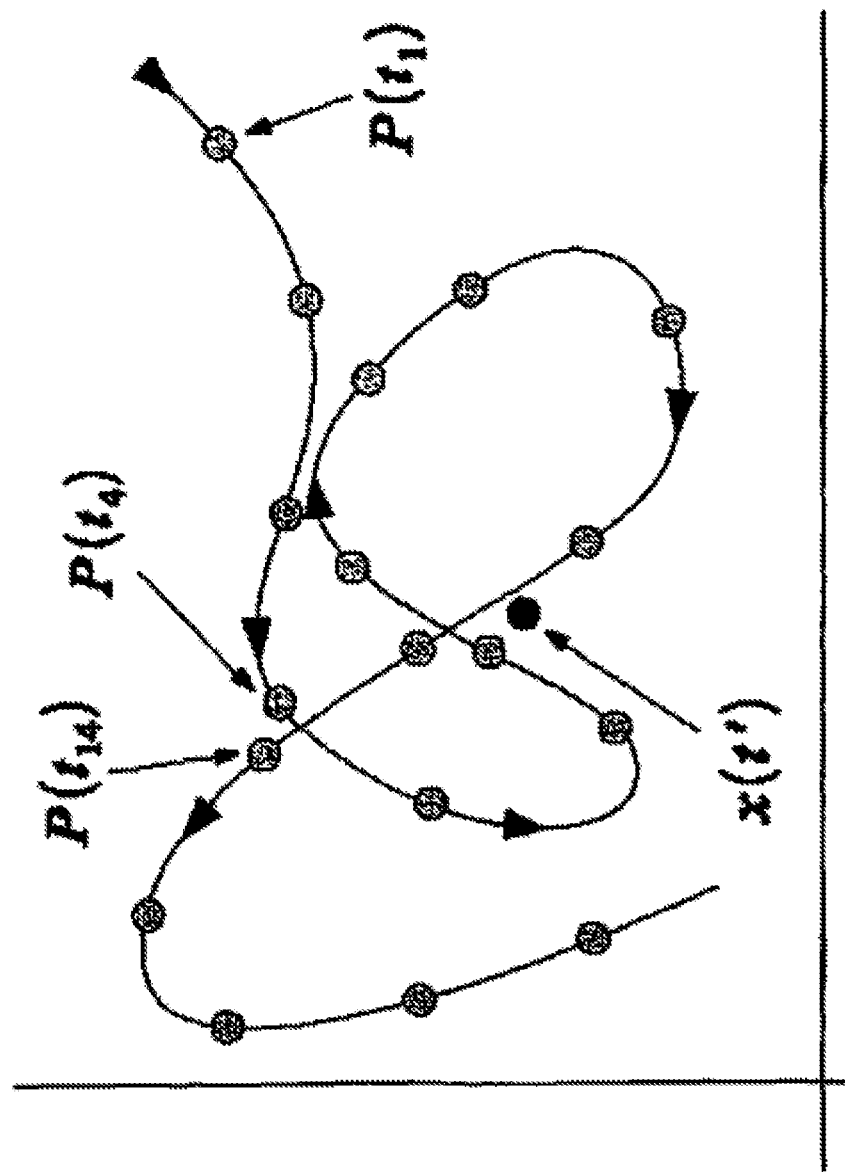
FIG. 31 is a chart illustrating self-intersecting paths and a query point according to embodiments of the invention.

FIG. 31 shows that by dividing the space into rings such that ring $R_i$ is between radius $2r(1+\epsilon)^i$ and $2r(1+\epsilon)^{i+1}$, it can be made sure that any two vectors within a ring are the same length up to $(1+\epsilon)$ factors and that any search is performed in at most $1/\epsilon$ rings.

Figure 32:
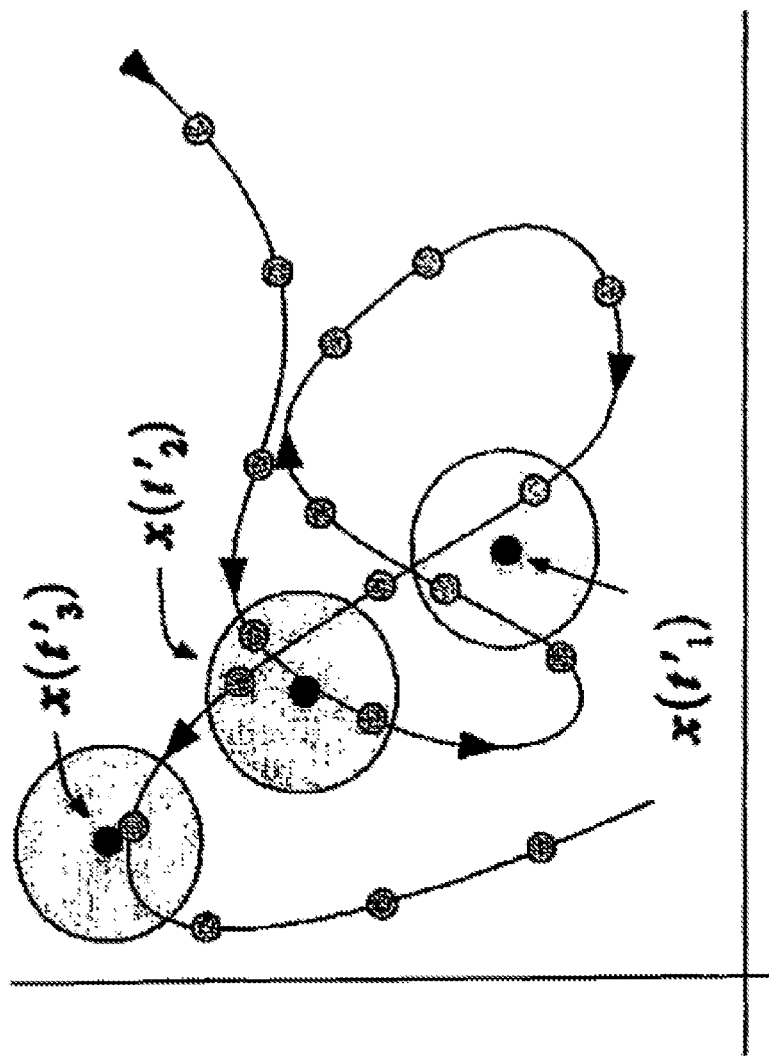
FIG. 32 is a chart illustrating three consecutive point locations and the path points around them according to embodiments of the invention.

FIG. 32 shows a self-intersecting paths and a query point (in black). It illustrates that without the history of the particle positions it is impossible to know where it is on the path.

FIG. 32 gives three consecutive point locations and the path points around them. Note that neither $x(t_1)$ nor $x(t_2)$ alone would have been sufficient to identify the correct part of the path. Together however they are. Adding $x(t_3)$ increases the certainty that the particle is indeed of the final (left) curve of the path.

In summary, embodiments of the invention improve upon the media matching and identification process by dividing reference data (i.e., known media content data) into a plurality of reference databases which can be searched independently, simultaneously, concurrently, or a combination. The results of the search process can then be weighted and scored for a final result.

Although described herein with respect to real-time identification of television programming, it is contemplated that the systems and methods described herein may be applied to any "big data" problem where multi-dimensional searches can be advanced by partitioning data sets into preferred subsets. Further, although described substantially herein as relating to video data and graphical displays, it is contemplated that the systems and methods described herein may be similarly used with respect to audio data and audible displays. For example, substitute audio data may be provided in certain embodiments.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A system comprising:
   one or more processors; and
   one or more non-transitory machine-readable storage media containing instructions which when executed on the one or more processors, cause the one or more processors to perform operations including:
      transmitting a cue derived from a video frame of media associated with a particular channel, the cue including a representation of one or more subsets of pixels of the video frame;
      receiving in response to transmitting the cue, a media substitution request, wherein the media substitution request includes a substitute media identifier corresponding to a substitute media segment and an identification of a first time interval configured to synchronize presentation of the substitute media segment;
      determining when the first time interval has expired;
      retrieving, in response to determining that the first time interval has expired, the substitute media segment corresponding to the substitute media identifier;
      determining a second time interval over which the substitute media segment is to be presented;
      presenting the substitute media segment, the substitute media segment being presented during a media segment of the media associated with the particular channel;
      determining when the second time interval has expired; and
      terminating, in response to determining that the second time interval has expired, the substitute media segment.

2. The system of claim 1, wherein the substitute media segment is presented in place of a media segment of the media associated with the particular channel.

3. The system of claim 1, wherein the substitute media segment is presented within an overlay window that is displayed over a portion of the media associated with the particular channel.

4. The system of claim 1, wherein the substitute media segment is contextually related to the media associated with the particular channel.

5. The system of claim 1, wherein the media substitution request is received in response to the media associated with the particular channel being identified.

6. The system of claim 1, wherein the operations further include:
   generating a media cue from a media segment of the media associated with the particular channel, wherein the media cue is configured for use in identifying media segments of the media associated with the particular channel; and
   transmitting the media cue to identify the media segment, wherein upon being identified, media substitution requests are transmitted to a plurality of display devices that are presenting the media associated with the particular channel.

7. A computer-implemented method comprising:
   transmitting, by a display device, a cue derived from a video frame of media associated with a particular channel, the cue including a representation of one or more subsets of pixels of the video frame;
   receiving, by the display device in response to transmitting the cue, a media substitution request, wherein the media substitution request includes a substitute media identifier corresponding a substitute media segment and an identification of a first time interval configured to synchronize presentation of the substitute media segment;
   determining when the first time interval has expired;
   retrieving, in response to determining that the first time interval has expired, the substitute media segment corresponding to the substitute media identifier;
   determining a second time interval over which the substitute media segment is to be presented;
   presenting, by the display device, the substitute media segment, the substitute media segment being presenting over a media segment of the media associated with the particular channel; and
   terminating, in response to determining that the second time interval has expired, the substitute media segment.

8. The computer-implemented method of claim 7, wherein the substitute media segment is presented in place of a media segment of the media associated with the particular channel.

9. The computer-implemented method of claim 7, wherein the substitute media segment is presented within an overlay window that is displayed over a portion of the media associated with the particular channel.

10. The computer-implemented method of claim 7, wherein the substitute media segment is contextually related to the media associated with the particular channel.

11. The computer-implemented method of claim 7, wherein the media substitution request is received in response to the media associated with the particular channel being identified.

12. The computer-implemented method of claim 7, further comprising:
   generating a media cue from a media segment of the media associated with the particular channel, wherein the media cue is configured for use in identifying media segments of the media associated with the particular channel; and transmitting the media cue to identify the media segment, wherein upon being identified, media substitution requests are transmitted to a plurality of display devices that are presenting the media associated with the particular channel.

13. A non-transitory machine-readable storage medium of a display device, the non-transitory machine-readable storage medium containing instructions which when executed on one or more processors, cause the one or more processors to perform operations including:

transmitting a cue derived from a video frame of media associated with a particular channel, the cue including a representation of one or more subsets of pixels of the video frame;

receiving in response to transmitting the cue, a media substitution request, wherein the media substitution request includes a substitute media identifier corresponding to a substitute media segment and an identification of a first time interval configured to synchronize presentation of the substitute media segment;

determining when the first time interval has expired;

retrieving, in response to determining that the first time interval has expired, the substitute media segment corresponding to the substitute media identifier;

determining a second time interval over which the substitute media segment is to be presented;

presenting the substitute media segment, the substitute media segment being presented during a media segment of the media associated with the particular channel;

determining when the second time interval has expired; and terminating, in response to determining that the second time interval has expired, the substitute media segment.

14. The non-transitory machine-readable storage medium of claim 13, wherein the substitute media segment is presented in place of a media segment of the media associated with the particular channel.

15. The non-transitory machine-readable storage medium of claim 13, wherein the substitute media segment is presented within an overlay window that is displayed over a portion of the media associated with the particular channel.

16. The non-transitory machine-readable storage medium of claim 13, wherein the substitute media segment is contextually related to the media associated with the particular channel.

17. The non-transitory machine-readable storage medium of claim 13, wherein the operations further include:

generating a media cue from a media segment of the media associated with the particular channel, wherein the media cue is configured for use in identifying media segments of the media associated with the particular channel; and transmitting the media cue to identify the media segment, wherein upon being identified, media substitution requests are transmitted to a plurality of display devices that are presenting the media associated with the particular channel.

* * * * *